United States Patent
Law et al.

(10) Patent No.: US 11,301,554 B2
(45) Date of Patent: Apr. 12, 2022

(54) SECURE TAMPER RESISTANT SMART CARD

(71) Applicant: ETHERNOM, INC., Oceanside, CA (US)

(72) Inventors: Hock Thye Law, Oceanside, CA (US); Orang Dialameh, Topanga, CA (US); Ulrich Franz Buddemeier, Venice, CA (US); Lyn Phuong Nguyen, San Diego, CA (US); Lun Feng Tan, Vista, CA (US); Alexandre Charapov, San Diego, CA (US); Tim Dorcey, Santa Monica, CA (US); Imraan Ahmed, San Diego, CA (US)

(73) Assignee: ETHERNOM, INC., Oceanside, CA (US)

(*) Notice: Subject to any disclaimer, the term of this patent is extended or adjusted under 35 U.S.C. 154(b) by 304 days.

(21) Appl. No.: 16/352,657

(22) Filed: Mar. 13, 2019

(65) Prior Publication Data

US 2019/0286805 A1    Sep. 19, 2019

Related U.S. Application Data

(60) Provisional application No. 62/728,016, filed on Sep. 6, 2018, provisional application No. 62/642,584, filed on Mar. 13, 2018.

(51) Int. Cl.
  *G06F 21/00* (2013.01)
  *G06F 21/34* (2013.01)
  *G06F 21/32* (2013.01)

(52) U.S. Cl.
  CPC .............. *G06F 21/34* (2013.01); *G06F 21/32* (2013.01)

(58) Field of Classification Search
  CPC ................................ G06F 21/34; G06F 21/32
  See application file for complete search history.

(56) References Cited

U.S. PATENT DOCUMENTS

| | | | | |
|---|---|---|---|---|
| 2002/0186838 | A1* | 12/2002 | Brandys | H04L 9/3231 380/30 |
| 2007/0220273 | A1* | 9/2007 | Campisi | G06Q 20/3574 713/186 |

(Continued)

FOREIGN PATENT DOCUMENTS

| | | |
|---|---|---|
| KR | 101755285 B1 | 7/2017 |
| WO | 2010033116 A1 | 3/2010 |

OTHER PUBLICATIONS

International Preliminary Report on Patentability for related PCT Application No. PCT/US2019/022111 dated Sep. 24, 2020 in 9 pages.

(Continued)

*Primary Examiner* — Jeffrey C Pwu
*Assistant Examiner* — William A Corum, Jr.
(74) *Attorney, Agent, or Firm* — Procopio, Cory, Hargreaves & Savitch LLP

(57) ABSTRACT

Systems, devices, and methods for secure data management and transfer for secure data transactions are provided. For example, disclosed herein are secure & tamper resistant smart cards configured to immutably store data and securely exchange at least a portion of the data via, for example, wireless networks and/or peer-to-peer networks. The smart cards comprise a plurality of dedicated hardware circuit blocks electrically coupled via a bus interconnection, the plurality of dedicated hardware circuit blocks configured to authenticate users, verify trust amongst the smart card and external devices, and encrypt sensitive data for secure transmission.

38 Claims, 18 Drawing Sheets

(56) References Cited

U.S. PATENT DOCUMENTS

| | | | | |
|---|---|---|---|---|
| 2011/0047036 A1* | 2/2011 | Foran-Owens | G06Q 20/3823 | 705/17 |
| 2012/0130905 A1* | 5/2012 | Tsudik | G07F 7/0846 | 705/75 |
| 2012/0191612 A1* | 7/2012 | Spodak | G06K 19/07707 | 705/65 |
| 2013/0065564 A1* | 3/2013 | Conner | G06K 19/0718 | 455/414.1 |
| 2014/0006277 A1* | 1/2014 | Rao | G06Q 20/4012 | 705/41 |
| 2014/0093144 A1 | 4/2014 | Feekes | | |
| 2014/0367474 A1* | 12/2014 | Radu | G06K 19/07705 | 235/492 |
| 2015/0097037 A1* | 4/2015 | Narendra | G06K 19/07701 | 235/488 |
| 2015/0127553 A1* | 5/2015 | Sundaram | G06Q 30/0233 | 705/72 |
| 2015/0178718 A1 | 6/2015 | Liu et al. | | |
| 2015/0199673 A1 | 7/2015 | Savolainen et al. | | |
| 2016/0307088 A1* | 10/2016 | Wurmfeld | G06K 19/07381 | |
| 2017/0344795 A1* | 11/2017 | Zhou | G06F 21/32 | |
| 2018/0018704 A1* | 1/2018 | Tunnell | G06Q 30/0269 | |
| 2018/0101669 A1* | 4/2018 | Benoit | G06K 9/0061 | |
| 2018/0218192 A1* | 8/2018 | Suwald | G01D 5/24 | |
| 2018/0219680 A1* | 8/2018 | Kamal | H04L 9/3231 | |
| 2018/0225459 A1* | 8/2018 | Zarakas | G06F 21/86 | |
| 2019/0065919 A1* | 2/2019 | Maheshwari | G06K 19/0718 | |
| 2019/0251236 A1* | 8/2019 | Lowe | G06K 9/00926 | |

OTHER PUBLICATIONS

International Search Report and Written Opinion for related PCT Patent Application No. PCT/US2019/022111 dated Jun. 25, 2019; (11 pages).

* cited by examiner

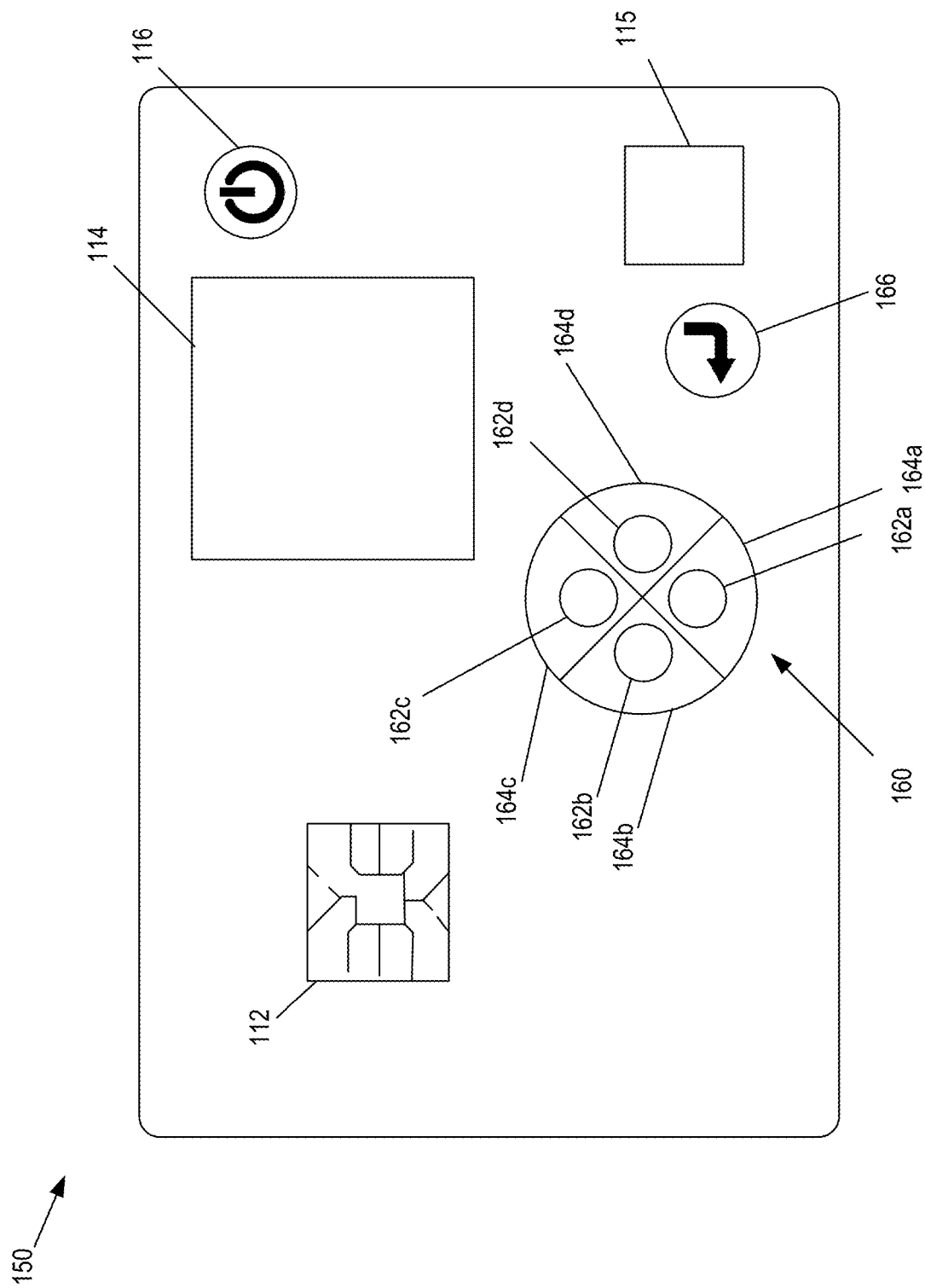

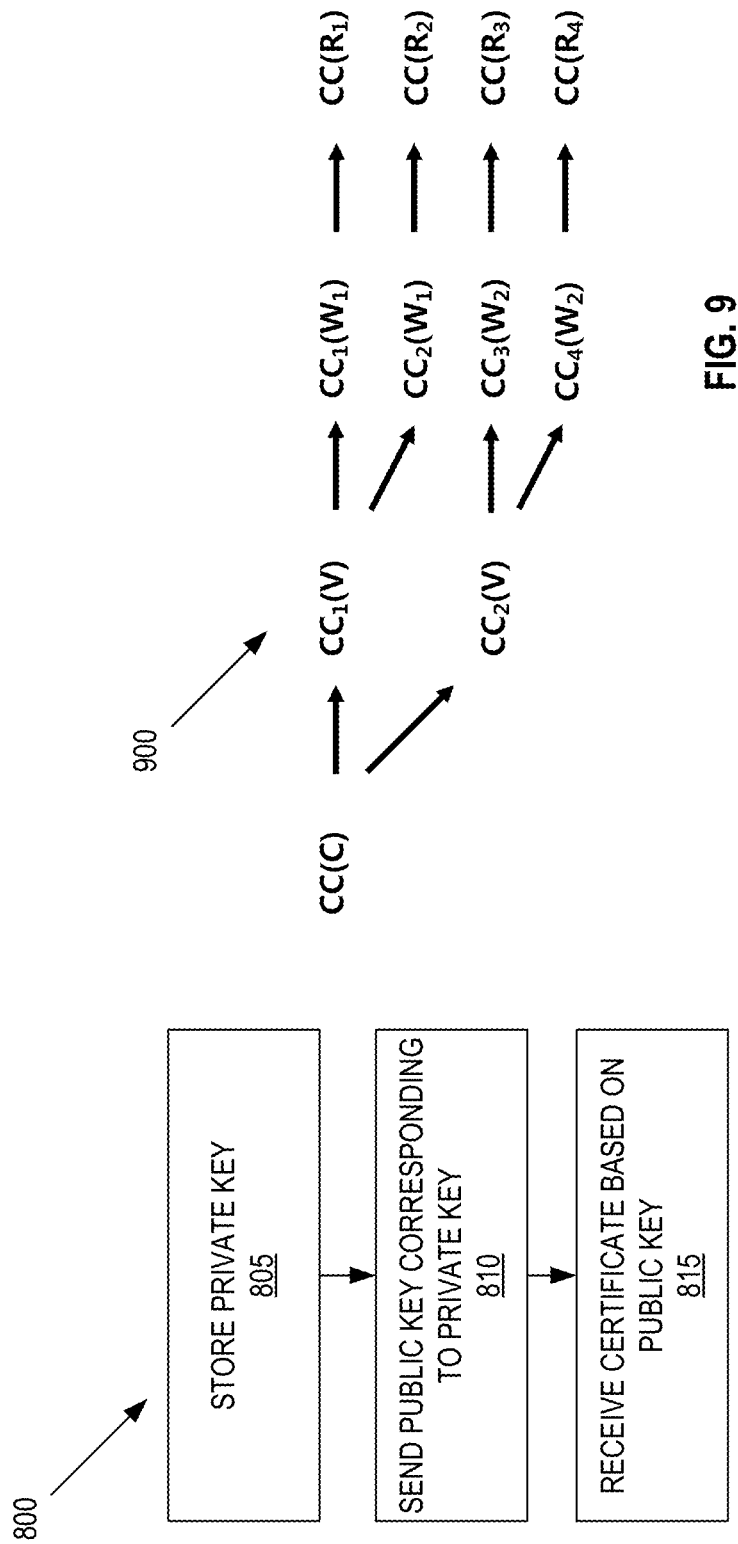

SECURE TAMPER RESISTANT SMART CARD

CROSS-REFERENCE TO RELATED APPLICATIONS

This application claims the benefit of U.S. Patent Application No. 62/642,584, filed on Mar. 13, 2018, and U.S. Patent Application No. 62/728,016, filed on Sep. 6, 2018, the disclosures of which are each incorporated herein in their entirety by reference.

TECHNICAL FIELD

The embodiments described herein are related to smart card systems, in particular to smart cards for performing secure data storage, exchange, and processing.

BACKGROUND

Biometric Smart Cards (BSC) are plastic cards used for identification, verification and communication of such information to other systems for the purposes of identity verification, payment authorization, access control, and etc. Such BSCs may incorporate various processors and components for performing the functionality of the card, for example, biometric sensing, processing, displaying information, inputting data, managing connectivity to external devices, and managing power usage. BSCs may connect to external systems and devices via wireless or wired connections for physical or data access.

Some current BSC implementations require discrete chips programmed to perform the functions above requiring a separate microcontroller units (MCU) for each function. For example, application processing, connectivity control and management, display control, etc. conventionally require separate MCUs needed to control each function. Furthermore, user registration and verification algorithms use heuristics that require algorithms for the functionality to use separate MCUs. As such, integrating all of the functions above results in significant power consumption and management challenges or otherwise restricting the functionality of the BSC.

Additionally, some current BSC implementations have limited space for implementing user interfaces required to input data or make selections that are visible on displays on such a BSC They electromechanical push button for input of alpha numeric data and or selection of menu options displayed on screens on such BSCs. Alternatively such BSCs use communications with other devices where the user interface is handled such as connecting via wired or wireless links to mobile devices, PC or other terminals that provide conventional user interfaces. For security reasons it's preferable to perform all user interface functions on such a biometric smart card to avoid malware or attacks that can exploit user interfaces that are on mobile devices or PC or external terminal that is vulnerable to such malware unlike the BSC. Electro mechanical interfaces on biometric smart cards result in finger fatigue for more verbose user interface functions such as alpha numeric input.

Therefore, what is needed are devices and systems that overcome these significant disadvantages found in the aforementioned BSC devices.

SUMMARY

Disclosed herein are devices, systems and methods for secure data management and transfer for secure transactions are provided. Furthermore, disclosed herein are secure & tamper resistant smart cards configured to immutably store data and securely exchange at least a portion of the data via, for example, wireless networks and/or peer-to-peer. The smart cards disclosed herein provide for ultra-low power consumption in part due to integration of a plurality of secure, discrete integrated circuit blocks configured to securely interface with each other to provide authentication and cryptographic functionality, as well as with sensors, input interfaces, a display, communication components, and power modules.

According to one aspect, a smart card for securely exchanging information with an external device is provided. The smart card comprises a plurality of dedicated hardware circuit blocks electrically coupled via a bus interconnection. The plurality of dedicated hardware circuit blocks comprises: communication circuitry comprising an antenna and configured to transmit and receive information via wireless communication over a network; an identification input circuitry configured to capture user credentials from an interaction by a user with the smart card; cryptographic circuitry configured to generate encryption parameters for the smart card, digitally sign digital certificates of the smart card based in part on the encryption parameters, and authenticate digitally signed certificates received from external devices; memory circuitry configured to store an identification template corresponding to a registered user of the smart card, sensitive information, the encryption parameters, and the digital certificates of the smart card; identification circuitry coupled to the memory via a bus interconnection and electrically coupled to the identification input circuitry, the identification block configured to authenticate that user credentials received from the identification input circuitry correspond to the registered user based on a comparison of the received user credentials against the identification template retrieved from the memory circuit, and a microcontroller comprising one or more processors. The microcontroller is configured, in response to authenticating the user: access the sensitive information stored in the memory, verify trust with the external device based, in part, on receiving one or more digitally signed certificates from the external device and authenticating the one or more digitally signed certificates based in part on the encryption parameters, encrypt at least a portion of the sensitive information using the encryption parameters, certify the encrypted portion of the sensitive information based on digitally signing the digital certificates stored in the memory, and transmit the certified encrypted portion of the sensitive information to the external device via the antenna of the communication circuitry.

In another aspect, a method for securely exchanging information with an external device is provided. The method comprises: authenticating, by identification circuitry of a smart card, that user credentials received from identification input circuitry of the smart card correspond to a registered user based on a comparison of the received user credentials against an identification template corresponding to the registered user retrieved from a memory circuit of the smart card, wherein the memory is coupled to the identification block by a bus interconnection; in response to authenticating the user and by a microcontroller of the smart card coupled to the memory, the identification circuit, and a circuitry by the bus interconnection: accessing sensitive information stored in the memory; verifying trust with the external device based, in part, on receiving one or more digitally signed certificates from the external device and authenticating the one or more digitally signed certificates based in part on encryption parameters stored in the memory; encrypting at least a portion of the sensitive information using the encryption parameters; certifying the encrypted portion of the sensitive information based on digitally signing one or more digital certificates stored in the memory; and transmitting, over wireless communication, the certified encrypted portion of the sensitive information to the external device via an antenna of communication circuitry included in the smart card.

Other features and advantages should become apparent from the following description of the preferred embodiments, taken in conjunction with the accompanying drawings.

BRIEF DESCRIPTION OF THE DRAWINGS

Features, aspects, and embodiments are described in conjunction with the attached drawings, in which:

FIGS. 1A-1E are schematic diagrams illustrating example smart cards in accordance with example embodiments;

FIG. 8 is a flowchart illustrating a method for assigning certificates to a smart card in accordance with an example embodiment.

FIG. 9 illustrates an example certificate chain in accordance with an example embodiment.

DETAILED DESCRIPTION

Figure 1A:
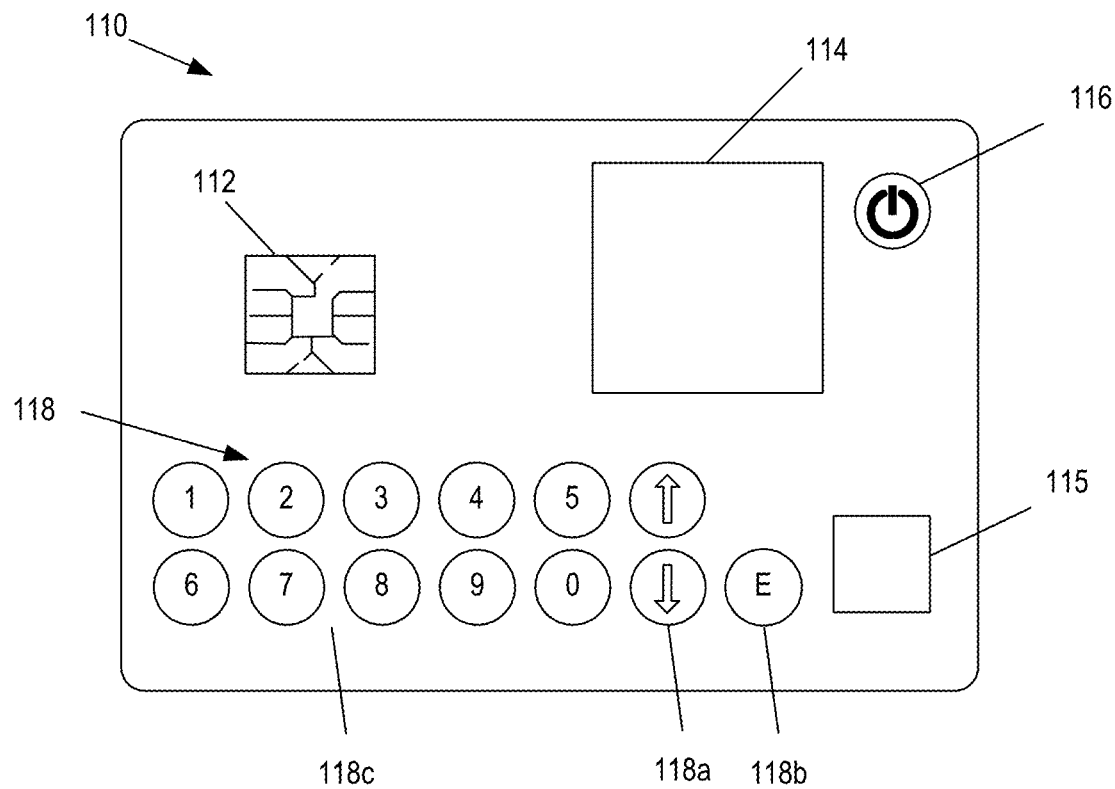

While certain embodiments are described, these embodiments are presented by way of example only, and are not intended to limit the scope of protection. The methods and systems describe herein may be embodied in a variety of forms. Furthermore, various omissions, substitutions, and changes in the form of the example methods and systems described herein may be made without departing from the scope of protection.

Embodiments herein relate to smart cards and/or biometric smart cards (BSC), which may be referred to interchangeably as smart cards or BSC. In some embodiments, smart cards are cards (e.g., plastic, metal, etc.) that incorporate biometric sensing, processing, display, input, connectivity and power source and management for identification, verification and communication of such information to other systems for the purposes of identity verification, payment authorization, access control and the like. Such smart cards incorporate various communication protocols, including but not limited to, Europay, MasterCard and Visa (EMV); near-field communication (NFC), Bluetooth (BLE), USB, Wi-Fi, etc. as means of connecting to and communicating with external systems and devices. Example external systems and devices includes, but is not limited to, credit/debit networks, point-of-sale systems, crypto currency exchanges (e.g., distributed ledger technology systems), mobile or PC clients, other smart cards accordance with the present disclosure, or relevant access control systems for physical or data access.

The combination of various forms of identity verification provides a multi-factor authentication resulting in high security and reduction of fraud for applications above. For example, biometric verification may be combined with one or more pass-phrases (e.g., a pin, pass word and/or phrases, or unique keystroke) and physical presence of the card may provide three-factor authentication (3FA). Other multi-factor verifications are possible, for example, 2FA where biometric verification can be combined with one of the pass-phrases or the presence of the card. Additionally, such cards may be used with a mobile device or other external device (e.g., PC, tablet, smart watch, another smart card in accordance with the present disclosure, etc.) to provide additional authentication by sending verification messages through email, MMS, RCS, etc. to the devices or accounts that only a user of the device and card can access.

Various implementations of smart cards attempt to perform both registration and authentication of biometrics to reduce vulnerability to a man-in-the-middle attack. Current implementations achieve such by storing biometric templates on a card and perform authentication on external devices. One non-limiting advantage of embodiments described herein is that vulnerability can be further reduced by localizing the authentication procedure to the embodiments described in the present disclosure, for example, by refraining from transmitting any biometrics outside of the system and/or specific circuit blocks that require such information for performing their specific functions.

Security vulnerabilities and opportunities for data breach may be further reduced by minimizing the reliance on complex software stacks to provide the functions described above. For example, various embodiments described herein may be configured to implement a hardware chip set using various logic blocks to sequentially perform the functions of the smart card. Thus, the cards described herein may be made tamper-proof because physical tampering would damage the chip sets and destroy the data and functionality therein. Various embodiments described herein comprise an integrated system-on-a-chip (SoC) comprising various sequential logic blocks for performing a plurality of the above functions. Thus, in some embodiments, each logic block may be sequentially activated and deactivated as needed, thereby reducing the power requirements of the devices herein. The SoC may be implemented as a single substrate comprising the various functions as logic blocks.

Various embodiments of the integrated SoC (for example, as described in connection to FIG. 3A and 3B and throughout the present disclosure) may be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

As noted above, by integrating all of the functions required of a smart card results in significant power consumption challenges. Conventional implementations have solved these challenges by relying on an external power source (e.g., inductive coupling via NFC or EMV from a terminal). Reliance on such external power sources restricts applications to terminals that provide for such functionality, BLE required allowing payment applications where the smart card can interact with another smart card via peer-to-peer ("p2p"), or a mobile device that doesn't have EMV capabilities. Such p2p and mobile device interaction can significantly broaden potential for a payment solution for developed markets as well as the unbanked markets where legacy ATMs or Point of Sale systems with EMV are not yet prevalent. Other conventional smart cards have utilized internal batteries; however due to the power requirements of such devices, battery life may be limited to a day in standby or ten (10) seconds worth of transaction time before recharging is required.

While some current implementations of smart cards can have limited display capabilities, identity verification methods can require display of photographic images of the user to be verified against their biometrics and other identifiers. Such graphics capabilities on a smart cards in turn requires graphics processing for onboard processing and display of images which also may drive processing requirement and power. Biometric processing on the smart card may require that the full process of enrollment and verification, including, but not limited to, image extraction from a biometric sensor, conditioning, minutiae detection and matching to all be conducted on the smart card. Accordingly, embodiments described herein provide for power conditioning and management functions which allow the smart card to be recharged via RF or other energy harvesting means.

Embodiments described herein may integrate one or more or all of the functions above into a single SoC designed to perform algorithms for all of various functions. For example, a SoC may be configured to integrate functions for driving a display, biometric sensor, cryptographic functionality, and interfaces for communication via one or more communication protocols. By utilizing a SoC, the embodiments herein may lend themselves to ultra-low power implementations. For example, in some embodiments, the cards described herein may require 1/10 of the power of current implementations or may be able to perform transactions over the course of six months to a year.

In some embodiments, a power management method is provided by using the integrated SoC. For example, the SoC may be configured to operate sections or logic blocks required to perform a needed function and deactivate (e.g., shut down the supply of power, signal power and clock) portions of the SoC that are not required. This may be performed in a timing sensitive fashion so as to not impede operation of the functionality of the SoC. This sequential operation of logic blocks may lead to a reduction in power requirements. In some embodiments, one or more of or a combination thereof of: integration of the functions above into a SoC, use of hardware acceleration (opposed to software), and power management may be facilitated by a microcontroller configured to set up state machines that may then perform the functions of the smart card. Once these tasks are set up via the scheduler, the microcontroller need not be used any further, thereby reducing power consumption in some embodiments.

One non-limiting advantage of the embodiments described herein, is that integrating all electronics into a SoC may facilitate operation of the smart card for years and thousands of transactions without recharging. Additionally or separately, the smart card various mechanical and energy harvesting techniques may be implemented such that a continually trickle of charge may be provided supplying additional power. In some embodiments, these features may lead to full power independence. Example harvesting techniques include, but are not limited to, the use of Piezo based buttons, photovoltaic cells, harvested RF energy, and mechanical motion configured to feed energy into the battery. The integration of the discrete electronics into a single SoC also may also dramatically reduce cost of production of smart card leading to more prevalent end applications.

As used herein the term "terminal" may refer to a device external and/or remote to embodiments of the devices and systems described herein. For example, a terminal may refer to any one or more or a combination of: servers on a wireless or cellular network, a credit/debit networks, point-of-sale systems, crypto currency exchanges, mobile or PC clients, other smart cards, devices on a p2p network, or relevant access control systems for physical or data access. For example, a terminal may be a credit/debit card reader at a physical store or a point-of-sale device operated by a merchant for purchasing items therefrom. Terminal may also refer to an access control system such as, for example, a card access system for entering restricted areas. For example, a smart card may include identification and restrictions associated with a user, and by placing the card near a terminal of the access system access to the restricted area may be provided based on verification of the identity of the user. This is not intended as an exhaustive list and is merely illustrative, other terminals are possible.

As used herein "transaction(s)" may refer to an exchange of data within hardware blocks of the smart card and/or between the smart card and external devices and/or terminals. For example, a transaction may be an exchange of messages for establishing communication between a terminal and a smart card. A transaction may also be an exchange of data authorizing a payment or transfer of funds from an account associated with the user of the smart card to the operator of the terminal. A transaction may also refer to an exchange of information for verification of an identity. A transaction could also refer to transmission of data from a memory of the smart card to communication circuitry and/or a display on the smart card. While examples are provided herein, it will be appreciated that a transaction may represent any exchange of data and/or information between embodiments herein and a terminal.

A. Smart Card Physical Embodiments

Various embodiments of smart cards in accordance with the present disclosure are secure & tamper resistant smart cards that are configured to immutably store data and securely transmit at least a portion of the data over network. Embodiments herein provide for smart cards that operate at ultra-low power consumption in part due to integration of a plurality of secure, discrete integrated circuit blocks configured to securely interface with each other to provide authentication and cryptographic functionality, as well as with sensors, input interfaces, a display, communication components, and power modules. In certain embodiments, the various integrated circuit blocks may be disposed on a plurality of discrete chips. In another embodiment, a plurality of integrated circuit blocks may be disposed on a single substrate, for example, as a SoC.

In some embodiments, the smart card may comprise a number of circuits. For example, the smart card my comprise communication circuity including an antenna configured to transmit and receive data via one or more wireless communication protocols. The smart card may also comprise identification input circuity configured to capture user credentials from an interaction by a user with the smart card. In some embodiments, the identification input circuity may comprise one or more of a biometric sensor and/or an input functionality as described below. The smart card may also comprise a memory configured to store an identification template corresponding to a registered user of the smart card, the restricted information and/or data, and encryption parameters. The smart card may also comprise cryptographic circuitry configured to encrypt data stored within the smart card based on encryption parameters, digital signatures, and/or one or more certificates as described below. The smart card may also include authentication circuitry configured to authenticate that user credentials received from the identification input circuitry correspond to the registered user based on a comparison of the received user credentials against the identification template retrieved from the memory circuit. Additionally, the smart card may include a microcontroller configured to, in response to authenticating the user, access the restricted information stored in the memory, encrypt at least a portion of the restricted information using the encryption parameters, and transmit the encrypted portion of the restricted information to the external device via the antenna of the communication circuitry. In some embodiments, the microcontroller may also be configured to establish a trusted connection and/or verify that the external device is a trusted device based on the encryption parameters, certificates, and/or digital signatures stored in the memory. Each of the above circuits may be electrically connected and/or coupled to each other via a bus interconnection.

In various embodiments, one or more of the above described circuits may be an integrated circuit block disposed on one or more substrates forming one or more chips. In some embodiments, each integrated circuit block may be disposed on a plurality of separate, discrete, and secure substrates (e.g., one for each integrated circuit). In another embodiment, a plurality of the above described integrated circuits may be disposed on a single substrate and in some embodiments all of the above described integrated circuits may be disposed on a single substrate. Thus, the combination of integrated circuits may be referred to as a secure tamper resistant circuit or secure element comprising a plurality of hardware blocks based on the integrated circuit blocks. By integrating a plurality of the integrated circuits into a single integrated circuit (e.g., as a SoC), the secure circuit may provide ultra-low power consumption and secure tamper resistant properties as described herein. Further, the substrate may be a single laminated substrate, thereby providing resistance to physical tampering with the circuit thereon.

These and other features and advantages should become apparent from the following description of embodiments herein.

FIGS. 1A-1D are schematic diagrams illustrating example smart cards in accordance with one example embodiment of the smart cards described above. FIG. 1A illustrates a view of a smart card 110 that may be used, for example, for performing secure transactions. Smart card 110 may comprise a chip 112, a display 114, a biometric sensor 115, input functionality 118, and a power button 116. Additional functionality may be included.

In various embodiments, the smart cared 110 may be a flexible smart card comprising multiple layers body or housing. The housing may be made of a metal, polymer, plastic material, etc. The housing includes at least one first surface and a second surface opposite thereof. The first surface may be the surface as illustrated in FIG. 1A. In various embodiments, the first surface may be the top surface. Alternatively, the first surface may be the back surface. The housing may also include a plurality of side surfaces extending between the first and second surfaces, thereby forming an enclosure. The enclosure may encompass some or all of the components of the smart card 110.

In some embodiments, the chip 112 may be a microprocessor chip configured to store and protect data associated with a user of the smart card 110. In some embodiments, the chip 112 may be a Europay, MasterCard® and Visa® (EMV) chip for performing transactions between the smart card 110 and a point-of-sale terminal (not shown).

In some embodiments, alone or in combination, the smart card 110 may include communication circuitry. Communication circuity may be configured for wired or wireless communication via one or more communication protocols. In some embodiments, the wireless communication components may facilitate wireless communication over a voice and over a data network. The wireless communication components may comprise an antenna system, a radio system, and/or a baseband system. For example, the smart card may comprise one or more of a USB connection interface, a Wi-Fi direct chip, a cellular (e.g., GSM, CDMA, etc.) connectivity chip, a BLE antenna, a NFC antenna, an RFID antenna, etc. In some embodiments, the communication components may be disposed on the first surface of the housing or within the housing. Radio frequency ("RF") signals may be transmitted and received over the air by the antenna system under the management of a microprocessor (as described below in connection to FIGS. 3 and 13). The antenna system may comprise a Wi-Fi transceiver system, a cellular connectivity system (e.g., 3G, LTE 4G, 5G, GSM, CDMA, Narrowband Internet-of-Things (NBIoT), etc.), a Bluetooth (BLE) antenna system, near-field communication (NFC), and/or any other radio-frequency (RFID) antenna system. In some embodiments, an NFC antenna system may comprise an antenna and/or coil embedded within the housing that may receive power from an external coil via inductive coupling. In some embodiments, a BLE antenna may lend itself to hardware implementation and power management features that provide for optimal power usage, thus reducing power requirements by a factor of up to approximately 10. In various embodiments, the communication circuitry may be configured to provide a local area network (LAN) and/or personal area network (PAN) for secure exchange of information. The communication circuitry may also be configured to facilitate secure communication of information over a wide area network (WAN) or p2P mesh network.

The display 114 may be any display configured to produce one or more images. In various embodiments, the display 114 is embedded in one of the layers of the housing and viewable via at least one surface (e.g., the first surface as illustrated in FIG. 1A). However, other configurations are possible. In some embodiments, the display may provide images related to functionality and/or transactions to be performed by the smart card 110. For example, the display 114 shows a "pay" functionality, "authorize" functionality, "register" functionality, "decline" functionality, or any ability of the smart card 110. In some embodiments, the user may operate the input functionality 118 (as described below)

to select options on the display. In some embodiments, alone or in combination, the display may provide an image of the user for use in verification and authorization of transactions. The display may be any one of a LCD, LED, OLED, e-Ink, ELD, etc. display. In some embodiments, one or more indicators (not shown) may be provided in the smart card 110 for indicating a status to user, for example, via an LED or light. The indicators may be used in replacement of or in conjunction with the display 114.

In various embodiments, the smart card 110 includes identification circuitry. In various embodiments, identification circuity may comprise a biometric sensor 115. The biometric sensor may be a transducer configured to convert a user input into an electrical signal for authenticating and/or registering the user of the device. The biometric sensor 115 may be a biometric sensing array comprising a plurality of sensing components. The user input may include, for example but not to be limited to, a fingerprint, eye or iris, face, voice, etc. that is unique to the user. In some embodiments, the biometric sensor 115 may be a flexible finger print sensing surface positioned in substantially the same surface of the housing as the display 114 (e.g., the first surface in some embodiments). The biometric sensor 115 may be covered by a coating to allow the sensor to perform its function of capturing biometrics, such as finger print features, through capacitive, ultrasonic, or thermal methods.

In some embodiments, the smart card 110 may be configured to determine whether the smart card 110 is operated by a living person. For example, the smart card 110 may include one or more galvanic skin response sensing pads disposed next to or within the biometric sensor 115 and electrically coupled thereto, for example, on the same plane as the surface of the housing to determine if a living person is connected to the sensor. Additionally, or alternatively, a temperature sensor may be included and located next to or within the biometric sensor 115 to determine if a live person is connected to the sensor.

Alternatively or in combination, the identification circuity may comprise a camera (not shown) using full color or infra-red sensors to detect the user's eye or face as user inputs. Additionally, or alternatively, the identification circuity may be a microphone (not shown) configured to capture a user voice input. The identification circuitry may be one or more of anyone of the above described or otherwise known methods of sensing a biometric input from a user, such that the input is uniquely associated with the user.

In some embodiments, the smart card 110 may also include one or more accelerometers or inertial sensors (not shown) embedded in the housing of the smart card 110. Such sensors may be configured to detect and determine movement of the smart card 110. For example, the sensors may be able to detect a rate of change in acceleration and/or direction. In some embodiments, the sensors may be one or more (or a combination thereof) of a single axis, two-axis, and/or three-axis inertial sensor. In some embodiments, these sensors may be configured to detect motion; such smart card 110 may be used for performing transactions based on motion, for example, through tapping or waiving of the smart card 110. For example, the accelerometers can be used to detect how a user is holding the smart card. As such the whole card can act as a joystick allowing the user to move a selection indicator on the display and then use the button to make a selection. Such movement can be detected by the accelerometer as changes to the gravity and used to indicate which direction on the visual menu the users is choosing to move a selection indicator. In some embodiments, once the desired selection is reached the user may level the card and press a selection button. Thus, for example, accelerometers and/or inertial sensors may be another input method. Other functions are possible.

Figure 13:
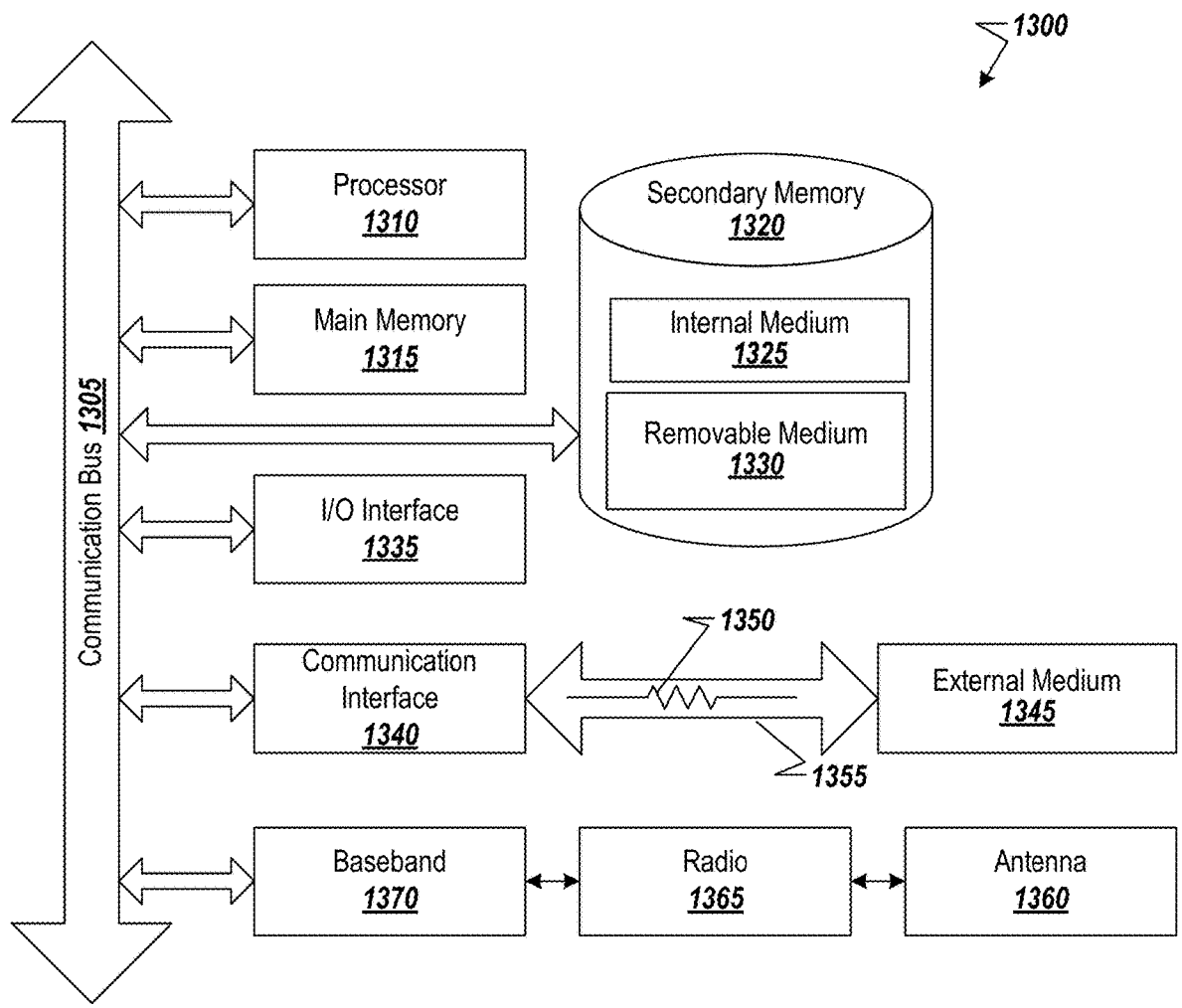
FIG. 13 is a schematic block diagram illustrating an example processing system for use in one or more systems described herein in accordance with various embodiments.

In some embodiments, the smart card 110 may also include an input/output ("I/O") interface (for example, I/O Interface Block 335 of FIG. 3 and I/O interface 1385 of FIG. 13). The I/O interface facilitates input from and output to external devices. For example the I/O interface may receive input from a keyboard or mouse and may provide output to a display. The I/O interface is capable of facilitating input from and output to various alternative types of human interface and machine interface devices alike. For example, the I/O may include a plurality of magnetically coupled connection areas comprising one or more pads to connect to a USB connector or other similar electrical interface on at least one of the surfaces of the housing.

The input functionality 118 may be configured to allow the user to physically interact with and input information into the smart chip 110. The input functionality 118 may comprise an alphanumeric keypad and at least one selection key 118*b*. The alphanumeric keypad may include a numeric keypad key pad 118c including a plurality of numeric keys, a directional key pad 118*a* including one or more directional keys (e.g., an up and down key as illustrated in FIG. 1A). The input functionality 118 may be disposed on the first surface of the housing or any other surface of the smart card 110. In some embodiments, the input functionality 118 may comprise a piezo-electric material layer configured to create an electrical connection upon interaction by the user, which may then be detected by the smart card as an input.

In some embodiments, this may allow users to navigate menus displayed in the display. For example, as illustrated in FIG. 1A, the input functionality 118 may comprise an alphanumeric keypad and control buttons that allow the input of pin codes, pass-phrases, passwords, unique keystrokes, amounts of transactions, confirmations, rejections, and/or any other input command for managing transactions and storage of data in the smart card 110. Accordingly, the input functionality 118 may be another example of identification circuity. In another embodiment, alone or in combination, the display 114 may render graphics, images, and/or text that the user can see, use directional keys 118*a* to navigate through these images, and use selection button 118*b* to make a selection.

While the input functionality 118 is shown as a numeric key pad, other embodiments are possible. For example, the input functionality 118 may comprise only letters and/or a combination of letters and numbers. Furthermore, other directional input keys may be used, beside only up and down. Further still, FIG. 1A illustrates the selection button 118*b* as a key pad "E" which may be a "Enter" or "Return" function, however a "back" or "delete" function or other functions may be included. In some embodiments, the selection button 118*b* may have time sensitive settings, where shorter duration pressing may result in one function and longer pressing may result in alternate functions. Additional examples are illustrated in FIGS. 1C and 1D below.

The smart card 110 may also include a battery (for example as shown in FIG. 3) configure to supply power to the smart card 110 and the components therein. In some embodiments, power may be provided to the smart card 110 in response to a user interacting with the power button 116. The battery may be a thin flexible battery disposed within the housing of the smart card and electrically connected to one or more of the components. In some embodiments, alone or in combination, the smart card 110 may include one or more super capacitors embedded in one of the layers of the housing for storing power. In some embodiments, alone or in combination, the smart card 110 may comprises one or more (or an array of) photovoltaic cells that absorb light from the surroundings and generate energy for powering the smart card 110. While examples of power supplies are provided herein, other methods of supplying power are possible. For example wired connection to an external power source, wireless charging via near field and/or far-field wireless energy power supplies, and/or mechanical and/or thermal energy sources. In some embodiments, by using one or more or a combination thereof of super capacitors, wired and/or wireless power supplies, photovoltaic cells, and/or mechanical and/or thermal sources may lead to extended battery life and or energy independence of the smart card 110.

In various embodiments, the smart card 110 may include an integrated system-on-a-chip (SoC) within the housing. The SoC may be configured to perform one or more, a combination, or all of the above identified features (as will be described in more detail below in connection to FIG. 3). For example, the SoC can be configured to perform: identification interfacing to capture identification credentials (e.g., biometric user credentials or others) from the identification circuity (e.g., biometric sensor 115 or others) as input by the user (for example, capacitive, ultrasound, or thermal); authentication functions for generating a identification template for registration and authentication of users (e.g., as described below in connection to FIG. 6). For example, receiving biometric credentials (e.g., a finger print or other biometric) entered into the identification circuit for registration, to generating a biometric template therefrom, and, for authentication, comparing received biometric credential (e.g., finger print or other biometric) to a database of identification templates of registered user. The SoC may also be configured to perform wireless communication functions via the communication circuitry; all digital processing functions for management and operation of the wireless communication; NFC RF interfaces and functions to interface with an NFC antenna and coil: and all digital processing function for NFC functions; RFID RF interfaces and functions to interface with a RFID antennal, all RFID interface functions to perform RFID transactions; graphics interfaces and processing functions to drive the display 114, USB interface functions; encryption and hashing functions for secure data communication and transactions, power management and power conditioning functions; reception and processing of user interactions with the input functionality 118; and all memory management necessary to perform the functions above.

In some embodiments, the SoC may be configured to integrate functions for driving the display 114, biometric sensor 115, cryptographic functionality via a cryptographic circuitry (as described below in connection to FIG. 3), and interfaces for communication via one or more communication protocols.

In some embodiments, cryptographic functionality may include utilizing one or more crypto-keys (e.g., sometimes referred to herein as private/public keys and encryption parameters) to secure data contained in the smart card. For example, smart cards disclosed herein may use physical unclonable functions (PUFs), unclonable certificates, and/or unclonable signatures on, for example, the SoC as keys to encrypt memory and/or data where private keys or other sensitive information may be stored. Such private keys may include, for example, private keys for system level encryption of communications over wireless communication protocols. Public keys for such encryption or crypto functions may then be generated (e.g., on the smart card or SoC) and used to establish encrypted and authenticated communications with external terminals or systems. Exemplary external terminals and systems may include, but are not limited to nodes on a distributed ledger technology (DLT) system (e.g., such block chain based systems) as described below, AES encrypted systems that required private/ public key management etc. If the chip is tampered with the PUFs may be altered such that the intruder is unable to decrypt the private keys and unable to access sensitive data. Further details regarding the cryptographic functionality are provided below.

In some embodiments, indications may be derived from user input via pins, pass phrases, and/or unique keystrokes and biometric verification which may be used for multi-factor authentication. Thus, the smart card 110 may be configured to individually activate (e.g., supply power thereto) and deactivate the various components (e.g., biometric sensor, authentication, EMV, BLE, RFID, etc.) to provide additional verification of the presence of the smart card 110 based on completion of the verification. In some embodiments, alone or in combination, an image of the authorized user may be stored in a memory, and access to the image may be granted only if the card is activated through the multi-factor authentication. Upon activating the smart card 110 through the authentication, the smart card 110 may be configured to send one or more signals to a terminal (e.g., a point-of-sale, access terminal, mobile device, etc.) that the card is interacting with. Based on the signals, the terminal may communicate to seek verification of the access (e.g., establishing of a trusted communication or confirmation that the smart card 110 is a trusted device as described below in greater detail) or transaction via mobile device, PC client or another terminal. In some embodiments, alone or in combination, a Wi-Fi transceiver connection or other cellular connectivity may not be powered or used unless the smart card 110 has been inserted into a smart dock (as described below in connection to FIG. 2), which may provide power for these communications. In some embodiments (as described below), the smart card 110 may also seek to confirm that the terminal and/or other external devices are trusted for communication, for example, via an exchange of encryption parameters, one or more certificates, and/or digital signatures.

In some embodiments, the smart card 110 may be a smart card configured to identity a user, verify the user, authorize transactions related thereto, and provide access control as described herein. As described above, the smart card 110 may include the biometric sensor 115, a microprocessor (not shown), display 114, input functionality 118, communication circuitry, and a power source for such identification, verification, and communicating the same. The wireless communication components provide connectivity to external systems such as credit/debit networks, point of sale systems, crypto currency exchanges, mobile or PC clients or relevant access control systems for physical or data access.

In various embodiments, the smart card 110 may employ a combination of biometric verification, along with user input pass-phrases or pins (via the input functionality 118), and the chip 112 to provide a three-factor authentication (3FA) resulting in high security and reduction of fraud for applications above. Furthermore, when used along with mobile devices, the smart card 110 can provide additional authentication capabilities by sending verification messages through email or SMS the mobile device (or accounts that only users could have access to).

In some embodiments, the smart card 110 may be configured to register a user and authenticate the user via biometrics to reduce man-in-the-middle attack vulnerability. For example, other implementations store biometric templates of the user on the card but perform matching on external devices by transmitting the biometric data.

As mentioned above, the smart card may also be made tamper proof. In some embodiment, this may be due to the smart cards described herein avoid using complex software stacks of mobile devices, PCs or servers reducing vulnerabilities of such systems. smart cards in order to provide the functions above and be useful for payment, credit/debit, crypto currency wallets, access control or identity verification need to provide processing for fingerprint training/matching, connectivity features that allow them to communicate with mobile devices (e.g. BLE, NFC, PAN, LAN, etc.), payment networks (EMV) and RFID for access control. The smart card furthermore needs to provide low power displays and input interfaces to provide for the applications they are addressing.

In some embodiments, the smart cards described herein may facilitate secure handling of private and/or public keys (e.g., sometimes referred to as encryption parameters) used for encrypted communications between the smart cards and external devices. For example, such communications may occur between the smart cards and mobile/PC clients or cloud networks when the connectivity is powered, for example by a smart dock as described herein or other connectivity source. Such secure handling may be achieved, at least in part, based on one or more tamper-proof strategies. Such strategies may comprise one or more of integration of sensitive functions on to a single SoC and/or unclonable signatures as keys. These encrypted interfaces may be combined with tamper proof features and multifactor authentication attributes to provide for secure communications. One non-limiting advantage of the secure communications is to provide secure communications between mobile apps and PC clients, which may permit the devices to connect to merchant acquirer or payment networks in a trusted manner. Trusted networks may be important for e-commerce transactions, where users rely on secure communications with point-of-sale terminal emulators. Additional details regarding the facilitating secure and trusted communications are provided below.

Figure 1B:
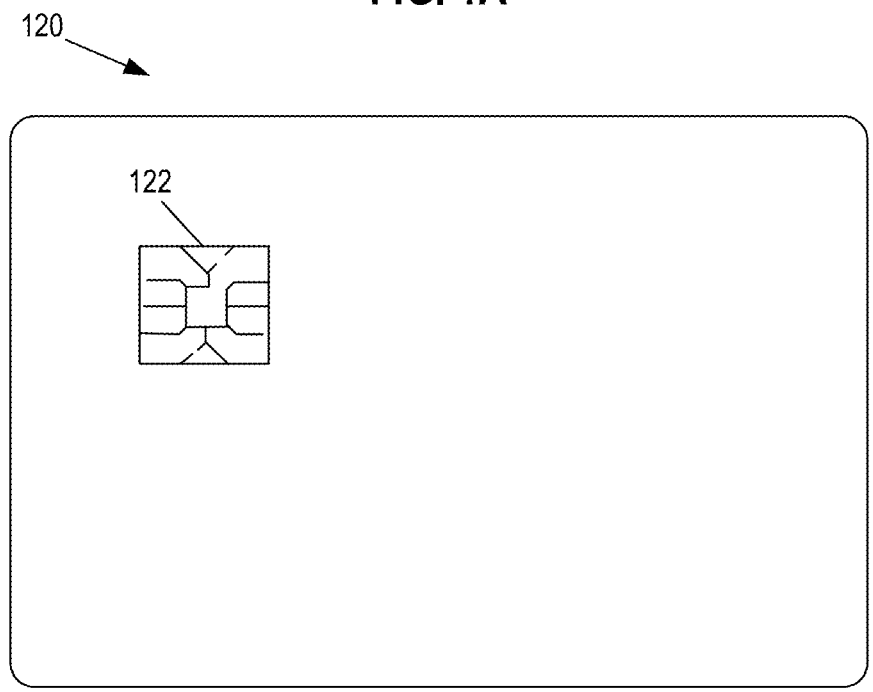
Figure 1C:
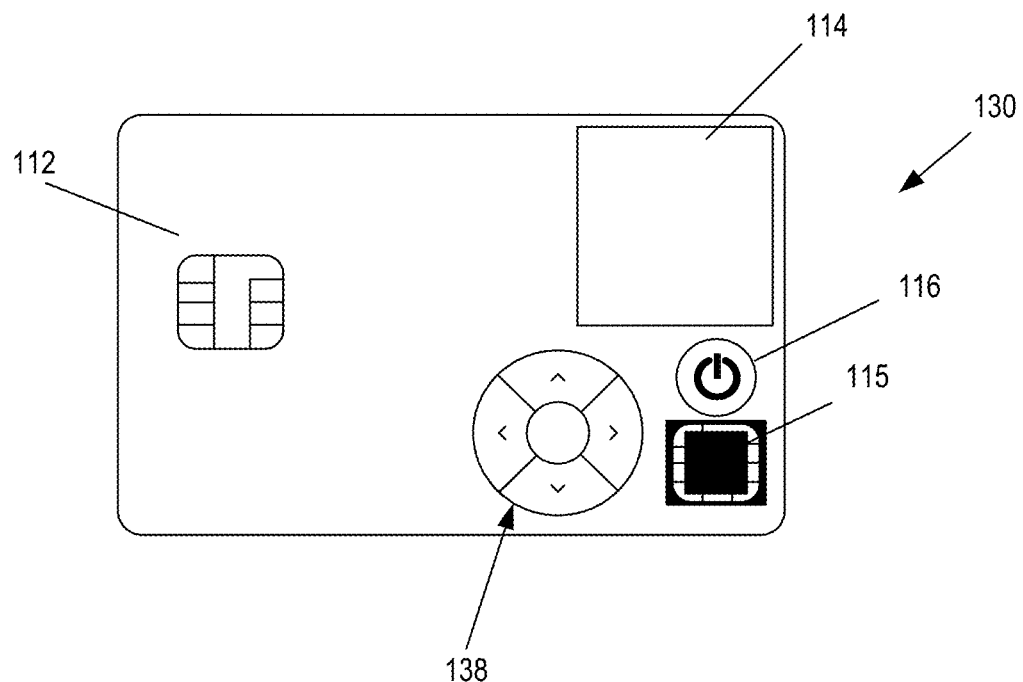
Figure 1D:
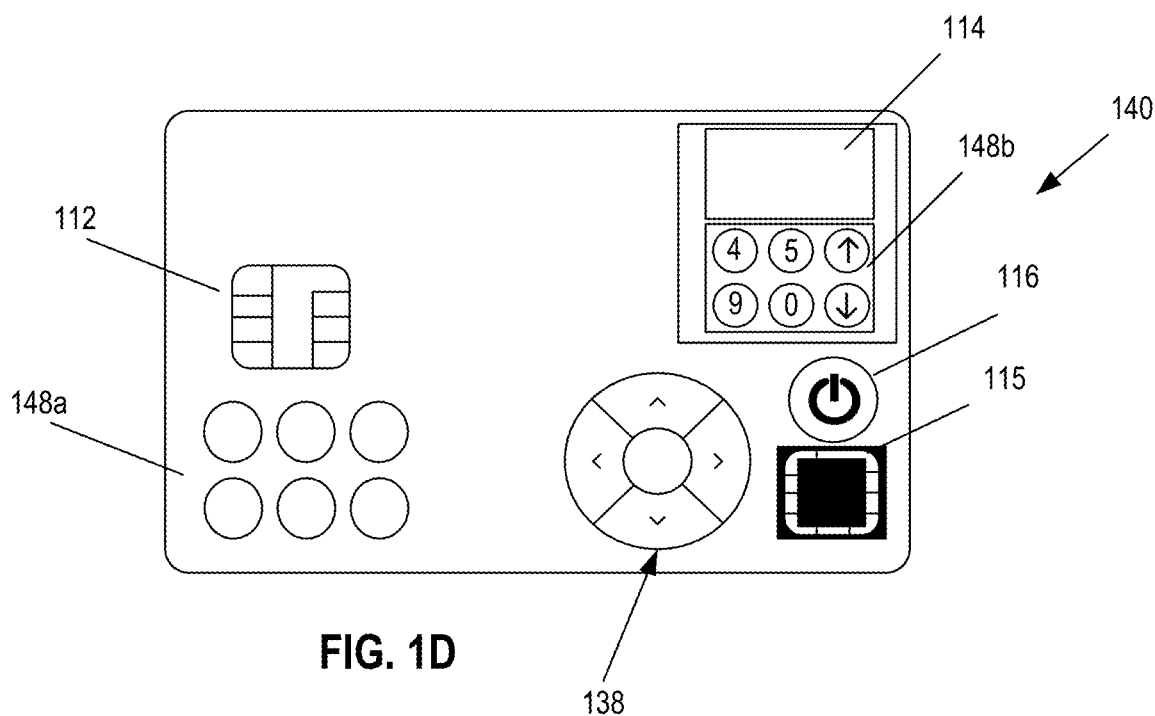

FIG. 1B illustrates a smart card 112 that may be used for performing secure transactions. Smart card 120 may be substantially similar to the smart card 110, but comprise less than all of the components described in connection to smart card 110. For example, smart card 120 may comprise a housing and a chip 122. The smart card 120 may also comprise one or more wireless communication components as described above. For example, the smart card 120 may include one or more of or a combination of a Wi-Fi transceiver system, a cellular connectivity system (e.g., 3G, LTE 4G, 5G, GSM, CDMA, NBIoT, etc.), a Bluetooth (BLE) antenna system, near-field communication (NFC), and/or any other radio-frequency (RFID) antenna system. In some embodiments, the smart card 120 may not include any of the means to input user authorization, for example, the smart card 120 may not include a biometric sensor, display, or input functionality.

In some embodiments, the smart card 120 may not be activated without authorization from the smart card 110. In some embodiments, smart card 110 may not include Wi-Fi or cellular connectivity capabilities, and may authenticate the user via the biometric sensor 115 and transmit a signal indicative of the authorization to the smart card 112 to activate the functionality thereon. For example, as described in connection to FIG. 6, the smart card 110 may comprise memory storing the biometric template. The smart card 110 is not activated for wireless or wired communication, thus the biometric template is securely stored. The user may input a biometric via biometric sensor 115 and the smart card 110 may perform authentication of the biometric. Additional authentication may also be utilized, for example, 2FA or 3FA or others as described above. Based on the authentication, a signal may be transmitted to the smart card 120 confirming authentication of the user, thereby facilitating activation of one or more components therein.

FIG. 1C illustrates another example smart card 130 according to embodiments described herein. Smart card 130 may be substantially similar to smart card 110. However, this embodiment may include a directional key pad 138 comprising a four directional buttons and a one or more of selection keys. For example, a central selection key may be disposed in the middle of all four direction keys, or alternatively or in combination each direction key may be a selection button. This embodiment may permit the use of the directional arrows and selection button to allow user to navigate menus displayed on the screen.

FIG. 1D illustrates another example smart card 140 according to embodiments described herein. Smart card 140 may be substantially similar to smart cards 110 and 130. However, FIG. 1D illustrates the smart card 140 as a hybrid of smart cards 110 and 130. For example, smart card 140 comprises the directional key pad 138 and selection buttons of smart card 130 that allows navigation of menus and a numeric key pad 148a of smart card 110. In one embodiment, the numeric key pad 148a may be an abbreviated key pad comprising fewer keys than the numeric key pad 118 that be used to facilitate entry of short cut key strokes. The display 114 can show the functions 148b of the keypads 148a in a first area of display 114 and the user can scroll to different templates which map the functions of the abbreviated key pad. The second area of display 114 may be configured to display images and/or data as described in connection to display 114 of smart card 110. Alternatively or in combination, the display 114 may be a touch sensitive display whereby the user may perform inputs on the display 114 for functions 148b.

While the embodiments described herein are made with reference to a smart card, it will be appreciated that other form factors are possible. For example, the functions and feature described herein may be integrated in the form factor of a ring or wearable watch. Other wearable electronic devices may be possible.

FIG. 1E is a schematic diagram illustrating an example smart card 150 in accordance with one example embodiment. For example, FIG. 1E may illustrate an embodiment of a smart card as described in accordance with the various aspects of the present disclosure, and as such may be used, for example, for performing secure transactions. Smart card 150 may be substantially similar to the smart card 110; thus Smart card 150 may comprise a chip 112, a display 114, a biometric sensor 115 and various user interface elements, such as, navigation functionality 118, and a power button 116. That is, in accordance with the present disclosure, the smart card 150 may comprise a biometric sensor 115 disposed on a surface of the smart card. The smart card may also comprise a display 114, internal power source (not shown), and one or more communication components configured for wired or wireless communication via o e or more communication protocol. In some embodiments, the smart card 150 may also include one or more inertial sensors, a temperature sensor, and/or galvanic response sensing pads to determine if a live person is connected to the biometric sensor.

As described above, a smart card may comprise a user interface (e.g., input functionality 118) whereby the user of the smart card may operate the input interface to control content displayed on a display. Furthermore, the user input interface may be operated by the user to make selections and control the functionality of the smart card. For example, in some embodiments, a smart card may comprise, in addition to or alternatively to the input functionality 118, a capacitive touch sensor having a sensing area (e.g., in the shape of a round sensing area in some embodiments) where a user can place their finger on the sensor and rotate around a dial to make selections displayed on a display. By pressing a selection region of the sensing area, a selection may be made. In some embodiments, the selection region may be a central region of a round sensing area.

For example, the user interface elements may include, in some embodiments, a touch sensitive capacitive sensor 160. In the illustrated embodiment, the capacitive sensor 160 may comprise a circular shape, however other configurations are possible, for example, a rectangular, oval, or any shape desired. The capacitive sensor 160 may comprise multiple sensing sectors 164a-164d. While FIG. 1E depicts four sectors 164a-164d, any number of sensing sectors may be applicable including less than four or greater than four. Furthermore, the sensing sectors need not be directly adjacent and may be spaced apart as desired. The capacitive sensor 160 may be low profile elements and covered with a coating. A user may be able to interact with one or more of the sensing sectors 164a-164d, which are detected by the sensor 160 to generate a signal to a controller. The controller in conjunction with one or more processors comprising firmware may convert the detected user inputs to operations, movement, and/or selections presented on the display 114.

In an example operation, a user can rotate their finger over the sensing area 160 and make changes to the position of their finger within the capacitive sensor 162 that are detected by the sensing sectors 164a-164d and displayed on the display 114 by the processing of the system described in our prior provisional. Selections that can be chosen by the user and are displayed may be context sensitive and may include menu options or alpha numeric selections related to the operation and functionality of the smart card 150. Each sector 164a-164d may include a central region 162a-162b and by pressing the central region 162a-162d of a given sensing sector 164a-164d a selection can be made by the user. Alternatively or in combination, in some embodiments, the user may press a central region of the sensor 160 (e.g., at an intersection point of the multiple sectors 164a-164d) to make a selection. In some embodiments, the navigation functional 118 may comprise or be a back button that allows user to exit a current user interface selection and return to prior menu options which may be context sensitive or hierarchical.

The capacitive sensor sectors 164a-164d may be formed by PCB traces in a multi-layer board with a ground plane on top and electrical components on the bottom. A ground plan may also be provided on the bottom layer surrounding electrical components. The capacitance sensed by the sectors 164a-164d can be converted by a controller (not shown) into digital measurements that are then used by firmware included in a processor to determine which sector 164a-164d is being activated. The transition from one sector to another sector will be interpreted by the firmware of the smart card to determine the user directed changes that can then be displayed on the display 114. The display 114 may be any display, including but not limited to, an e-paper display, LCD, LED, OLED, e-Ink, ELD, etc. The display may be utilized to present menu selections or alpha numeric selections through which the user may navigate and otherwise interact with via the sensor 160. Pressing the central region 162a-162d of a given sensing sector 164a-164d may result in several sectors being activated at the same time (e.g., inducing activation of neighboring sectors due to pressure from the user) which may signal a selection of the displayed item on the display 114. In some embodiments, the firmware may include filters to permit the system to detect and eliminate noise. The filters in the firmware may also be used to establish rate of movement (for example, rotational or translational) within, between, and/or around the sectors 164a-164d. For example, higher rate rotations will result in larger jumps between selection options in alpha numeric or other hierarchical menu selections. Lower rates will result in individual steps in menu or alpha numeric options. For example, selections having a low rate may be from a first selection to a directly adjacent selection while a larger rate may jump from the first selection to a third selection spaced apart from the first selection. The magnitude of the jump may be proportional to the magnitude of the rate of movement. The back button may allow return to prior menu options.

In addition to rotary sensing sectors, the touch sensitive area 160 can be rectangular in some embodiments and as opposed to capacitive sensing sectors there can be a matrix of capacitive elements which can locate the position of the users touch within the area 160 and the sensed position can result in selection of displayed menu items.

In some implementations, the sensor area 160 may cover a larger area of the smart card 160 than that illustrated in FIG. 1E. For example, the sensor area 160 may cover any percentage of the front area of the smart card. Thus, a larger area of the smart card may be an active touch sensing area that utilizes capacitive sensing embedded in a transparent layer. This area may be provided with a higher resolution to allow the cursor to be utilized on the display coordinated with user interactions of the active touch sensing area for pointing to various areas of the display and then tapping any portion of the sensing area to make a selection. In such implementations, a transparent layer may be implemented over the smart card including the display area where traces run through such a transparent layer providing capacitive sensing capabilities. A matrix of capacitive sensors can communicate user interactions to the controller to then localize where the cursor or pointer should be located.

In various embodiments described herein the sensing sectors' capacitive signals may be measured both in reference to ground and/or relative to each other. The sensing sectors capacitive signals can be interpreted by firmware to determine and improve signal to noise ratios and tune out parasitic sources of input. The firmware also may be configured to allow signals from each sector to be context sensitive (e.g., based on context of the content presented to the user). In all of the designs above touch by the user may not be required but bringing a user's finger(s) within proximity of the sensing sectors can be detected by measuring the capacitive variations. This configuration may facilitate a gesture interface that can allow users to interact with the device without actual contact. Furthermore, the firmware in conjunction with the capacitive sensors may be configured to recognize and process any number of user inputs, for example, one, two, three, four, etc. user inputs represented by any number of finger interactions with the sensors.

In any of the designs above the ground planes or capacitive sensing sectors may block various RF features of the smart card such as NFC due to real estate limitations of smart cards. As such, the ground planes may have slits or openings that allow NFC or other RF energy required for communications to pass through such ground planes.

In various embodiments, the smart card 150 may also comprise a back button 166. The back button 166 may be a capacitive touch sensitive and/or electro mechanic inputs.

As described above, smart card 150 may also integrate all of the functions above into a single SoC with a design to perform algorithms for all of various functions, as described in accordance with the various aspects of the present disclosure. For example, a SoC may be configured to integrate functions for driving the display and user input via the interface elements. By utilizing a SoC, embodiments herein lend themselves to low power consumption, fast processing speeds and lower cost requirements for SoCs. For example, by using the integrated SoC in conjunction with hardware implemented signal processing for sensing capacitive signals (e.g., from the sensor 160), firmware executed by processors in the smart card, power consumption, and/or power management schemes (for example, as described in in accordance with the various aspects of the present disclosure), embodiments herein may provide the above identified advantageous benefits of improved power management and processing speeds.

B. Smart Dock

Figure 2A:
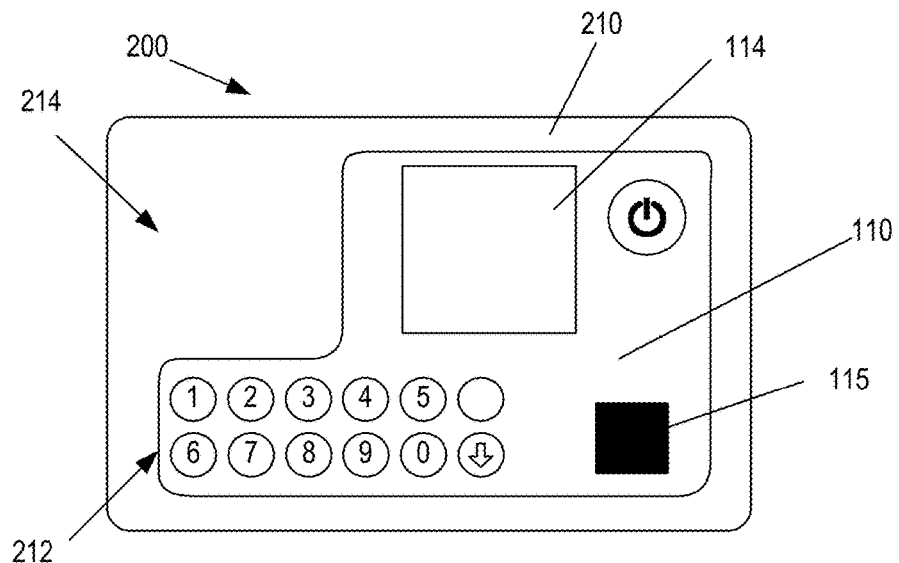
FIGS. 2A and 2B are screen shots illustrating a smart dock in accordance with one example embodiment.
Figure 2B:
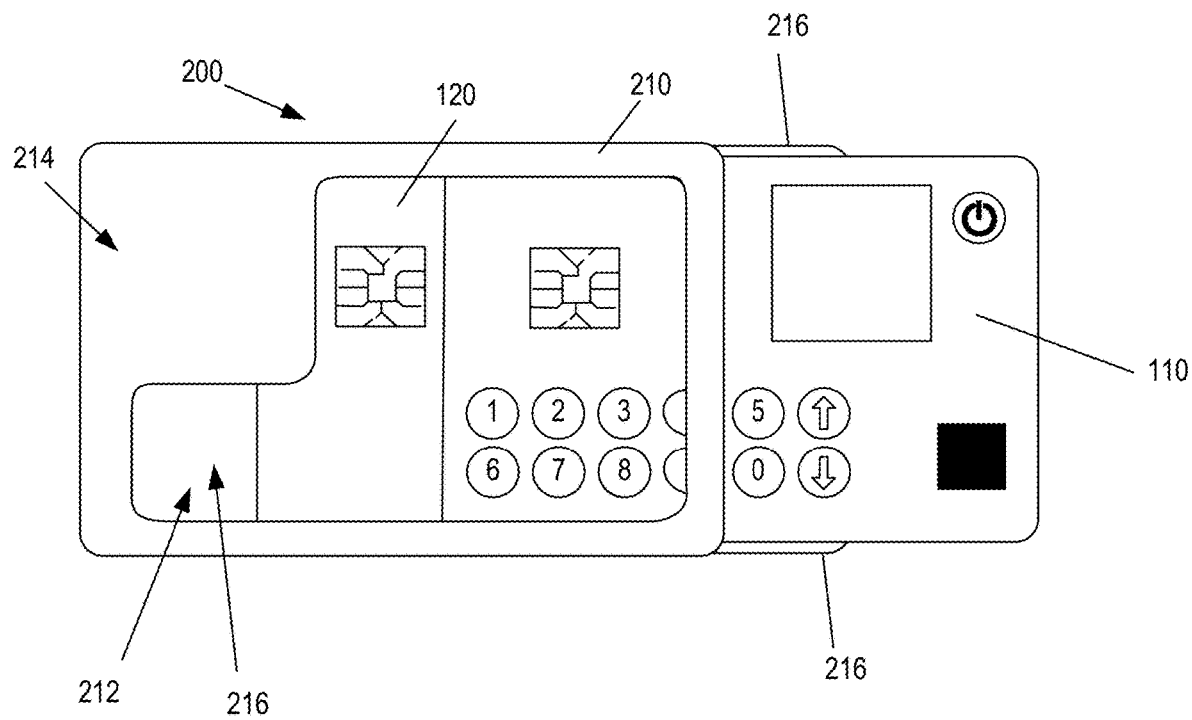

FIGS. 2A and 2B are screen shots illustrating a smart dock 200 in accordance with one example embodiment. The smart dock 200 may comprise a housing 210 configured to accept one or more smart cards, for example, through an opening sized to receive and interface with the smart cards therein. In various embodiments, the smart dock 200 may be structured so to accept two smart cards, for example, smart cards 110 and/or 120. In one embodiments, the smart dock 200 may accept the smart card 120 disposed underneath the smart card 110 (as shown in FIG. 2B). The smart dock 200 is configured to accept the smart cards such that a processor included in the housing may connect to each of the plurality of smart cards via one or more interfaces (e.g., connection pads disposed with the opening (not shown)) so to electrically or wireless connect to the microcontroller of each smart card and supply power thereto (e.g., via an internal power source or other external sources in accordance with the present disclosure). Accordingly, the smart dock may electrically couple to each smart card, and facilitate coupling between smart cards.

The housing 210 may be a low profile housing comprising a front surface and a back surface 216. The housing may comprise one or more of a plastic or metallic material. The front surface may comprise an opening 212 through which the contents (e.g., smart cards) may be viewable and through which the user may interact with. The back surface may comprise a battery (not shown). In some embodiments, the battery may be removable and, thus, replaceable. For example, a battery may be replaced with a new battery having longer life or larger power capabilities. While the description herein describes the battery in the back surface, other embodiments are possible, for example, the battery or a plurality of batteries may be included in the back, side or front surface. Furthermore, power may be provided via one or more other methods of as described above. For example, a wired connection between the smart cards and smart dock, wireless electrical coupling via near field and/or far-field wireless energy power supply, etc.

The front surface may comprise an overlap 214 configured to cover a portion of the contents. In some embodiments, the overlap 214 may be configured to overlap and/or cover the chip 112, 122 of the smart cards 110, 120 therein. The overlap may comprise one or more interfaces, e.g., contact points or pads for connecting to the smart cards 110, 120. In this way, the smart dock 200 may connect to the contents via the overlap. Alternatively or in addition, the smart dock 200 may include a USB or other interface for connecting to the smart cards therein. Thus, the smart dock 200 may be configured to charge smart cards via the connection to the internal battery. Furthermore, the smart dock 200 may be able to shield or otherwise block the smart card 110, 120 from outside connections via the overlap 214, which may be configured to interfere or otherwise minimize improper access to the data therein.

In some embodiments, the smart dock 220 may power one or more of the communication components of at least one smart card 110, 120 in response to accepting the smart card for performing secure transactions via one or more of the wireless communication protocols. That is, the smart dock 200 may be configured utilize the wireless connectivity provided by one or more of the smart cards 110, 120. For example, the smart cards may provide Wi-Fi, BLE, RFID, etc. wireless connectivity as described above. This may allow the smart dock 200 and/or the smart cards to connect directly to a network wirelessly to perform transactions. In some embodiments, the smart dock 200 and/or the smart cards may wirelessly connect to a mobile device, PC or terminals that support these wireless connectivity modes.

In some embodiments, the smart dock 200 may supply power to the communication components of each smart card contained therein based on connecting to the smart cards 110, 120. For example, in some embodiments, a Wi-Fi transceiver of the smart card may be powered by the smart dock 200 in response to the smart card being inserted into the smart dock 200. In some embodiments, alone or in combination, a BLE transceiver may be similarly activated.

In various embodiments, two or more smart cards may communicate with each other while inserted in the smart dock 220. For example, the smart dock 200 may be configured, based on insertion of the one or more smart cards 110, 120, to facilitate secure inter card access and/or copying of data between each of the smart cards via contact pads or other contacts and interfaces. The smart dock may accommodate RF requirements of the wireless connectivity described above.

In some embodiments, the smart card may authenticate a user via a biometric sensor while the smart card is inserted in and powered by the smart dock. For example, in some embodiments, the housing 210 may comprise a camera (not shown) configured to capture an image of the user. The image may be used for facial or iris recognition, which may be used for or as part of the biometric authentication process. In some embodiments, the camera is a lower power and low profile camera, such that it does not impact or substantially modify the weight and/or shape of the housing 210. The camera may be configured to operate in full-color and/or infra-red. In some embodiments, the housing 210 may also comprise any of the biometric sensors described in connection with biometric sense 115 above, and may be configured to communicate identification credentials received by the housing 210 to the authentication functionality of one or more of the smart cards 110, 120. In some embodiments, authentication within one smart card may provide access to the second without a second authentication process.

C. Secure Element Implementation(s)

Figure 3A:
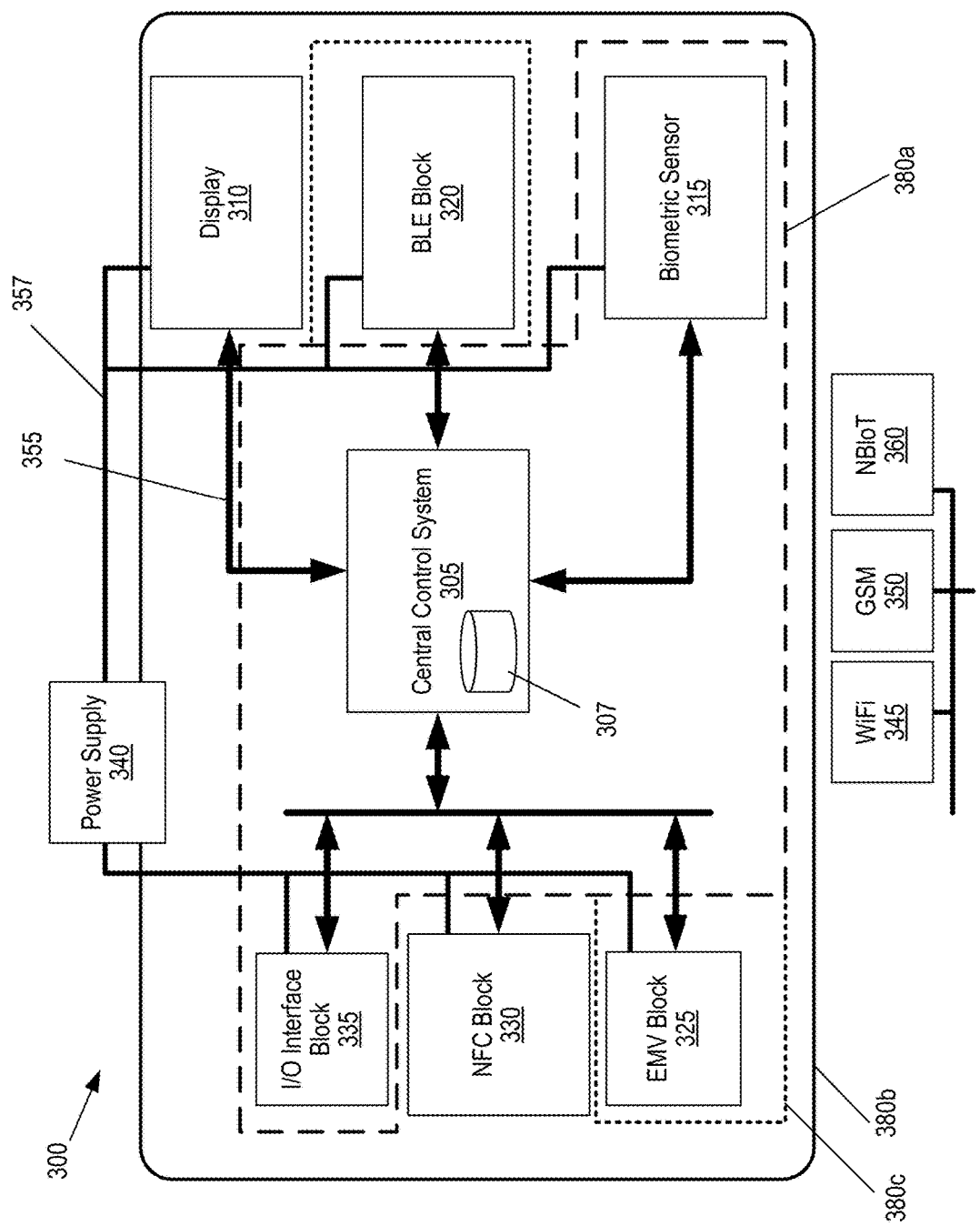
FIGS. 3A and 3B are block diagrams illustrating an example embodiment of a smart card.
Figure 3B:
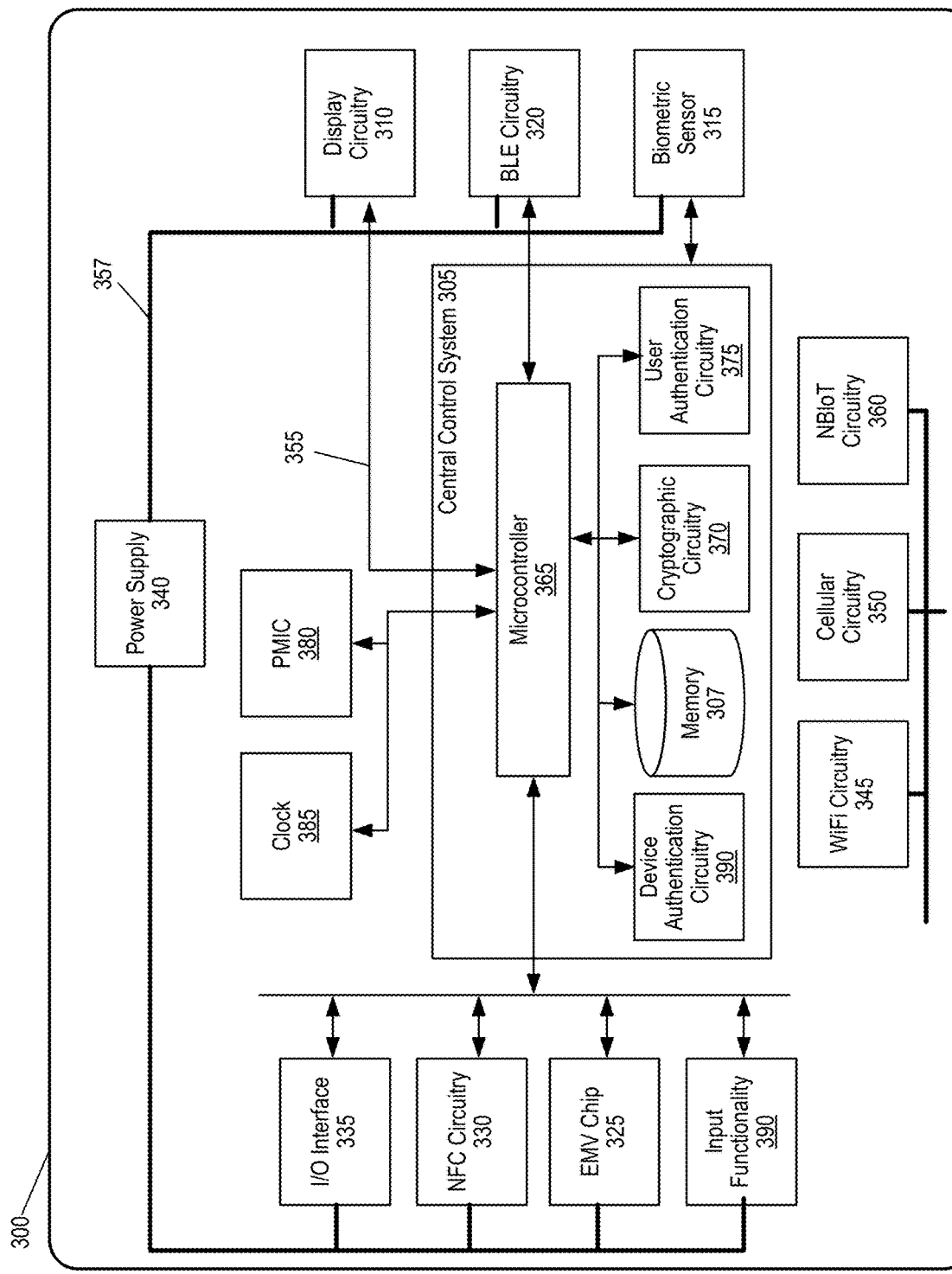

FIGS. 3A and 3b are block diagrams illustrating an example embodiment of a smart card 300. Smart card 300 may be substantially similar to smart card 110 and/or smart card 120 as described above. Smart card 300 may comprise a plurality of integrated circuits (also referred to as hardware blocks). Each integrated circuit may be disposed on a chip of a plurality of chips. Once or more or all of the plurality of integrated circuit may be disposed on a single chip. In some embodiments, a chip may refer to a single laminated and tamper resistant substrate. In various embodiments, the chip may be a secure and tamper resistant chip based on (i) use of physical unclonable functions or other random number generator methods to create private keys that are not known externally, and using the private keys to encrypt the data therein; (ii) capacitive and inductive filtering of power and clock signals so that noise from processing on the chip would not be easily detected by external sources; (iii) using tamper detection circuits configured to detect clock or power glitches beyond specified voltages or timing, which could add delays to normal start up time of the chip or trip flags for firmware that tampering was detected; and (iv) encapsulating memory areas that store encryption keys and other sensitive information used for encrypting data in layers of power, address and data lines such that any physical attempts to access these areas would be destructive to the memory.

Smart card 300 may include a plurality of hardware blocks connected through a protocol bus interconnection, for example, a central control system 305, a display 310, biometric block 315, BLE block 320, EMV block 325, NFC block 330, I/O interface block 335, clock 385, power management integrated circuit 380, and input functionality block 390. The central control system 305 may comprise a microcontroller 365, memory 307, cryptographic block 370, user authentication block 375, and device authentication block 390. Each block may be a dedicated integrated circuit block configured and optimized to perform the functions of the block of the smart card 300 as described above. In some embodiments, each block as illustrated herein may comprise one or more sub-blocks configured to perform sub-functions of the corresponding block. The smart card 300 may also include a power supply 340 (e.g., a battery or other power source in accordance with the present disclosure) and be connected to or include (as described above in connection to smart cards 110 and 120) a Wi-Fi block 345, cellular network block 350 (e.g., GSM, CDMA, etc.), and NBIoT block 360. In some embodiments, the Wi-Fi block 345, cellular block 350, and/or NBIoT block 360 may be disposed on a separate smart card or smart dock in accordance with the embodiments herein.

As described above, the smart card 300 may comprise an integrated SoC configured to perform one or more functions of the smart card 300. Various embodiments of the integrated SoC are illustrated in FIG. 3A via dotted lines 380a-380c, each of which may be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The integrated circuits may be dedicated hardware blocks, each specifically designed to perform a desired task and/or function. Dedicated hardware blocks may be able to be optimized for each task, for example, with specific circuit and logic design, to reduce power consumption for performing the designed task. Furthermore, in various embodiments, dedicated hardware blocks may reduce data processing and functions that need to be performed by a microcontroller. For example, by dedicating an integrated circuit for cryptography and/or authentication via blocks 370 and/or 375, respectively, the microcontroller no longer needs to perform these tasks.

In various embodiments, the integrated SoCs as described herein implements a plurality of functions as low power hardware. The SoC may comprise a single microcontroller 365 which may be configured to operate as a scheduler and for set up and execution of the dedicated hardware blocks. Some embodiments utilize low voltage circuits that allow the smart card to operate at a reduced power requirement, for example, by facilitating operation of the hardware blocks at a subthreshold voltage level. For example, some embodiments operate at 0.9 volts or less. However, other operational powers are possible. Some embodiments, alone or in combination, utilize software and algorithms strategies to extend and possibly reduce memory footprint. In various embodiments, power may be reduced through the use of block scheduling of tasks such that hardware blocks are operated in sequential order while ones not in use are deactivated. For example, clock 385 and/or power management integrated circuit 380 coupled to the microcontroller 365 may be configure to provide power, clock, and signal gating to turn various sections of the SoC off when functions are not preformed. In some embodiments, the dedicated optimized hardware blocks described herein are block scheduled via power/clock and signal gating, reconfigured and managed via dedicated optimized power management circuits that operate at subthreshold voltages, and have tamper detection features as described in the present disclosure. Scheduling flow of functions in a pipelined fashion may permit power management by turning blocks of hardware on and off. Another non-limiting advantage of the block scheduling is that such scheduling may lead to extremely fast startup times. Current implementations require significant amount of time to power up and use up a lot of energy during such start up times.

In one embodiment, FIG. 3 illustrates a dashed line 380a illustrative of a first SoC comprising the central control system 305, biometric block 315, and I/O interface block 335. In another embodiment, a dotted line 380b is shown illustrative of a second SoC comprising the central control system 305, biometric block 315, BLE block 320, EMV block 325, and I/O interface block 335. In still another embodiment, a solid line 380c is provided illustrative of a third SoC comprising central control system 305, the display block 310, biometric block 315, BLE block 320, EMV block 325, NFC block 330, and I/O interface block 335. Thus, an integrated SoC may be provided configured to perform one or more functions of the above. In some embodiments, the EMV block 325 is disposed on chip different from and separate from the SoC and configured to interface securely with one or more of the other chips and SoC of smart card 300.

The central control system 305 may include a processor or microcontroller and a memory 307. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

In one embodiment, the central control system 305 can be configured to separately process the incoming signals from a plurality blocks and/or handle communication with another processors for controlling blocks external to the SoC. In another embodiment, the external blocks may be associated with a processor, which can be configured to receive and process data from the central control system 305, a processor configured to generate graphical user interfaces to display the received data to the user on a display 310 and a third processor to communicate with the remote server via the BLE block 320, NFC block 330, etc. The processors may be low power processors to reduce power consumption on the smart card's batteries.

The central control system 305 is preferably connected to a communication bus. The communication bus 355 may include a data channel for facilitating information transfer and control of the various blocks. The communication bus 355 further may provide a set of signals used for communication with the central control system 305, including a data bus, address bus, and control bus (not shown). The communication bus 355 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like. These standards may be applicable to the remote server, while additional or varying standards may apply to portable electronic devices such as the central control device or sensing devices.

The central control system 305 may preferably include a main memory 307 and may also include a secondary memory (not shown). The main memory 307 provides storage of instructions and data for executing on the functionality of the various blocks. The main memory may also provide storage for biometric templates based on registration and other data for authenticating the user. Furthermore, the main memory 307 may provide storage of instructions for encryption and hashing functions for secure copying and transmission of data. The main memory 307 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM"). In some embodiments, the memory 307 may be encrypted based on encryption parameters (as described below) to securely and immutably stored data therein.

The secondary memory may optionally include an internal memory and/or a removable medium, for example, an insertable flash drive, etc. The removable medium is read from and/or written to in a well-known manner. The removable storage medium may be a non-transitory computer readable medium having stored thereon computer executable code (i.e., software) and/or data. The computer software or data stored on the removable storage medium can be read into the smart card for execution by any processor therein.

In alternative embodiments, secondary memory may include other similar means for allowing computer programs or other data or instructions to be loaded into the smart card 300. Such means may include, for example, an external storage medium and an interface. Examples of external storage medium may include an external hard disk drive or an external optical drive, or and external magneto-optical drive.

Other examples of secondary memory may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media and communication interface, which allow software and data to be transferred from an external medium to the smart card 300.

The I/O interface 335 facilitates input from and output to external devices, terminals, secondary memory, and/or smart dock 200. For example the I/O interface 335 may receive input from the smart dock as provided above, or may connect the smart card to a USB port of a terminal to facilitate a transaction. The I/O interface 335 is capable of facilitating input from and output to various alternative types of human interface and machine interface devices alike, for example a USB connection.

Smart card 300 may also include a communication interface blocks, for example, the BLE block 320, the EMV block 325, NFC block 330, etc. The communication interface blocks allows data to be transferred between smart card 300 and external devices, mobile phones, PCs, terminals, other smart cards, networks, or information sources over PAN, LAN, WAN, WiFi, clearly, etc.. Examples of communication interface blocks include a modem, a network interface card ("NIC"), a wireless data card, a communications port, a PCMCIA slot and card, an infrared interface, and an IEEE 1394 fire-wire, just to name a few.

Communication interface blocks may implement industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Communication interface blocks may also comprise blocks that facilitate wireless communication over a voice and over a data network. These interface blocks may be coupled to wireless communication components comprising an antenna systems (not shown), a radio system (not shown) and a baseband system (not shown). For example, radio frequency ("RF") signals are transmitted and received over the air by the antenna system under the management of the radio system. In some embodiments, where the BLE block is integrated in the SoC, the SoC may be configured for optimized transmission/reception and encryption functions, thus enabling implementation in hardware with minimal use of a processor leading to fast start up times.

In one embodiment, the antenna system may comprise one or more antennae and one or more multiplexors (not shown) that perform a switching function to provide the antenna system with transmit and receive signal paths. In the receive path, received RF signals can be coupled from a multiplexor to a low noise amplifier (not shown) that amplifies the received RF signal and sends the amplified signal to the radio system.

In alternative embodiments, the radio system may comprise one or more radios that are configured to communicate over various frequencies. In one embodiment, the radio system may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system to the baseband system.

If the received signal contains information, the baseband system decodes the signal and converts it to an analog signal. These analog signals are converted to digital signals and encoded by the baseband system. The baseband system 620 also codes the digital signals for transmission and generates a baseband transmit signal that is routed to the modulator portion of the radio system. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system where the signal is switched to the antenna port for transmission.

The communication interface blocks are also communicatively coupled with the central control system 305. The central control system 305 has access to main memory 307. The central control system 305 is preferably configured to execute instructions (e.g., logic, computer programs or software) that can be stored in the main memory 305 or the secondary memory. The instructions may also be received from the communication components and stored in the main memory 307 or in secondary memory, or executed upon receipt. Such instructions, when executed, enable the card 300 to perform the various functions of the present invention as previously described.

Software and data transferred via communication interface blocks are generally in the form of electrical communication signals. These signals are preferably provided to communication interface blocks via a communication bus 355. In one embodiment, the communication bus 355 may be a hard wired or any variety of other communication links.

The power supply 340 may be electrically connected to one or more of the plurality of blocks via a power line 357. Each block, under control of the central control system 305 may be activated and deactivated as needed via a scheduler executed by the microcontroller 365 as described above, thus will draw power from the power supply 340 via power line 357 only as needed. Otherwise, the power line may be idle.

D. Networked Environment Embodiment

Figure 4:
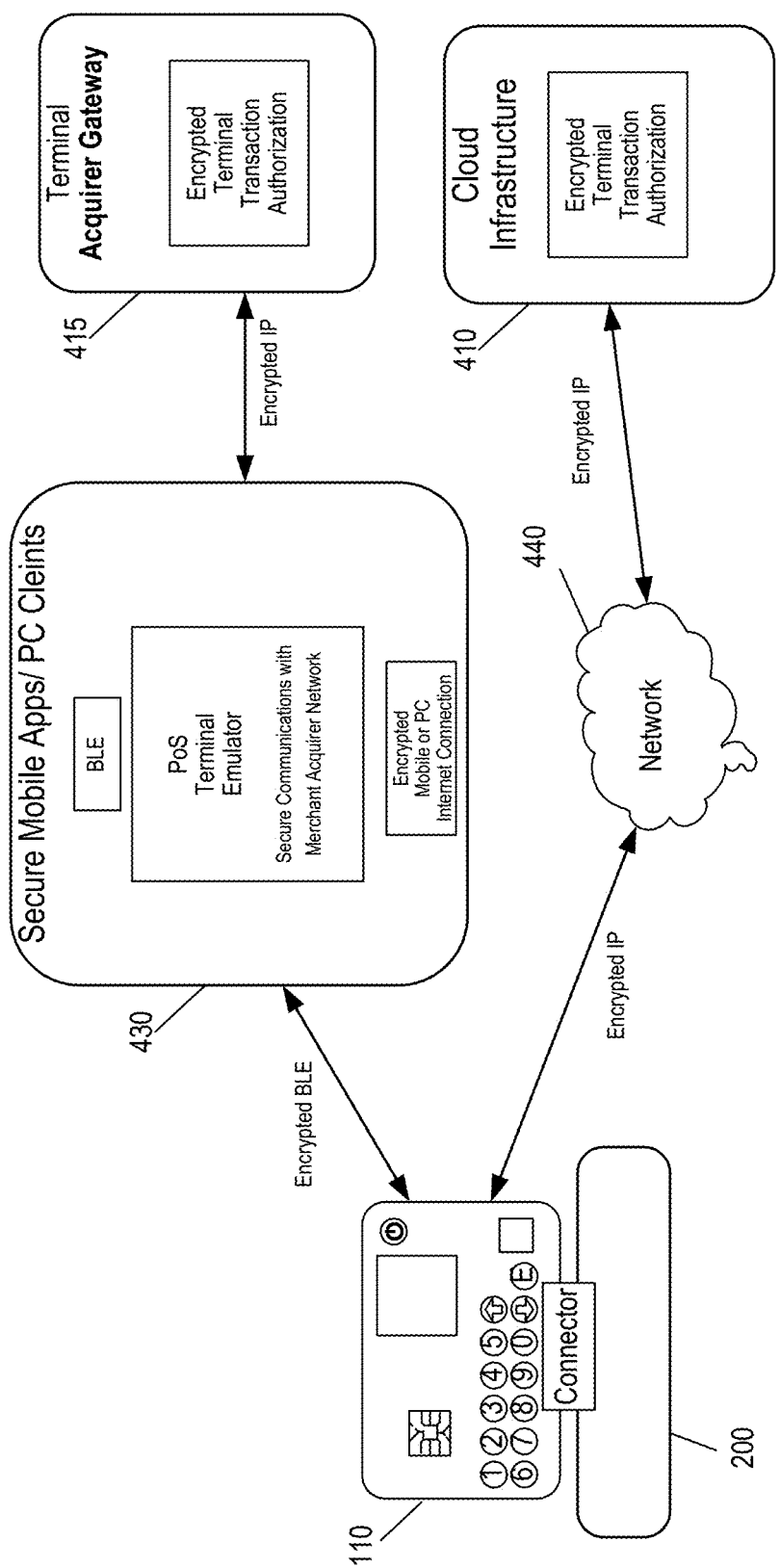
FIG. 4 is a schematic block diagram illustrating example transaction processing systems in accordance with multiple example embodiments.

FIG. 4 is a schematic block diagram illustrating example transaction processing systems in accordance with multiple example embodiments. The systems 400, 420 comprise a smart card 110 as described in accordance with the present disclosure that can be connected to a smart dock 200 as described above. While, the smart card 300 is shown connected to smart dock 200, it should be appreciated that this need not be the case, and some of the functionality of the smart card 300 may be performed absent the connection.

As described above, the smart dock 200 may supply power to the smart card 110 to power to the communication components in response to establishing a connection to the smart cards 110 (e.g., operating the Wi-Fi transceiver block, cellular transceiver block etc. as described in connection to FIGS. 3A and 3B). As such, the smart card 110 may be able to perform secure transactions via communication with a wireless network 440 as illustrated in FIG. 4. The network may be a wireless communications network, Wi-Fi network, WLAN, LAN, etc.

FIG. 4 illustrates a secure transaction performed between a smart card 110 and an external device 410 over the wireless network 440. In some embodiments, the smart card 110 may be placed near or within an NFC signal (or other PAN communication protocol) of the external device, based on a desired transaction. Alternatively, the smart card 110 may not be physically near the external device 410. Either before or during the transaction, the smart card 110 authorizes the user as described in FIG. 6. The authorization is performed prior to the smart card 110 transmitting any information out of the smart card. Based on the authorization, the smart card 110 may be configured to perform the various functions to perform the transaction. For example, the smart card 110 may be configured to encrypt and send encrypted information (e.g., shown as the encrypted IP and described in more detail below) directly to the external device 410 via a PAN or to the wireless network 440 and then to the external device. In some embodiments, once the user is authorized, the smart card 110 may be configured to establish a trusted connection with the external device 410, for example, by verifying the external device is a trusted device through the exchange of digitally signed certificates and/or encryption parameters, as described below. For example, a device authentication block (e.g., block 390 of FIG. 3B) may be configured in accordance with the identification and authentication methodology described below. Furthermore, in some embodiments, the smart card 110 may be required to decrypt the memory (or data stored thereon) based on the authorization in order to access the memory to proceed with the transaction. For example, by authentication the user via user credentials as described below.

In various embodiments, the smart card 110 encrypts the information transmitted to the external device based on an encryption parameters and/or hashing functions saved in the smart card 110 (or other smart card as described in connection to FIG. 1B and below). The external device may then decrypt the information and finalize the transaction, which may include confirming payment, providing access to a restricted area, etc. In this embodiment, the smart card 110 is able to directly interact with the external device as described above. In some embodiments, the smart card may transmit encrypted internet protocol messages via a network or cloud network to perform secure transactions. In some embodiments, the smart card 110 and/or the external device 410 may be configured to generate transaction record information (e.g., ledgers, smart contracts, etc.) indicative of the transaction for storage in a DLT system and/or central database in accordance with embodiments described further below.

In some embodiments, the smart dock 200 may supply power to the smart cards 110 to power to the BLE transceiver in response to establishing a connection to the smart card 110. Here, the smart card 110 may be configured to communicate to either the external device 410 directly in a manner similar to that above, or to another external device (not shown) through which the smart card may communicate to the external device 410. In some embodiments, the other external device may communicate via wireless network 440 to the external device 410.

Thus, FIG. 4 also illustrates a transaction between the smart card 110 and a terminal acquirer gateway 415. Here, the smart card 110 need not be near the terminal acquirer gateway 415. For example, the terminal acquirer gateway 415 may be a website online through which the user of the smart card 110 seeks to purchase items from the merchant/operator the website. Thus, a direct communication between the smart card 110 and terminal 415 is not possible.

Accordingly, to facilitate the transaction, a point-of-sale terminal emulator may be installed onto an external device 430. The external device may be a PC, mobile device, or other device capable of wireless communication over the wireless network 440. The point-of-sale terminal emulator may be an application downloadable to the external device 430 that provides for secure communication from the smart card 110.

In this embodiment, the smart card 110 may perform authentication and encryption as described throughout the present disclosure. Then, the smart card 110 may transmit the encrypted signal (e.g., encrypted IP) to external device 430 via a wireless connection. In one embodiment, the smart card 110 transmits the encrypted IP via a BLE connection. For example, the smart card 110 may include a SoC optimized for transmission/reception and encryption functions via the BLE connection, which can be implemented as hardware requiring minimal use of the microcontroller of the smart card 110. The external device 430 can then transmit the encrypted IP to the desired terminal acquirer gateway 415 to finalize the transaction as described above. In some embodiments, the external device 430 may decrypt and re-encrypt the encryption IP before transmitting to the terminal acquirer gateway 415.

E. User Authentication

Figure 5:
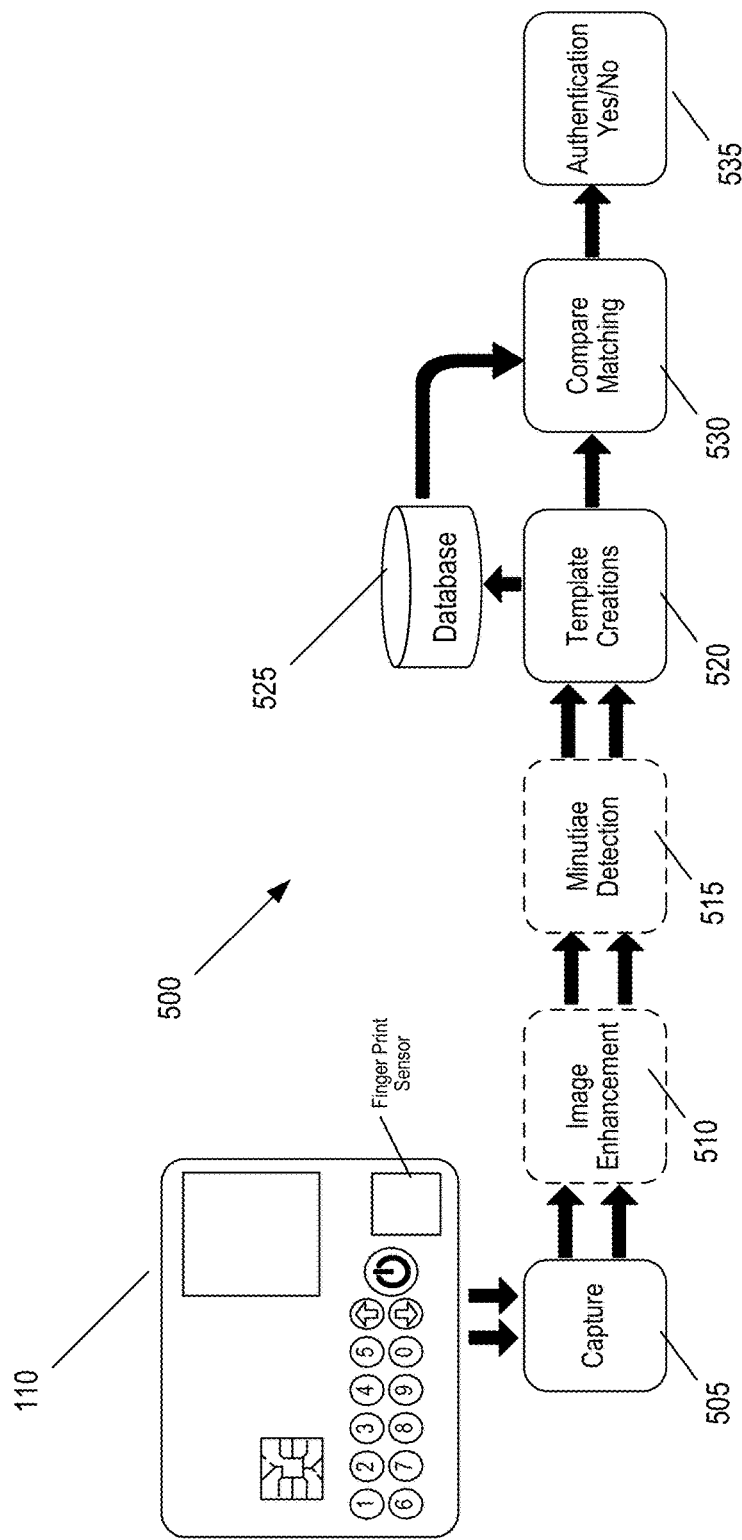
FIG. 5 is a flow chart illustrating an example process for registering and/or authenticating a user in accordance with one example embodiment.

FIG. 5 is a flow chart illustrating an example process 500 for registering (e.g., illustrated as the gray arrows) and/or authenticating (e.g., illustrated as the black arrows) a registered user of a smart card as described herein. As noted above, a user may operate a smart card 110 to input an identification credential. For example, the user may operate the biometric sensor 115 to provide a unique biometric identifier associated with the user. Alternatively, or in combination, the user may enter a pass phrase (e.g., a pin, password or phrase, and/or unique keystroke) via the input functionality 114 or the smart dock 200 may utilize facial or iris recognition to input an identification credential. As another example, with reference to FIG. 3B, the process 500 may be executed by the microcontroller 365 electrically coupled to the biometric sensor 315 and the user authentication circuity 375.

At step 505, identification credential is captured by a smart card. For example, the biometric block 315 may operate to receive signals from the biometric sensor 115 and capture the user credential as the unique identifier of the registering user. Similarly, blocks associated with the input functionality 114 and/or smart dock 200 may capture the identification credential. In some embodiments, the identification credential may be an image of, for example, the user's fingerprint and/or face or other biometric. The received user credential may be transmitted, for example, to user authentication circuitry 375.

Optionally, at step 510, the image of the captured identification credential may be enhanced. For example, the user authentication circuitry 375 may perform image processing to digitally improve the resolution of the image for improved image processing. At step 515, the captured image (or enhanced image where step 510 is performed) is processed to detect, extract, and remove minutiae of the image. In some embodiments, this may reduce the amount of data to be processed and/or stored within the memory of the smart card 110. The step to 515 may be based on the enhanced image of step 510. Where the identification credential is a pin or pass phrase, steps 510 and 515 may be skipped. Steps 510 and 515 (and 530 described below), in some embodiments, may be performed by dedicated hardware blocks included in the identification circuit. Such implementations advantageously may provide for reduced data bit widths and minimized heuristics. Furthermore, such implementations may provide for parallel processing that can be block scheduled to be activated or deactivated sequentially, as described herein.

Figure 6A:
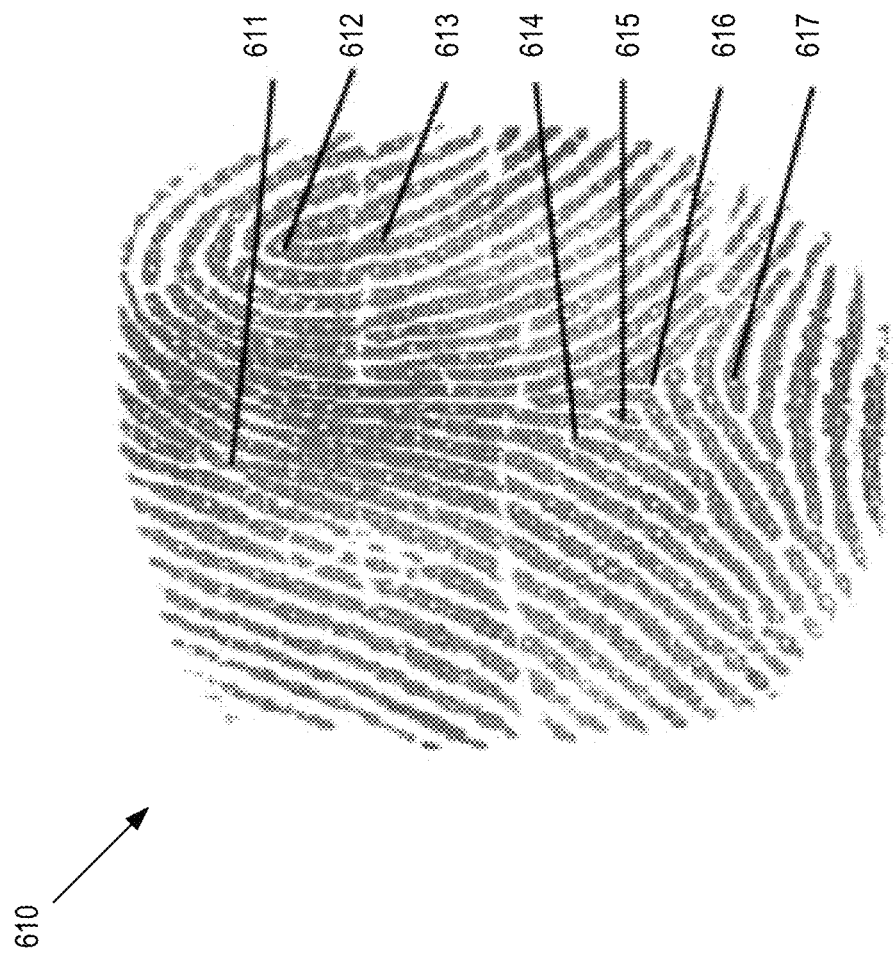
FIGS. 6A-6D illustrate screenshots of an example of the process of FIG. 5.

An example for step 515 is shown in FIGS. 6A-6D. FIG. 6A is a screen shot 610 of an example of a finger print detected by a biometric sensor in accordance with some embodiments. When smaller capacitive sensors as used for biometric sensing, various minutiae may be identified. For example, the biometric sensor may detect intermediate level minutiae comprising, but not limited to ridge ending 614 and bifurcation 613. Other forms of minutiae may include crossovers 611 and islands 615. In some implementations, these may compound minutiae that can be decomposed into ridge ending 614 and bifurcation 613, and thus need not be treated separately in some cases. Core 612 and delta 616 (top level minutiae) can also be considered. However, not all fingerprints exhibit them and there is no guarantee that any top level minutiae will be in the field-of-view of a small sensor. Thus, some embodiments may provide a low weight to top-level minutia when using smaller lower resolution sensors, while providing a higher weight if higher resolution and larger sensors are used. Low level minutiae such as pores 617 require a higher resolution to detect reliably, and will only be dealt with when high resolution sensors are deployed. Embodiments herein may have a modular design to reconfigure the processes and underlying hardware to utilize core and delta and low level minutiae such as pores only when sensor configuration justifies it.

Figure 6B:
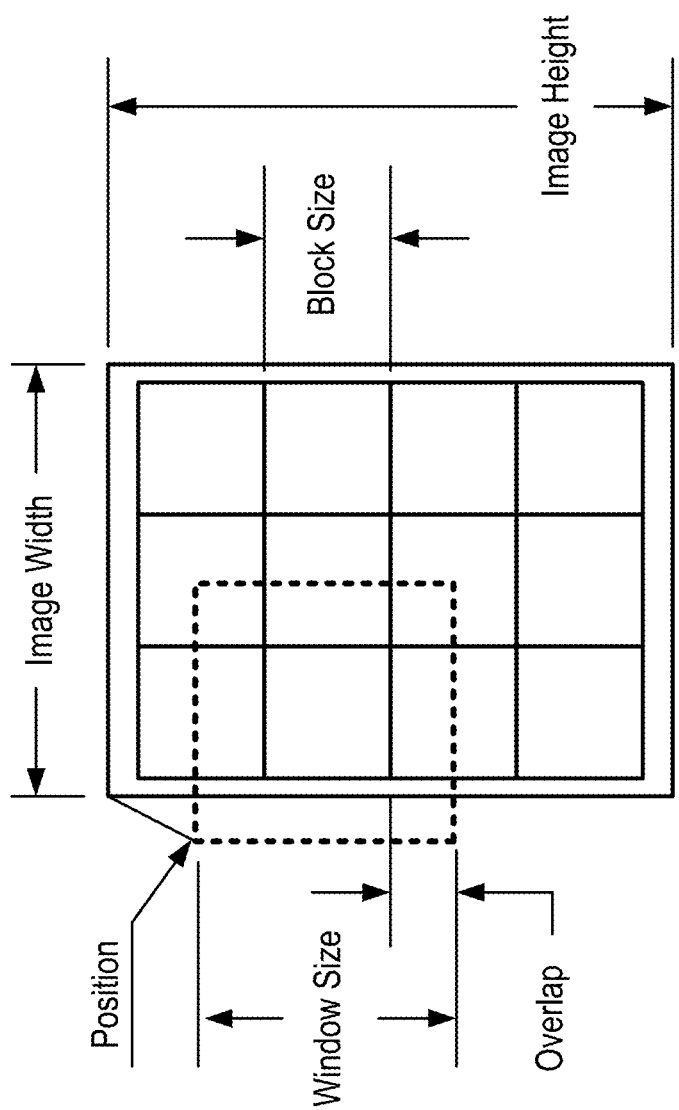

In some embodiments, image enhancement to detect and remove minutiae may be provided by a short time Fourier transform (SIFT) as shown in FIG. 6B. The SIFT algorithm may provide filing of the image through overlapping tiles. For example, a tile may be a square region of "window size" of pixels in each dimension. The tiles can form a grid of dimension "tile size" (3×4 in this example). Tiles are overlapping, with a pitch defined by "block size". This also may provide the central region of each tile. Some areas of the tile, including a portion of the central area may lie outside of the image area, depending on configuration (image size vs tile parameters). These areas of the tiles are assumed to be zero (after DC removal). Some properties, such as image statistics, are functions defined over the tiling ("tiling size"), not the image pixels. Interpolation is may be used to compute the value of these properties at the image pixel level.

Example Parameters May include:
Image Size: 160×160;
Tiling: 9×9;
Block size: 16;
Overlap: 8; and
Window: 32.

Where the fast-Fourier transform is performed on the window size.

An example of the image processing steps may include, but are not limited to image statistics, image enhancement, complex filtering, minutiae detection, orientation disambiguation, and minutiae type classification. Other processes are possible.

In some embodiments, image statistics may comprise computing energy content, ridge orientation, ridge frequency and coherence over the tiling. Raw image statistics may be computed for each tile separately by, for example, the following steps:

(a) Copy tile pixels from image;
(b) Remove DC component and normalize contrast;
(c) Set any area of the tile that lies outside of the image boundary to 0;
(d) Multiply the tile pixel-wise with a window function to attenuate the overlap region;
(e) Compute the 2D-FFT of the tile, and cache it for use by enhancement;
(f) Apply a Butterworth bandpass filter to the spectrum;
(g) Convert the complex-valued spectrum to the power spectrum, and sum the spectrum to compute the energy content;
(h) Dot-product the power spectrum with the frequency matrix to compute the average frequency; and
(i) Dot-product the power spectrum with the orientation-x and orientation-y matrices to compute the orientation vector.

In some embodiments, raw image statistics may then convoluted with a (separable) 2D Gaussian in order to smooth the data, i.e. a 1D Gaussian applied in the x-direction, followed by a 1D Gaussian applied in the y-direction. Orientation vectors may then normalized, and the coherence computed as a measure of how similar the orientation vectors are in a local 3×3 neighborhood. This may be indicative of a sum of dot products of the vector at the center position with each of the surrounding vectors. If all vectors point in the same direction, the sum is maximal. The global average and standard deviation of the energy can then be computed to determine the contrast of the foreground (detected biometric) in the input image. The energy can then be normalized to remove a dependency on contrast and ratio of foreground to background in the image. In some embodiments, the normalized energy can be used in minutiae detection to suppress detection of spurious background minutiae.

Figure 6C:
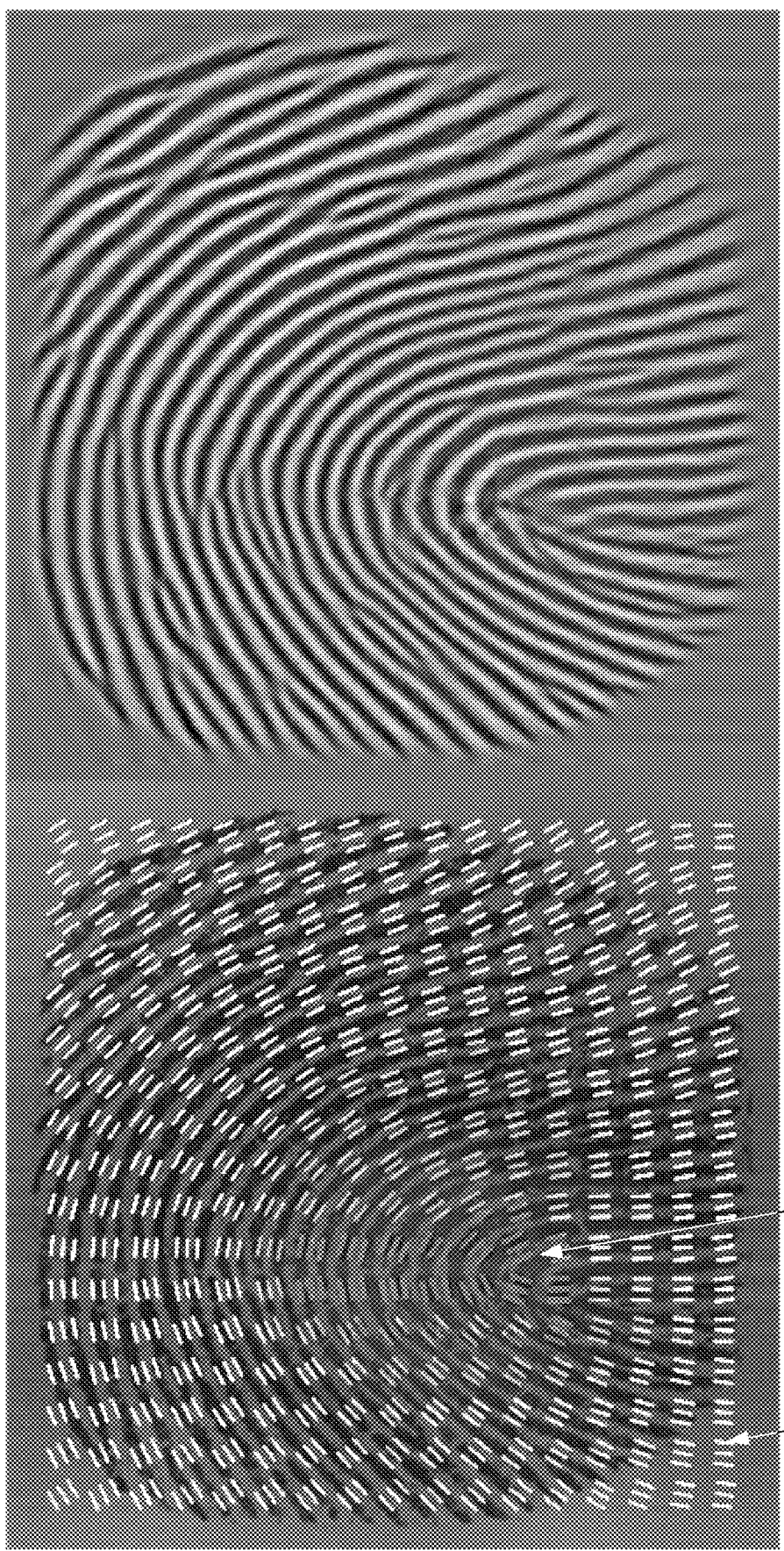

In some embodiments, image enhancement may comprise enhancing an image by applying an adaptive filter in the frequency domain, a tile at a time. FIG. 6C depicts screenshots of a raw image (left image) with visualization of orientation, frequency and coherence (white 620: high, gray 630: low) and a corresponding stitched enhanced image. The filter can be adapted using the statistics from the image statistics. An example image enhancement may be performed by following the steps of, for each tile:
(a) Retrieve the FFT result for the tile from (e) above;
(b) Select an appropriate filter based on the orientation and coherence of the tile;
(c) Apply the selected filter;
(d) Compute the inverse 2D FFT of the tile; and
(e) Copy the central region (block size), and any portions of the overlap region NOT overlapped by other tiles (i.e. around the outside of the tiling) to the enhanced (output) image.

In some embodiments, complex filtering may comprise applying various complex-valued filters to the enhanced image, one scan-line at a time. For example, complex filtering can be performed in multiple stages. Convolutions may be applied line-by-line in the spatial domain and interleaved with minutiae detection on the most recently computed line. This allows for memory optimizations, as only the filter responses (lines) needed to perform minutiae detection need to be retained. The steps of complex filing may include, but not limited to:
(a) Image Derivative:

$$\frac{dI}{dr} := \left\{ (x+iy)\exp\left(\frac{-r^2}{2\sigma_z^2}\right) I(r) \right\} \quad \text{Eq. 1}$$

where I(r) of the image, and ⟦a⊓b⟧ denoting the convolution;

$$Z := \left(\frac{dI}{dr}\right)^2; \text{ and} \quad \text{Eq. 2}$$

$$|Z| := \sqrt{Z_{real}^2 + Z_{imag}^2} \quad \text{Eq. 3}$$

(c) Linear symmetry:

$$|Z| := \sqrt{Z_{real}^2 + Z_{imag}^2}; \text{ with} \quad \text{Eq. 4}$$

$$G_l := \exp\left(\frac{-r^2}{2\sigma_l^2}\right). \quad \text{Eq. 5}$$

Figure 6D:
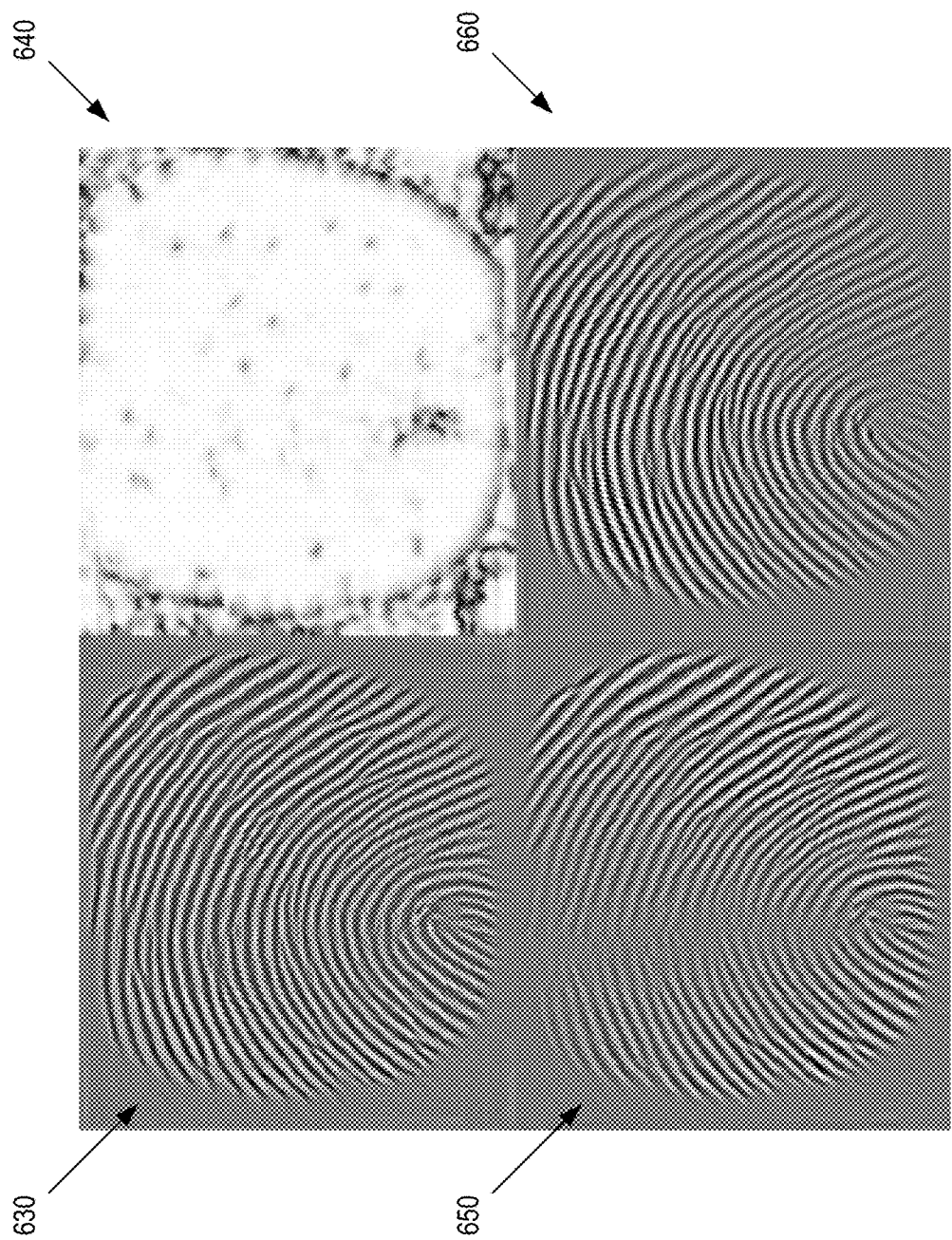

In some embodiments, linear symmetry may express the invariance of the local image region against translation along the symmetry axis. Thus, linear symmetry may be high (close to 1) if the region contains only regular ridge flow or background and may be low if there is a discontinuity, such as a minutiae. The steps of complex filing are illustrated in FIG. 6D where the upper left image 630 illustrates an enhanced image that is DC-free, upper right image 640 illustrates a linear symmetric, lower left image 650 illustrates the real value of dI/dr and the lower right 660 image illustrates the imaginary value of dI/dr.

In some embodiments, minutiae detection comprises detecting minutiae by locating local minima in the filter response from (3). In some embodiments, minutia detection may use a multilayer perception (MLP) classifier to assign a quality measure to the minutiae. For example, in one implementation local minima of linear symmetry may be detected by comparing to the other pixels in the 3×3 neighborhood. Minutiae candidates thus detected may be further evaluated as follows:
(a) A threshold to can be applied to the local minimum.
(b) Energy, frequency and orientation coherence can be interpolated from the image statistics for the location of the local minimum.
(c) A threshold can be applied to the energy, which may suppress some spurious background minutiae, where the energy is low.
(d) A trained MLP can be used to assign a quality measure to the minutia. The input to the MLP may comprise a magnitude of the local minimum and a local ridge frequency to compensate for the non-scale invariant character of the filter kernels. Additionally, the values of the enhanced image, image derivative, and linear symmetry can be sampled according to a specified pattern from the vicinity of the minutiae and fed to the MLP, as described below. A threshold may then be applied to the quality thus determined, and low quality minutiae are discarded.
(e) An image Orientation can disambiguated to a direction using another MLP, for example, were the input comprises the image and/or filter samples as above.
(d) A minutiae type may be classified using a MLP, for example, were the input comprises the image and/or filter samples as above.

Various implementations of MLP may be used for the above procedure. For example, the MLP may include using 4 or 6 input nodes, 4 or 6 hidden nodes, and one output node, with a than-like activation function s(x)=(1-exp(-x))/(1+exp (-x)). Algorithmically, MLPs constitute a series of dot products with subsequent application of the activation function, which could be implemented using a lookup table.

In some embodiments, image orientation disambiguation may comprise obtaining an orientation from the image statistics (1) at the minutiae position by interpolation. The orientation may then be disambiguated to a direction using a MLP classifier. In some embodiments, minutiae type classification comprises using a MLP classifier to estimate the minutiae type (ending vs bifurcation). In some embodiments, complex filtering and minutiae detection may be performed within a loop over the lines of the image. In another embodiment, complex filtering through minutiae type classification may be performed within a loop over the lines of the image For example, the MLP input vector computation may include orientation and frequency from image statistics, interpolated for the location of the minutiae, used to define a scale and orientation-invariant coordinate system centered on the minutiae location. A pre-selected set of sample points can be defined on this coordinate system, and used to extract corresponding values from the enhanced image, image derivative or linear symmetry by interpolation.

The set of sample points may be different for each of the 3 MLPs (quality, direction and type), and obtained using an algorithm starting from a maximal set of sample points. In some embodiments, only the quality MLP classifier will use linear symmetry components and frequency. In some embodiments, all classifiers will use image and image derivative components.

Sample points may be combined into symmetry patterns. These may be linear combinations of values at 1, 2 or 4 positions, based on the available mirror symmetries of the sample point relative to the minutia location. Without subscribing to a particular scientific theory, the approach provides considerably improvements to MLP learning, as intrinsic symmetries are already encoded in the MLP input vector, and do not have to be learned.

At step 520, an identification template is generated based on, for example, the captured credentials. In some embodiments, the template is generated (e.g., by the user authentication block 375) based on the image resulting from the minutiae detect of step 515. In some embodiments, the template is a biometric template based on the received biometric data representative of the biometric information of the registering user. In other embodiments, the identification template may be data indicative of the pass phrase. For example, once minutiae are detected their geometry and orientation may be used to create templates for each biometric image. These templates can be matched between registered samples and samples presented for authorization. Matching process may require an efficient solution to a nearest neighbor problem optimized for hardware implementation.

In the case of registration, the process flow proceeds to step 525, where the identification template is stored in a database. In various embodiments, the database may be the memory of the smart card 110. Thus, the identification template is stored locally on the smart card and on the same device used to capture the biometric data. Accordingly, the identification template is not transmitted outside of the localized smart card. In some embodiments, the identification may be encrypted for secure, immutable storage within the memory of the smart card.

In the case of authentication, the process flow proceeds to step 530, where the captured credential is compared against a stored identification template. At step 530, the identification template may be retrieved from the database and used for comparison, for example, by the user authentication block 375. At step 535, a determination is made whether the user credential received from the user at step 505 matches the identification template of a registered user of the smart card. If yes, then the user is authorized and various functions of the smart card may be operated in accordance with the present disclosure. If not, then the smart card does nothing. In some embodiments, the display may be display an image of the user during the process 500. In another embodiment, the display may display the results of step 535. In some embodiments, in the case that the user is not authenticated, the smart card may be configured to transmit a notification to the proper user and/or authorities, as such may be indicative of a fraudulently obtained smart card or identification credential.

In some embodiments, each step of process 500 is performed by an integrated SoC of the smart card. As such, the SoC may be configured to lend itself to hardware acceleration with minimal use of a controller to set up such hardware acceleration. One non-limiting advantage of process 500 implemented in the SoC, is that each step of process 500 may be executed by one or more dedicated blocks of the SoC. For example, step 505 may be executed by biometric sensor 315, while additional blocks may be provided within authentication circuitry 375 and/or separate from authentication circuitry 375 for performing each step of process 500. Upon completion of each step, the block associated with that step may be deactivated and the next block activated only as needed to complete the process 500. Thus, blocks that are not currently needed or operated are not drawing power from the battery of the smart card. Furthermore, in some embodiments, the process 500 may be able to reduce and/or eliminate heuristics and utilize mathematics which lends themselves to hardware acceleration without compromising recognition and verification performance. Additionally, minimized heuristics may facilitate parallel execution of the various dedicated blocks through scheduled sequential activation/deactivation as needed. Accordingly, the process 500 can facilitate and improve the hardware implementation so to reduce power consumption by factor of up to 100.

In one embodiment of FIG. 5, alone or in combination, provides for a compact hardware optimized implementation, which may dramatically lower power requirements for fingerprint recognition. For example, without subscribing to a particular scientific theory, embodiments herein may reduce power requirements by an order of magnitude or more versus existing approaches. In an example embodiment, some of the attributes of the algorithm are that it ensures 1) sequential operation of various stages, 2) avoids mathematical operations or heuristics that are not optimal for hardware digital signal processing, 3) reduces memory requirements optimized tiling of image or processed data when signal processing is in frequency domain, and 4) use of spatial domain methods which allow sequences of lines of image or processed data to be analyzed. These techniques, as described in more details above, may result in sequential processing consisting of three main modules as shown in the FIG. 5. For example, but not limited to, including a) image enhancement, b) minutiae detection, c) template creation and matching usable for both registration and authentication. The process illustrated in FIG. 5 may provide for optimal hardware implementations without compromising performance. The steps of process 500 may be performed sequentially and lack heuristics or dependencies on loop backs to access data from other modules. In some embodiments, such features may provide for the above described block scheduling of various stages of the algorithm so that only the relevant stage is powered. Various embodiments of the block scheduler operate as a hardware state machine that turns on the module needed and controls power, signal and clock to the biometric engine thus dramatically reducing power. Current implementations of biometric engines require the use of a floating point microcontroller, such as an ARM M4, which require the whole microcontroller to be powered for the biometric engine to work, a lack of avoidance of heuristic approaches, and thus using sequential implementations leads to increased memory and power consumption as well. Thus, without subscribing to a particular theory, embodiments described herein are believed to provide a factor of 20 times better power consumption.

In some embodiments, a database may store multiple identification templates associated with one or more users. Thus, multiple users may be authorized to use a given smart card. Furthermore, each user may be associated with a set of restriction rules saved in the database. The restriction rules may define parameters for transactions performed by the user via the smart card. For example, a first user (e.g., a child) may be associated with restriction rules limiting the amount of a purchase, and when the child is enters the associated identification credential the child will only permitted to perform a purchase to the limit of the funds. In some embodiments the restriction rules may be based on a geographic location (e.g., within a school for lunch, etc.). In another embodiment, the restriction rules may indicate that there is no spending limit, thus any purchase should be allowed. This may assist to avoid unintended fraud notifications from credit card companies and the like due to large or unexpected charges. Furthermore, the restriction rules may be indicative of access to, for example, secure areas of a building or land (e.g., in government or secret areas).

Figure 7:
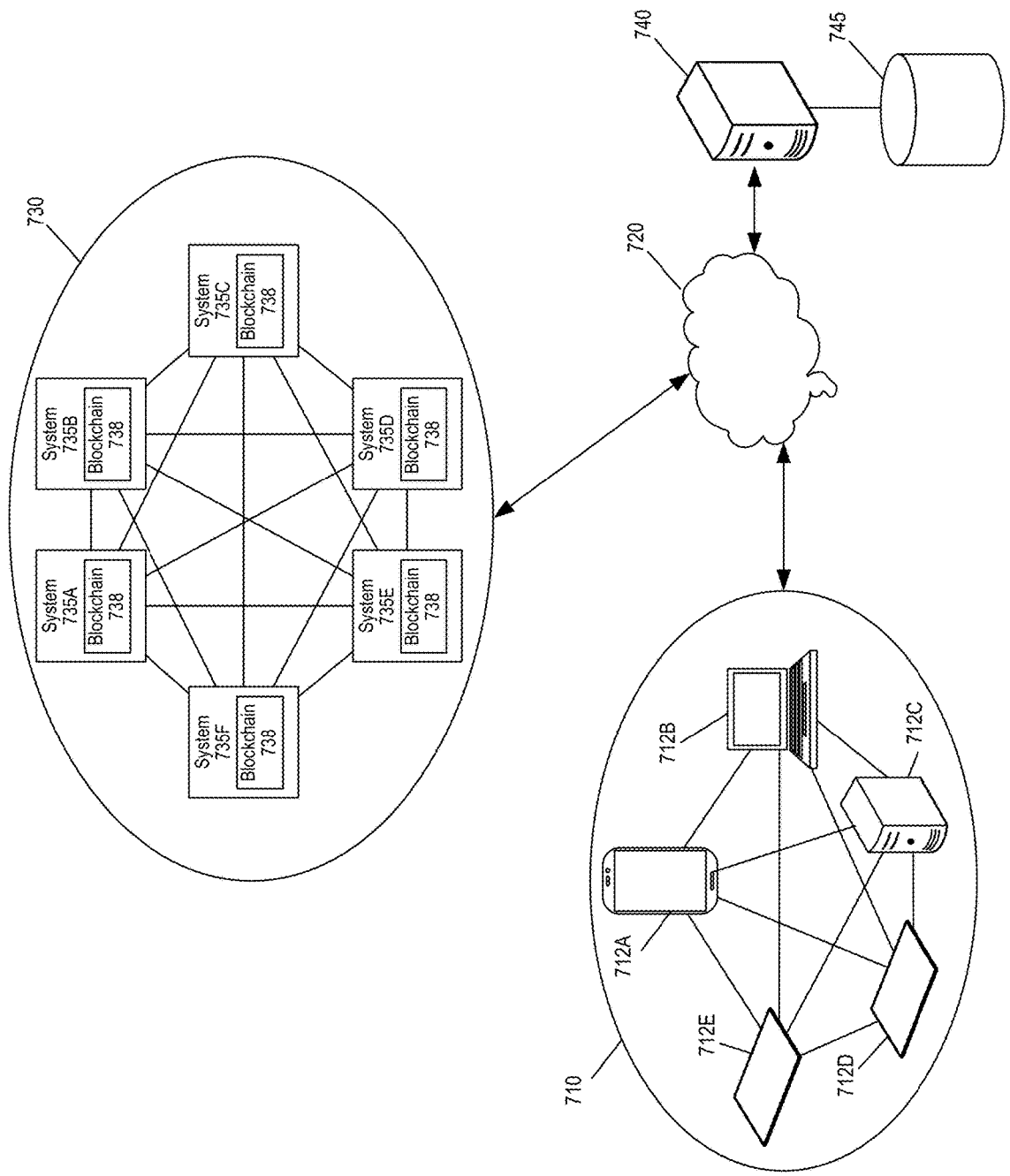
FIG. 7 is a schematic diagram illustrating an example system for secure, immutable exchange of data using smart cards in accordance with an example embodiment.

F. Authentication and Trust Services for Data, Transactions and/or Smart Contracts In various embodiments, smart cards disclosed herein may be configured to provide for trusted off network transactions using PAN and/or LAN. That is, as shown in FIG. 7, in certain situations, a smart card 712E may be used to perform a transaction with external devices 712A-D (e.g., other smart cards 712, mobile devices, etc.) where there is no wide area or internet connectivity over network 720 (e.g., off-network transactions). Trust may be established between smart card 712E and one or more external devices (e.g., including amongst smart cards) using identification and authentication protocols described herein. For example, using the protocols described herein a PAN or p2p trusted mesh network 710 may be used. In some embodiments, network 710 may be utilize BLE, NFC, or other PAN communication protocols for off network communications, for example, based on a close proximity of the devices. In some embodiments, identification and authentication protocols may depend on the tamper resistant secure element design of the smart card according to the various embodiments herein, which can store local data immutably including encryption parameters (e.g., private keys), certificates, data and or smart contracts. Accordingly, embodiments described herein may provide for a distributed off network trust mesh network whereby trusted devices and/or members are able to provide trusted data transactions to other members (smart cards/ clients).

G. Authentication Protocol
  i. PKI for Card Identification and Authentication

Various functions of smart cards, such as off-network data exchange, transactions such as payments, etc., may depend on an ability to determine whether an incoming message was produced by an authentic (e.g., trusted) smart card and/or device. Smart cards, devices, and/or users may be authenticated based on a prior registration indicating that the smart card and/or user is a known entity, opposed to an interloper, and is trusted within the network environment. In various embodiments, the identification and authentication protocol described herein may be performed, for example, by the microcontroller 365 electrically coupled to the cryptographic circuitry 370, device circuitry 390, and memory 307 of FIG. 3B.

In some embodiments, a solution can involve creating a public-private key pair (for example, a public key "C" and a private key "c") (e.g., by the cryptographic block 370) and store the private key on each smart card, in a secure location of the memory (e.g., memory 307) that is not visible to users. The smart card can then sign messages with the private key(c) (e.g., at the cryptographic block 370), and any receiving party that knows the public key (C) can verify the signature was produced by an authentic card (e.g., using the device authentication block 390). The receiving party may know C based on storing C at the receiving party (e.g., a memory 307) in response to receiving C from either the smart card or another source. However, with enough effort and expense, it may be possible to extract the private key from a smart card, enabling the creation of counterfeits. Also, in a practical production environment, it may be difficult to store a common private key on each smart card without allowing any illicit copies. These problems may be addressed by utilizing the security features as described below to manage the generation and distribution of authentication keys to end user smart cards during production.

ii. Smart Card Certificates

In accordance with various aspects of the present disclosure, one or more of the encryption parameters, digital signatures, and/or at least one of a plurality of certificates may be used to establish trust by a device (e.g., the device authentication block 390) receiving message and/or transactions indicative that transmitting smart card is authentic and capable of securing immutable data being conveyed. The encryption parameters, digital signatures, and certificates may be generated (for example, by a cryptographic block 370) and verified using the authentication and cryptographic functionality of the smart cards described in accordance with the present disclosure, for example, smart cards 110-150 using the cryptographic block 370 and device authentication block 390 of FIG. 3B.

In various embodiments, encryption parameters may include, but are not limited to, asymmetric encryption keys (e.g., a public-private key pair), symmetric encryption keys, etc.. In some embodiments, each smart card may comprise a private key immutably stored in memory. An associated public key may be composed in a public key certificate signed by one or more certificate authorities. In various embodiments, each certificate authority comprises its own corresponding certificate that specifies how many additional cosigning certificates are required to verify the authenticity of any certificate signed by each certificate authority. The corresponding certificate may also include any parent certificates (e.g., received from a second level certificate authority) necessary to verify its own authenticity as a certificate authority, according to the same procedure described above. The parent certificates need not be included where the certificate of the corresponding certificate authority belongs to a set of root certificates included on all cards. Accordingly, in several embodiments, a message generated by and transmitted from a smart card may be trusted by a receiving device using the above described certificate chain. For example, the received message may be confirmed to be authentic and therefor trusted if the transaction is digitally signed using a private key of the smart card, and the private key is associated with a public key certificate whose authenticity can be verified using the certificate chain leading back to one or more trusted root certificates. FIG. 8 is a flowchart illustrating a method 800 for assigning a card certificate (CC) to a smart card. In various embodiments, process 800 may be executed during or following manufacture of a smart card, for example, one such as smart card 300 of FIG. 3B. In some embodiments, process 800 is performed after manufacture of the smart card and when the smart card has passed inspection and data and code protection measures have been activated (except biometric access control).

Referring to FIG. 8, at block 805, the smart card may generate or be issued a private key (c). In some embodiments, c may be generated by a random key generation algorithm executed either by the smart card or by an external device and issued to the smart card during manufacture. The private key c is then saved in the memory of the smart card in a location that cannot be observed without great effort and expense by users (e.g., registered and unregistered users). At block 810, the smart card generates and transmits a corresponding public key (C) to a second smart card configured as a "Certificate Authority" (CA). The CA comprises a public key (V) and an unobservable private key (v). At block 815, the CA increments a 32-bit serial number (N) and returns a card certificate (CC) to the smart card. The CC may have the form:

$$CC(C)=[[N,C],\text{sig}(v,[N,C])] \qquad \text{Eq. 6}$$

Where: [N,C] denotes concatenation of N and C and sig(v,[N,C]) denotes a digital signature using private key v over the content [N,C].

In several embodiments, any device that knows the public key V can authenticate messages produced by the smart card corresponding to the public C (e.g., digitally signed using private key c). Advantageously, if an attacker is able to extract the private key c from an end-user smart card, any counterfeits they produce must share the same certificate CC(C). In the event that an attacker is detected as using the smart card corresponding to C, the CC(C) could be added to a public blacklist as soon the attacked is detected, without impairing the operation of any other smart cards. In various embodiments, the private key v used to create valid CC exist only within a secure enclave of the memory of the CA. Hence, it cannot be secretly copied. The entire CA smart card might be stolen, but the ability to create new Card Certificates would therefore be protected by biometric access control (e.g., as described above in connection to FIG. 5).

i. CA Certificates

In some implementations, the above described system utilizing a CA may be subject to some shortcomings. For example, loss or malfunction of the CA smart card may impede production of subsequent smart cards recognizable using existing cards that only trust certificates verifiable using public key V. Additionally, a single CA smart card could be a bottleneck for volume production. Also, if private key v is extracted from a stolen CA smart card, an unlimited number of counterfeits could be produced that would be indistinguishable from all existing trusted smart cards.

To address these short coming, a process to securely manage multiple CA smart cards can use a card certificate chain. In some embodiments, the card certificate chain may comprise a plurality of card certificates, where at least one card certificate is a link (e.g., level) in the chain. For example, a base level may be the smart card having private key c, a first level CA may be the CA smart card having private key v, and a second level CA (referred to herein as CAA") may be provided that issues card certificates to the first level CA in the same fashion described above. That is, a newly manufactured CA may generate an unobservable private key v (as described above for block 805) and emit the corresponding public key V. At block 810, a CAA smart card with private key w, would then return a CA certificate:

$$CC(V)=[[N_V,V],\text{sig}(w,[N_V,V])] \qquad \text{Eq. 7}$$

Thus, any device that trusts the public key W can evaluate CC(V) to transfer trust to the smart card associated with public key V, and therefore to CC(C). In various embodiments, more than one CAA smart card may be issued, for example, by utilizing a root CA smart card. For example, the CAA smart card can likewise be issued a certificate CC(W), according to process 800, by a Root CA smart card:

$$CC(W)=[[N_W,W],\text{sig}(r,[N_W,W])] \qquad \text{Eq. 8}$$

Where r is a private key associated with the Root CA card and corresponding to a public key R.

In various embodiments, the Root CA smart card can carry a certificate signed by itself using $N_R$. In some embodiments, $N_R$ is set to 1, but other values maybe used for $N_R$.

$$CC(R)=[[N_R,R],\text{sig}(r,[N_R,R])] \qquad \text{Eq. 9}$$

In this implementation, to insure that all certificates are available whenever authentication is required, each smart card may be equipped with the complete certificate chain from its own certificate to the root R, for example, CC(C), CC(V),CC(W),CC(R).

Using the complete certificate chain, any device that trusts the root key R can verify the validity of each of the certificates to CC(C) and trust that any message signed with c was produced by an authentic smart card. Since all cards carry the Root R, each card can securely authenticate any other card. In some embodiments, a unique ID can be constructed for each card, for example by concatenating a serial numbers associated with each certificate of the plurality of certificates. For example, the unique ID is a 16-byte ID comprising the 4 serial numbers of each certificate where the certificate chain uses 4 smart cards: NR-NW-NV-NC. Thus, the different CA can then be identified as follows: Root CA identified by $N_R$-0-0-0 with certificate CC(R); CAA identified by $N_R$-$N_W$-0-0 with certificates CC(W),CC(R); and CA identified by $N_R$-$N_W$-$N_V$-0 with certificates CC(V),CC(W),CC(R).

Example certificate parameters, include but are not limited, a version number, role number, cosignors required indicator, serial number, operator ID, public key, digital signature, and certificate authority. The version number identifies the certificate format, for example, Version=1 identifies the above described Certificate format. Role number provides for one of 0=User, 1=CA, 2=CAA, and 3=Root CAA. The cosigners indicator may specify the number (0 or 1, 2, etc.) of additional independent signatures required to validate the specified Public Key. The serial number may be, as described above, a 4-byte integer that is incremented by the Certificate Authority each time it signs a Certificate. The operator ID, as described below, may be a 4-byte integer that identifies the owner of the identification credentials associated with a smart card acting as a CA, CAA, or Root CAA. The public key may be a 64-byte ECC sec256k1 public key whose authenticity for the specified role is asserted by the Certificate Authority. The digital signature may be a 65-byte ECC sec256k1 signature, computed by the Certificate Authority over one or more of preceding parameters. In some embodiments, the digital signal is computed over all of the preceding parameters. The Certificate Authority may be a 33-byte compressed representation of the public key used to generate the digital signature.

ii. Attack Mitigation

As described above, if an attacker is able to recover a private key c from an end user smart card, the attacker can create counterfeit transactions that all share the same certificate CC(C). However, as soon as any counterfeit transactions are discovered (for example, as described herein), the ID associated with the compromised smart card can be added to a blacklist. In some embodiments, the smart cards may be configured to store a local blacklist (e.g.., in memory 307), which may be referred to when establishing a trusted connection with another device (e.g. by the device authentication block 390). The smart card may also be configured to regularly consult a network wide blacklist to maintain and dynamically update the local blacklist. In some embodiments, the network wide blacklist may be consulted upon powering on the smart card, upon authenticating the user, and/or upon receiving an incoming message from an external device.

In some embodiments, when a new CA smart card is activated, the certificate therein may include a serial number issuance, N, that is initialized to 1 and a maximum value may set after which it will stop producing Card Certificates for new base level or end-user smart cards. This may place an upper bound on the number of counterfeit smart cards that could be constructed with a compromised CA, unless the compromised CA was also subjected to an attack that exposed the private key, v, or tampered with N. However, similar protections may be placed on up the chain CAAs and Root CAs to protect against attacks in a similar fashion.

Furthermore, if the theft or loss of a CA smart card is detected, all smart card IDs associated with the CC(V) can be added to the blacklist. For example, all smart cards having the unique ID e.g., NR-NW-NV-* and/or only those smart cards where N exceeds the last known good value (X) prior to theft, e.g., NR-NW-NV-N for N greater than X. Additionally, as described above, each smart card, CA, CAA, and Root CA is associated with a registered user via the identification procedure (e.g., biometric templates and identification templates) as described above, thus additional security is provided by restricting access to the smart cards and/or the secure enclave in the memory based on the user identification credentials.

iii. Methodologies for Root CA Vulnerabilities

The CAA activation procedure in accordance with the present disclosure may be configured to allow for the possibility that the Root CA may become inoperative or otherwise compromised in the future. Thus, a number of reserve CAA and/or Root CA smart cards may be created at approximately the same time or immediately after each other, each with max N parameter sufficient to support continued card production, even if one remained as the only operative CAA and/or Root CA. Reserve CAA and/or Root CA smart cards may be stored in a secure physical location, but regularly tested so that replacements can be generated while R remains functional.

If the Root CA is compromised, such can be handled similarly to theft of a lower level CA. In some scenarios, the internal private key of the Root CA cannot be compromised and the Root CA may merely be operated in unauthorized fashion, then only smart cards having an ID with NW greater than some integer X determined to include only existing CAA known to be uncompromised will be added to the blacklist.

iv. Multi-Signature Certificates

In some embodiments, multiple signatures at one or more smart cards within the card certificate chain may be used to provide further security. For example, a plurality of smart cards at the same level of the certificate chain may digitally sign certificates for including in each smart card at the next level in the security chain. That is, in some embodiments, a plurality of CAA smart cards may each digitally sign a corresponding certificate stored with a single CA. Similarly, a plurality of Root CAs may digitally sign corresponding certificates stored with a single CAA. Each upper level smart card may provide its signed certificate to the lower level smart card at different or at approximately the same time.

In some implementations, it may not be necessary for more than one CA smart to sign each new end-user smart card. The assertion of this signature, $sig(v,[N,C])$, is that the newly produced smart card is operating with authentic, uncompromised, and properly configured versions of hardware and software. Thus, adding a second signature to the end-user smart card at manufacture or at some later time would not add much security, as it would not be possible to fully evaluate card integrity once all security measures are active. A compromised CA issuing the first signature could replace valid cards with his signed counterfeits to get the second signature. Alternatively, if two signatures are added simultaneously, then they are probably not adding much independent verification, as the aspects of verification would largely be automated, out of human sight, though depending on the operator who configured it.

However, some embodiments in accordance with the present disclosure may comprise multiple signatures from smart cards higher up the chain. For example, the assertion of a CAA signature, $sig(w,[N_V,V])$, is that the operator (e.g., user) of the newly created CA smart card can be trusted to follow the procedures necessary to make correct decisions about the authenticity of newly manufactured smart cards. This may be essentially a judgment about personnel trustworthiness, which could benefit from a shared responsibility and prevention of any single member of management from intentionally authorizing counterfeit cards or transactions. Furthermore, a new CA may be created at much lower rate than end-user cards, so it should not be burdensome to gather multiple signatures.

Similar reasoning may apply to the operation of the Root CA. Security could be improved by activating multiple Root CA and requiring at least 2 root signatures, $sig(r,[N_W,W])$, to create a new CAA.

FIG. 9 illustrates a smart card certificate chain 900 comprising a plurality of digital signatures for secure authentication of smart card trustworthiness in accordance with various aspects of the present disclosure. For example, FIG. 9 illustrates multiple branches in the certificate chain 900. While the notation shows potentially four distinct Root Certificates, there may be as few as two and as many as desired based on security preferences. In some embodiments, each Root Certificate may be required to be distinct and unique from other Root Certificates. For example, $R_1$ may be distinct from $R_2$ to signify a valid $W_1$ and $R_3$ may be distinct from $R_4$ to signify a valid $W_2$, but there are need not be other uniqueness requirements. In some embodiments, there might only be two Root Certificates in existence. If there are more than two, then all of the $R_1, R_2, \ldots R_n$ must be included on each smart card down the certificate chain, as it can no longer be assumed that any Certificate which the card wishes to authenticate would originate from the same Root(s) as its own Certificate. This may complicate the card serial number $N_R$-$N_W$-$N_V$-$N_C$ definition described earlier, as there may now be four possibilities, depending on which path of the certificate chain is followed. In some embodiments, the serial number ID can adopt the smallest value, where $N_R$ is taken as the most significant digit, $N_W$ is next, and so on.

v. Operator ID

In some implementations, an effective multi-signature scheme may need to distinguish between two cards operated by two people and two cards operated by the same person. Thus, in some embodiments, a smart card may need to be distinguished from an operator of the smart card. This could be regulated by never activating more than a one smart card at a time for any user. However, there may be good reasons for pre-activating "reserve" smart cards, as discussed earlier.

Hence, each smart card may be configured to store an Operator ID that corresponds to the individual whose identification credentials are associated with the smart card. For example, each smart card configured as a CA, CAA or Root CA can be assigned such an Operator ID. When a new CA is activated, the CAA issuing its Certificate could consult a database of IDs (e.g., employee, contractor, authorized users, etc.) to determine the Operator ID of the intended operator, and store that value in the Certificate for the CA. Likewise, for the activation of a CAA or Root CA. In various embodiments, an Operator ID may be stored in smart cards acting as a Certificate Authority in connection to the cosigning function.

vi. Card Authentication Methodology

In accordance with the various aspects of the present disclosure, a message, transaction, and/or data received from smart card may authenticate that the message is from a trusted smart card based on reception of a plurality of certificates. In some embodiments, the plurality of certificates may be based on a certificate chain as described above. In some embodiments, the certificates may be received along with the message, before the message, include in the message, or following the message. While embodiments herein are described with reference to smart card in accordance with the present disclosure, it will be understood that the authentication techniques described herein may apply to any device configured to include the plurality of certificates as described herein for authenticating itself. For example, a mobile device, personal computer, etc.

A process may be executed for authenticating that a message is received from a trusted smart card. That is, to authenticate a smart card the certificate authority process as described above, including but not limited to, single or multiple signatures. In some embodiments, a smart card may present all of the certificates stored therein along with a message signed using its corresponding private key c. For example, as in FIG. 9, a smart card may present seven certificates to reach the Root Certificates that are already available at the recipient, or are obtainable from a trusted source other than the as yet untrusted smart card.

Before computing signatures, a recipient device can confirm that it has all Certificates it may need, for example, confirming that each of the certificates presented by the smart card are correct. The process may utilize certificate parameters described above. For example, the process may comprise the following steps:

1. Extract a Certificate Authority from CC(C) received from the smart card and find a Certificate$_X$ using public key corresponding to the private key used to sign Certificate$_X$, where the extracted Certificate$_X$ indicates Role >=1;
2. if the cosigners indicator for Certificate$_X$ is greater than 0, repeat step 1 as many times as necessary to collect the specified number of cosigners with distinct Operator IDs and find certificates for each (e.g., Certificate$_{X+1}$, Certificate$_{Y+n}$);
3. for each Certificate$_X$ found in step 1, extract the Certificate Authority and find at least one Certificate$_Y$ using public key corresponding to the private key used to sign Certificate$_Y$, where the extracted Certificate$_Y$ indicates Role >=2;
4. if the cosigner indicator for Certificatey is greater than 0, repeat step 3 as many times as necessary to collect the specified number of cosigners with distinct Operator IDs and find certificates for each (e.g., Certificatey$_{Y+1}$, Certificatey$_{Y+n}$); and
5. for each Certificate$_y$ found in step 3, extract the Certificate Authority and find at least one Root Certificate using public key corresponding to the private key used to sign the Root Certificate.

If any of the preceding steps fail, the authentication process fails. In the process of gathering Certificates, the recipient may also combine Certificate Serial Numbers to compute the smart card ID (e.g., NR-NW-NV-NC) and check to insure it is not on a blacklist. In some embodiments, if the authentication process fails, the smart card ID may be added to the local and/or network blacklists.

If the authentication is successful, the receiving device can use the public key of the transmitting smart card (e.g., public key C) to verify that the signature on the message is valid, and then use the Public Key found for each Certificate Authority to validate each of the Certificates necessary to authenticate CC(C).

In some embodiments, the certificate parameters may require 173 bytes for each Certificate. With the cosigning requirement, each card my need to carry seven Certificates plus a Root Certificate for each of the Roots CAs that are defined.

However, ECC signatures may include data that provides for the recovery of the associated Public Key, based on a message and a signature. For example, a standard 64-byte ECC signature may identify up to four possible public keys. The correct one can be identified by including an additional 2-bits, in a 65-byte "recoverable signature". Hence, if Certificates are stored in an order that defines the correct linkage, all of the public keys can be recovered by processing the signatures in the correct order. This may reduce the storage requirement to, for example, 76 bytes per Certificate, at the expense of some additional computation. In some embodiments, an ECC implementation may facilitate public key recovery in about 0.86 seconds, versus approximately 0.78 seconds for signature confirmation with a 64-byte public key. Starting with a 33-byte compressed public key, the verification methods may require equivalent time (e.g., 0.86 seconds).

vii. Fraud Detection

For smart card to smart card transactions it may be easy for each smart card to verify authenticity and refuse to interoperate with any smart card that does not pass verification. Likewise, for non-card devices, as long as the device can acquire the correct values for the Root Certificates CC(R), the non-card devices may be configured to interoperate with any smart card and/or refuse where authentication fails. In some embodiments, the Root Certificates may be made available from an external source. For example, a central data base, a website, etc. secured by a conventional X.509 Certificate issued by a Certificate Authority.

In some embodiments, in the event that any private keys are compromised, the certificates may need to be identified for inclusion on a blacklist. A compromised Certificate would be indicated and otherwise detected by devices based on any digitally signed transaction and/or message that violates rules encoded on valid smart cards. For example, in the case of off-network payments, a double spend transaction may be detected as a compromised certificate. As another example, cards may be programmed to report off-network transactions to a central database or DLT system in the order they were executed. As another example, cards may be programmed to limit the number and/or amount of transactions that may be executed off network until the next reporting exchange. Hence, all transactions that may be vulnerable to counterfeit abuse may be required have a smart card digital signature, in addition to any other signatures which may e.g., control specific funds. Furthermore, these transactions may be gathered in a database that enables cross checking for invalid activity.

viii. Cryptocurrencies

Various embodiments of smart cards in accordance with the present disclosure may be configured to generate transactions for inclusion on in backend system, for example, DLT systems. For example, in the case of off-network transactions using an established cryptocurrency (e.g., Bitcoin, Auroracoin, PotCoin, Ethereum, etc.), smart cards described herein can generate a standard transaction and wrap the transaction in an outer signature based on the corresponding Card Certificate for transmission to a recipient device. The recipient device may remove decrypt outer signature, for example, using a public key of the transmitting card, for submission to a blockchain. In various implementations, DLT systems may utilize proof of work, proof of stake, directed acyclic graph (DAG), etc. to verify the transaction record information as an authentic transaction. In a case were the transaction does not clear, for example, were the transaction occurred off-network, the smart card and/or the recipient device may retain the original transaction as proof that it was generated by an authenticated smart card. In effect, this methodology may serve as both a protection for end users and a bounty for hackers.

For a private fiat based payment system, the procedure may be substantially similar. However, fraud may be detected when payments in connection a transaction are submitted for redemption into fiat currency. In this case, the system might include additional incentives for regular transaction reporting, even if there is no desire to cash out.

ix. X.509

In some embodiments, smart cards described herein may be configured to support X.509 Certificates. Such implementation could permit interoperation with existing software and systems that may become of interest. If such needs are identified, the certification generation and authentication methodology described herein may be augmented with other formats are needed for external consumption.

For example, if an existing smart card needed to acquire an X.509 Certificate to prove its identity to an external system, the smart card could generate a new private key k and emit the public key K, signed with our internal authentication key, c. Software configured with public root keys, R1, . . . Rp, could validate the card certificate CC(C) and return an X.509 certificate for K. In some embodiments, the software needed to perform these steps may be programmed into the smart card, along with the storing and using the X.509 certificate. Such implementations would not impact other card certification processes, but would be a consumer of the resultant CC(C).

Furthermore, the certification generation and authentication methodology described herein provides several advantages over the X.509 standard currently used to authenticate web sites, which has several problem when implemented in the smart cards described herein. For example, there is no support for multi-signature authorizations. Additionally, X.509 includes a great deal of complexity irrelevant to the smart cards described herein. For example, parsing bugs are still being discovered in mainstream implementations even after decades of use (see e.g., HTTPS://WWW.ZDNET.COM/ARTICLE/TWO-HIGHLY-DANGEROUS-OPEN-SSL-SECURITY-BUGS-HAVE-BEEN-PATCHED/). At least one respected security expert has recommended developing application specific PKI's whenever possible: "PKIs designed to solve a particular problem are easier to work with than a one-size-(mis)fits all approach" (see HTTPS://WWW.CS.AUCKLAND.AC.NZ/~PGUT001/PUBS/PKI-TUTORIAL.PDF). Nonetheless, as described above, support for X.509 Certificates could provide for interoperation with existing software and systems.

x. Encryption

In addition to providing authentication, the certification generation and authentication methodology in accordance with various aspects of the present disclosure may also be configured to facilitate private communication with a secure enclave of a memory. That is, if an external party or device wanted to store some secret or otherwise confidential data on the card that was inaccessible to even the card user, a secure enclave of the memory could be partitioned and encrypted using the public key C obtained from the Card Certificate. Only the device in possession of the private key c could the decrypt the content stored within the secure enclave.

H. Immutably Storage of Data, Transactions and/or smart contracts,

In various embodiments, with reference to FIG. 7, smart cards 712E in accordance with the present disclosure may utilize the user and device identification and authentication protocols in accordance with the present disclosure to store data, transactions and/or smart contracts supported by backend systems, for example, private/public DLT systems 730 and/or a central database system 740, 745 (sometimes referred to herein collectively as "backend systems"). By utilizing the DLT backends 730, smart cards 712E can keep data, transactions, and/or smart contracts immutable, opposed to being tracked and recorded by the smart cards. For example, the smart cards can input and output such data, transactions, ledgers and/or smart contracts (sometimes referred to herein as transaction record information) to a central database system 740, 745 and/or a DLT system 730 when wide area connectivity via network 720 is available. The smart cards and/or external devices configured in accordance with the present disclosure may settle the local transactions that were stored on the devices 712 in response to the connectivity. Once data, transactions, etc. are input to the smart cards that can support connecting to other smart cards 712D or clients on phones 712A or other devices via PAN/WAN 710 for a meshed off internet transaction which are later settled with the DLT 730 and/or central database 745 backend system 740 providing input/output data/ transactions to our card/client based off network mesh services. In various implementations, DLT systems may utilize proof of work, proof of stake, directed acyclic graph, etc. to verify the transaction record information as an authentic transaction and central database systems may utilize time stamping and sequencing to verify the transaction record information as an authentic transaction.

To provide such immutability, an off network payment system using smart cards according to the embodiments herein and identification and authentication protocols described above is detailed below. This immutability also applies to other data, none payment transactions, and/or smart contracts.

i. Off-Network Payments between Secure Elements and or mobile clients

To provide off network transactions the smart cards are configured to distribute trust as described above and immutable local store of data or value enables off network payments between cards or card to mobile clients.

Electronic payment systems typically depend upon trusted third parties to validate transactions and maintain balances in a centralized ledger. A drawback of this approach is that transactions are not possible when the centralized ledger is inaccessible, due to inadequate network connectivity or other system failure. A secure element executing tamper proof protocols as described herein can distribute trust to each end user, so that trusted transactions can be executed immediately by any two parties that are able to connect to each other, independent of other systems.

Figure 10:
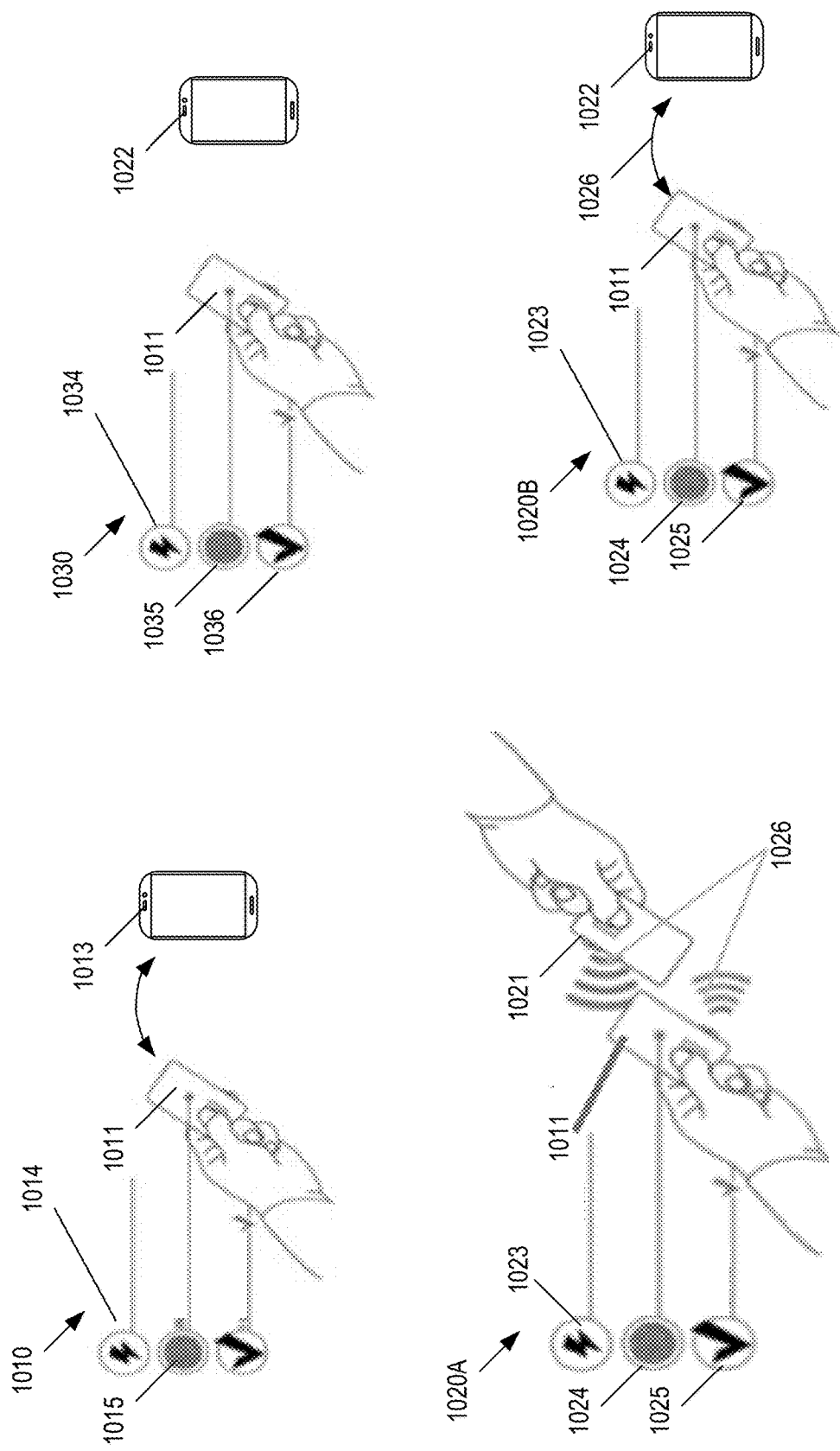
FIG. 10 illustrates an example use case of off network transactions using the smart cards in accordance with an example embodiment.

For example, FIG. 10 illustrates an example use case of off network transactions using the smart cards in accordance with the present disclosure. At 1010, a user may load a smart card 1011 from an account (e.g., a fiat and/or crypto account). The account may be an accessed via a mobile device 1013 or personal computer (not shown). To load the account, the smart card may use one or more communication protocols to access the account. As illustrated, at 1014, the smart card 1011 connects to the account via any communication protocol. Once connected, at 1015, a biometric credential is received by the smart card 1011 and authenticated (e.g., as described above), and the smart card 1012 is loaded with the desired amount from the account.

Next, the user of smart card 1011 may wish to use credits on the smart card 1011 from step 1010 to conduct a transaction with another person, as shown in steps 1020A and 1020B. Step 1020A illustrates an example where the smart card 1011 is used to conduct a transaction with another smart card 1021 (e.g., direct card to card transaction). Similarly, step 1020B illustrates an example where the smart card 1011 is used to conduct a transaction with a user of an external device 1022 (e.g., a mobile device in this example, but other external devices are possible). In both scenarios, there may not be any wide area connectivity, and the smart card may connect via PAN connectivity 1026. For example, BLE communications may be initiated utilizing power from a battery of the smart card, at step 1023. Once PAN connectivity is established, biometric credentials may be authenticated at step 1024 and the transaction conducted at step 1025. In some embodiments, trust may be established as described above following establishment of the PAN connectivity, and either before or after biometric credentials are authenticated. In both scenarios, no data coverage is needed.

At step 1030, the user of smart card 1011 may settle the transaction by accessing the account from step 1010 when connected to a wide area network. Once WAN connectivity is established at 1034, biometric credentials may be authenticated at step 1035 and the transaction can be settled at step 1036. In some embodiments, settling the transaction may include uploading the transaction to a blockchain (e.g., blockchain 738 of a DLT 730 backend) and/or to a central database 745 via server 740.

In some embodiments, a shared ledger may be included to perform the following functions:
1. audit transactions and identify counterfeit or compromised secure elements that are not executing the protocol correctly;
2. allow users to recover funds in the event that their secure element is lost or malfunctions; and
3. allow transfer of fund to or from accounts that are not under the control of a secure element The operator of the ledger may be one of systems 738A-F (referred to herein as a Bank). They systems 738A-F may provide a guarantee that the digital tokens being exchanged by the secure elements can be redeemed for other forms of currency. Various embodiments herein, use asymmetric cryptography to place funds and other transaction data under the control of a private key known only to the secure element (e.g., private key c as described above). The secure element can then execute algorithms that increment and decrement balances honestly, with each transfer authorized by its digital signature.

There are then two challenges:
1. How to be certain the parties of a transaction are authentic secure element operating according to these protocols; and
2. How to securely transfer transactions between secure elements over an unreliable, potentially adversarial, communication channel.

Methods and protocols for verifying authenticity of each secure element using one or more digital certificate is described above, and will be assumed to exist.

While some methods exist for establishing secure communications over unreliable networks, none of these methods can guarantee that transmitted messages arrive. Furthermore, when a sender fails to receive a message acknowledgment, they cannot know whether the message was lost or the acknowledgment was lost. In this setting, the following protocol is adopted to transfer value from one secure element to an external device (e.g., another secure element or device configured in accordance with the present disclosure).

ii. Payment System Overview

Figure 11:
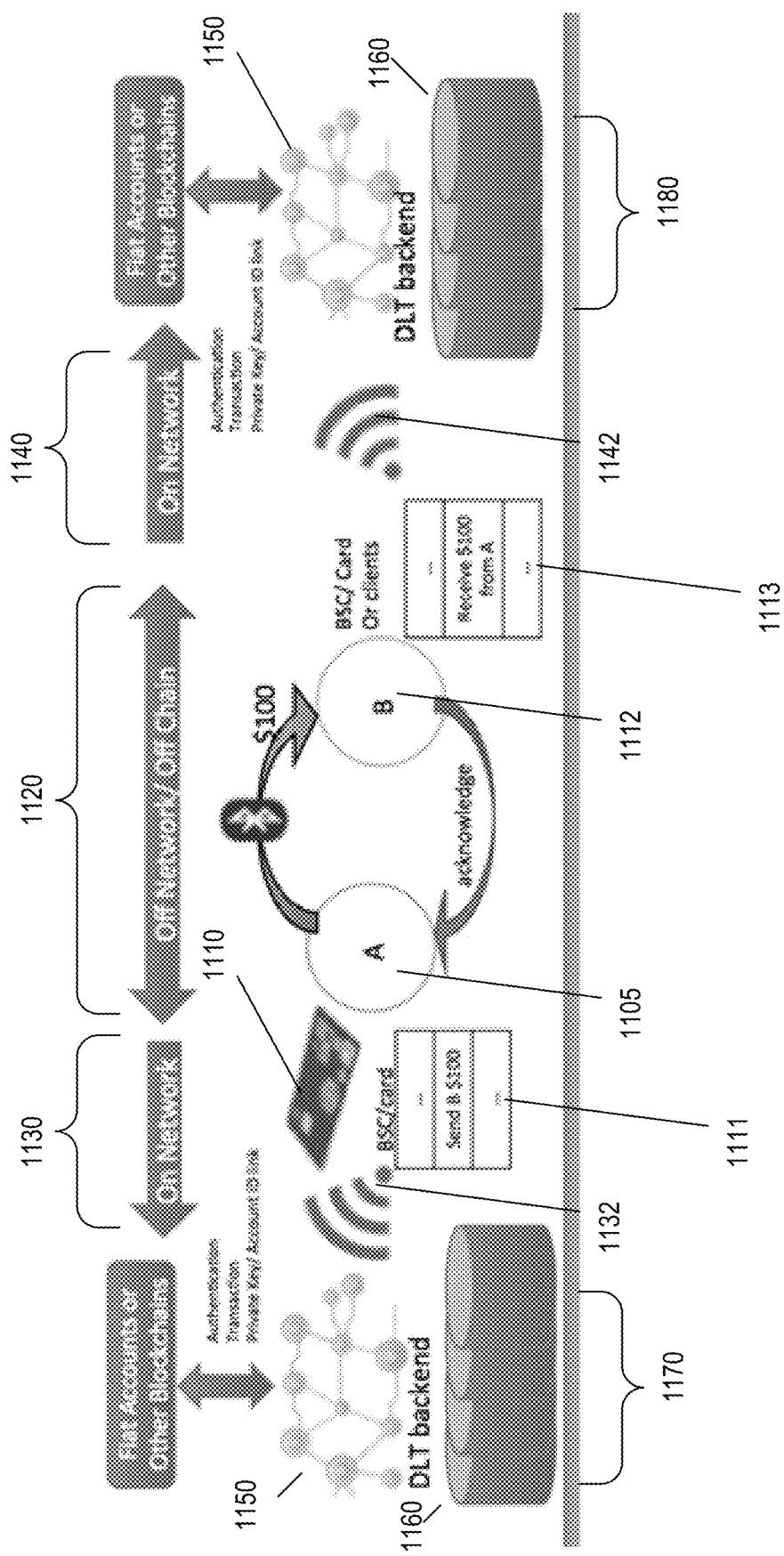
FIG. 11 illustrates a schematic diagram of an example off network payment and backend system in accordance with an example embodiment.

FIG. 11 illustrates a schematic example off network payment system and DLT backend for when on network, thus providing various recovery and input output verification and authentication transactions. A registered user 1105 (e.g., a card holder) may create a digital wallet on a smart card 1110 and transfer value to the digital wallet from a fiat account, a Payment Terminal, or a crypto digital wallet. The transfer may be via a mobile device running an application having access to the account, through a website or portal operating on a device, or the like. The smart card 1110 may be substantially similar to the smart cards described throughout the present disclosure. The smart card 1110, through the digital wallet, may store the value in an immutable local ledger, and in some embodiments, with no passphrase recovery and a daily access limit.

Referring to FIG. 11, the user may be able to use the smart card 1110 to pay other recipients 1112 at step 1120. In some embodiments, payment may be performed over a PAN connection between an application running on another device (e.g., a mobile device that support SDKs) or other smart card holders. The PAN connectivity may be established via using BLE even when off network and may utilize the identification and authentication protocols as described in the present disclosure. The smart card 1110 may store an immutable local ledger 1111 indicative of a debit (e.g., payment to recipient 1112) related to the transaction and the recipient 1112 may store an immutable local ledger 1113 indicative of a credit (e.g., received payment from smart card 1110) (collectively referred herein in reference to FIG. 11 as "the transactions"). In some embodiments, the recipient device 1112 may respond to an Offer from smart card 1110 with an acknowledgment message.

At steps 1130 and 1140, each device (e.g., smart card 1110 and recipient device 1112) may establish WAN connectivity and the transaction may be sent out via a wireless communication protocol as signals 1132 and 1142. The transactions may be sent out of the digital wallet of the smart card 1110 and the recipient device 1112 (or a digital wallet of the recipient device 1112), and to a DLT backend system 1150 (or native to the coin's supported or utilizing smart cards private DLT) or central database 1160, at steps 1170 and 1180, respectively. The DLT backend system 1150 and central database system 1160 may be substantially similar to the DLT backend system 730 and central database system 740 of FIG. 7. In some embodiments, the recipient 1112 may have a predetermined number of days to post the received transaction to the backend system 1150 or 1160 when WAN connection available. All non-posted transactions may be returned to the payers (via time locked transactions after the predetermined days via the smart cards 1110 DLT backend (or native DLTs) or central database.

iii. Payment Transfer Protocol

In various embodiments, below is a process for transferring payment from embodiments between secure elements (e.g., as comprised in a smart card according to various embodiments and/or other devices) in accordance with various aspects of the present disclosure. The process stats with, step (1) where a potential payment Sender (e.g., a sending secure element of a smart card or other device) transmits a payment Offer of the following form:

$$\text{Offer: } X<S,\text{Limit},\text{Expire}>\text{SIG}(b) \qquad \text{Eq. 10}$$

Where, X is the payment amount the Sender is proposing; S is a hash of the public key associated with the Sender, which serves as an account identifier throughout the protocol; Limit is the maximum outstanding payment amount currently authorized by the Bank (e.g., the account operator) for S; Expire is a date after which the Bank may refuse to honor the Payment Transaction; $<>\text{SIG}(b)$ is a digital signature using the private key b corresponding to the Bank, whose associated public key is known to all participants in the payment network. In some embodiments, all digital signatures used by the protocol may be based on the Elliptical Curve Cryptography (ECC) family, and having the property that the associated public key can be recovered from a signature and the data that was signed. For example, Elliptic Curve Digital Signature Algorithm (ECDSA) using sec256k1, or another Elliptic Curve. Other cryptographic algorithms are possible, for example, but not limited to, Rivest-Shamir-Adleman (RSA), Digital Signature Algorithm (DSA), and Edwards-curve Digital Signature Algorithm (EdDSA).

The $<S,\text{Limit},\text{Expire}>\text{SIG}(b)$ parameter may be generated and returned by the Bank each time the Secure Element and/or smart card comprising the Secure Element therein synchronizes with the Ledger (e.g., as recorded in a blockchain of a DLT system and/or central database). In some embodiments, the secure element may be configured to synchronize in a timely fashion and to limit the amount of unsynchronized transactions outstanding, as will be described in below. The Expire parameter may also play a role in the recovery of funds if a smart card is lost or malfunctions and/or the Secure Element therein is otherwise compromised.

At step (2), upon receipt of a payment Offer, a receiving Secure Element (e.g., Recipient) may evaluate SIG(b) and confirm that SIG(b) is associated with a Bank which it has an account with. In some embodiments, the Recipient also comprises its own Secure Element in accordance with embodiments herein, but this need not be necessary. The Receiver then unpacks the Offer to extract parameters therein. The receiving device may check whether X is within the Limit parameter, for example, by confirming that Limit is greater than X plus a sum of any Payment transactions it has previously received from the Sender, but which have not yet synchronized with the Ledger. In the case where the Recipient has access to a real time clock, it may evaluate the Expire date directly and accept the Offer if it will have a sufficient window of time to synchronize with the Ledger. If the Recipient has no clock, it may display the Expire date for the user to evaluate based on their knowledge of the current time. Also, Recipient may compare the Expire date to the date provided by the Ledger the last time it synchronized, as a lower bound on the current date.

At step (3), assuming the Recipient chooses to accept the Offer, the receiving device may generate a payment Claim of the following form:

$$\text{Claim: } <S,X,E,N_R>\text{SIG}(r),R \qquad \text{Eq. 11}$$

where: S is the Sender public key hash/account from the Offer; X is the amount to be transferred, copied from the Offer; E is the Expire date copied from the Offer; $N_R$ is a sequence number that the Recipient increments each time they generate a claim or payment; $<>\text{SIG}(r)$ denotes a digital signature using the private key r of the Recipient over the elements contained in the brackets; and R is a hash of the public key associated with the private key r. The hash of the Public Key may serve as an account number, that is more compact than the full public key, but still sufficient to verify associated signatures At step (4), the Recipient may add the Claim to a list of Pending Claims and transmits it to the Sender. At step (5), upon receiving the Claim, the payment Sender may verify that their current account balance is at least X and return an error if it is not. At step (6), the Sender may next verify that SIG(r) is valid. This may be achieved by recovering the public key from SIG(r), computing the hash, and verifying that it is equal to R. This step may guarantee that the Recipient has control over the account to which the funds will be transferred, and desires to receive the amount X. At step (7), provided their current account balance is at least X, the payment Sender decrements the account by X and generates a Payment transaction of the following form:

$$\text{Payment: } <<\text{Claim},N_s>\text{SIG}(s),S>\text{SIG}(c_S),\text{CERT}(C_S) \qquad \text{Eq. 12}$$

Where, Claim is the payment claim described in step 3; $N_s$ is a sequence number that the Sender increments each time they generate a claim or a payment; $<>\text{SIG}(s)$ denotes a signature in the Sender private key s, over the elements contained in the brackets; S is a hash of the public key associated with the private key s of the Sender; $<>\text{SIG}(c_S)$ denotes a signature in the private key $c_S$ associated with the Secure Element that is hosting the account S; and $\text{CERT}(C_S)$ is issued by a Certificate Authority that is recognized by the Recipient and verifies that the Sender can be trusted to execute the payment protocol correctly (as described above).

At step (8), the Sender then saves the Payment transaction to a Sent Payments list, and sends a copy to the Recipient. At this point, the amount X has been decremented from the Sender account balance, but it belongs to no one until the Payment transaction reaches the Recipient and/or is synchronized with the ledger. Hence, the Sender has no motive not to resend any Payment on the Sent Payments list if the Claim is resubmitted, e.g., if the original transmission were lost.

At step (9), upon receiving the Payment, the Recipient may check to see whether the Claim sequence number $N_R$ matches a Claim on their Pending Claim list. If it does not, the Payment is ignored. If it is on the list, it is removed, and processing proceeds. This may insure that the Recipient will not accept the same Payment twice.

At step (10), the Recipient may verify that SIG(s) is correct. This may be achieved by recovering the public key from SIG(s), computing the hash, and confirming that it equals S. This may confirm that the operator of the Sender has transferred the specified amount X. At step (11), the Recipient may verify that SIG($c_S$) is correct, according to the trusted Certificate CERT($C_S$). This may confirm that the Sender account is being hosted by an authentic Secure Element that can be trusted to execute the payment protocol correctly. At step (12) the Recipient may increment their current account balance by the amount X, and save the Payment to list of Complete Receipts.

In some embodiments, one or more of the above steps may not be performed without authenticating the user, for example, through the user identification protocol and user credentials in accordance with the aspects of the present disclosure. For example, an Offer, Claim, or Payment may not be generated and/or sent without first confirming that the user is a registered user of the device. Thus, the secure element may be able to securely store data without risk of access by an interloper and similarly may not send data until access is authenticated.

iv. Ledger Synchronization

In various embodiments, each secure element (e.g., as comprised in a smart card according to various embodiments and/or other devices) may periodically connect to the shared Ledger as recorded with a DLT system and/or central database and uploads all Pending Claims, Complete Receipts and Sent Payments. In some embodiments, transactions may be uploaded based on the sequence in which they were received, for example, sequentially in accordance with the order they were generated to guarantee that there are no gaps in the sequence number space, in the event the upload is truncated. In some embodiments, transactions may be uploaded in any order, for example, non-sequential/. Each uploaded transaction may be acknowledged by the Ledger, allowing the secure element to delete it or mark it as synchronized. In some embodiments, a plurality of device (e.g., one or more smart cards or other external devices) may have a plurality of transactions to upload to the backend system, which may be uploaded in an asynchronous and non-sequential order and the backend system may then validate the transactions via one or more of: proof of work, proof of stake, DAG or time stamping and sequencing.

As mentioned above, Secure Elements may be required to synchronize with the Ledger to reset their Expire date to facilitate further Payment transactions. However, a counterfeit or compromised secure element may be motivated to keep transactions secret as long as possible, to avoid detection of conflicts. The Ledger cannot be certain what the largest sequence number so far issued by a given secure element may be, but it will know a lower bound based on transactions uploaded by parties to the transactions. Hence, it can refuse to reset the Expire date until all transactions have been uploaded at least to this point. To prevent a counterfeit from incrementally uploading transaction until they discover this minimal bound, each synchronization session may begin with the Secure Element specifying the largest transaction sequence number it has available to upload. If this specification is less than the lower bound known to the Ledger, the Secure Element may be identified as corrupt and/or compromised and added to the blacklist. Otherwise, the Ledger may wait until all specified transactions have been uploaded and validated before returning an updated Expire date.

The Secure Element signature, SIG($c_S$),CERT($C_S$), may be required to assure a payment Sender is hosted by an authentic Secure Element in accordance with the aspects of the present disclosure. In various embodiments, account S corresponding to the Sender, may be associated with a single Secure Element (e.g., associated with the Sender) which knows the corresponding private key s. Hence, the association can be registered with the Bank at the time the account S is activated, eliminating the need to include the signature of the Sender on messages that are already signed using S.

An example, consider an upload from account R which included interactions with other accounts S, T, U. The uploaded transaction sequence might be: <<S, 50,E, 101>SIG(r),R,$N_S$>SIG(s); <<T,75,E,102>SIG(r),R,$N_T$>SIG (t); <<R,80,E,$N_U$>SIG(u),U,103>SIG(r); <<S,20,E, 104>SIG(r),R; and <<R,60,E,$N_T$>SIG(t),T,105>SIG(r). Transaction 101 (e.g., <<S,50,E,101>SIG(r),R,NS>SIG(s)) specifies a credit of 50 from account S, with expiration E. Transaction 102 (e.g., <<T,75,E,102>SIG(r),R,NT>SIG(t)) specifies a credit of 75 from account T, with expiration E. Transaction 103 (e.g., <<R,80,E,$N_U$>SIG(u),U,103>SIG(r)) specifies a debit of 80 to account U. Transaction 104 (e.g., <S,20,E,104>SIG(r),R) specifies a Claim for a credit of 20 for which no Payment was received. Transaction 105 (e.g., <<R,60,E,$N_T$>SIG(t),T,105>SIG(r)) specifies a debit of 60 to account T.

The Ledger (e.g., DLT system and/or central database) may be configured to verify the internal consistency of the uploaded transactions by verifying there are no gaps or duplicates in the sequence numbers (e.g., 101, 102, 103, 104, and 105) associated with R. The next step performed by the Ledger is to verify that all digital signatures are valid, and then to process the debits and credits sequentially to insure that R never issued a Payment that was larger than their balance at that time.

In some embodiments, the objective of the Expire parameters E is to encourage recipients to synchronize with the Ledger as quickly and as practically as possible, and to discourage Recipients from accepting payments that are nearing their expiration. Additionally, the Expire parameter may encourage Senders to synchronize with the Ledger frequently, in part, to reset their current Expire parameter. In some embodiments, the Ledger may also be configured to permit a grace period and accept expired transactions, unless the grace period has also elapsed. The grace period may be predetermined as desired by the system operator(s).

Once the debits and credits are processed with respect to account balance of the synchronizing account R, the transactions may be inserted into the Ledger while verifying that there are no conflicts with other transactions stored in the Ledger. In various embodiments, each account may have exactly one transaction corresponding to each sequence number, up to the maximum sequence number as set within the DLT or central database. In some embodiments, the process herein may be performed following and/or in response to establishment of WAN connectivity with devices involved in the transaction.

In accordance with various embodiments herein, below is a process for synchronization of a DLT and/or central database system (referred to herein as the backend system collectively) in accordance with various aspects of the present disclosure. At step (1), the Ledger is accessed by the backend system and a sequence number 101 for account R (e.g., R:101) is located1. If it does not exist, the backend system may insert R:101 (e.g., <<S,50,E,101>SIG(r),R, $N_S$>SIG(s)). If it does exist, the backend system may verify that R:101 matches the newly uploaded transaction. If the Claim portions are different, then R is identified and/or detected as corrupt and the secure element associated with R may be added to the blacklist. If $N_S$ is different, then S may be identified as corrupt and the secure element associated with S may be added to the blacklist. At step (2), the backend system may access and look up transaction $S:N_S$ (e.g., a corresponding payment transaction uploaded by the secure element corresponding to S). If it already exists, the backend system may verify that it matches as in step (1) above. If it does not exist, the backend system may insert $S:N_S$ into the Ledger. If the S:NS is newly inserted, and there are no missing transactions preceding it in the S transaction history, then the backend system sequentially debit/credit the S balance, beginning with $N_S$ and proceeding to the first missing transaction based on sequence numbers. If the balance ever becomes negative, S is may be identified as corrupt. At step (3), the process is repeated for transactions R:102, $T:N_T$, R:103, $U:N_U$.

For an uncompleted Claim, as in R:104, a mismatch may be allowed, as long as the Claim portion matches. This may correspond to the case where the Claim arrived at the intended Sender, but the Payment transaction never made it back to the Recipient. In that case, the completed Payment transaction may be returned to the intended Recipient so they can increment their balance. Alternatively, the Claim may never have arrived at the intended Sender, so there would be no other representation of transaction R:104 in the Ledger. Note that the upload of a completed Claim from S (e.g., Payment) may occur before or after an uncompleted Claim was submitted by R. In the latter case, the Ledger may be required to mark the Claim from S as a pending transfer the next time R connects over the WAN.

In some embodiments of step (2) above, the possibility that $S:N_s$ may have missing transactions preceding it in the S history may prevent the detection of a balance over-run. This possibility may be eliminated if S were to include a record of its unsynchronized transaction history to R at the time of the Payment. Then R could upload these transactions with its own transactions to insure that the backend system could detect a balance over-run at $S:N_S$ and identify the corresponding secure element as corrupt and/or compromised even if S has not yet synchronized its own transactions with the Ledger. In some embodiments, however, by processing the S history uploaded by R, the Ledger might encounter transactions between S and third parties, whose balances cannot be computed due incomplete transaction histories.

In some embodiments, to insure that the balance updated for R at the end of synchronization contains no amounts derived from an unknown origin, each Payment transaction may need to include the Sender's outstanding transaction history, as well as the outstanding transaction histories provided by each Sender to it, and so on, in recursive fashion (also referred to herein as "Supporting Transactions"). Depending on payment patterns and synchronization frequencies, these Supporting Transactions could grow to be a large volume of data, which could increase the duration and power consumption to complete a Payment exchange, as well as increasing storage requirements.

In some embodiments, if the likelihood of corrupt secure elements is low, and the Limit and Expire parameters are set appropriately, the Bank may be willing to cover potential losses associated with delayed detection of a corrupt secure element. In various embodiments, to balance counterfeit risk against Payment efficiency along a more continuous scale, a number of policies may be introduced to regulate the volume of outstanding transactions unknown to the backend system. For example, if a given secure element has any large transactions in its history that have yet to be uploaded, these could be included with the Supporting Transactions and uploaded along with or close in time with any Payment transactions. In some embodiments, small transactions may remain local until synchronization.

However, an accumulation of many small transactions may be as important as a single large one, so this feature could be parameterized in more cumulative fashion. For example, the secure element may add up all of its outstanding credits transactions in one sum, and its debits transactions in another. If either value exceeds a threshold, the secure element may remove transactions from the totals until both totals are below the threshold. For example, the threshold may allow balance changes of less than $50 in either a positive or negative direction to remain outstanding until the next WAN reporting opportunity. Or, this threshold might be enlarged for an account with a larger last synchronized balance or longer history of valid transactions. The removed transactions may be included in the Supporting Transactions set. Furthermore, in some embodiments, any Supporting Transactions which a secure element receives from other secure elements may be included in the Supporting Transaction set. In this way, the secure elements may be configured to store a pool of relatively insignificant transactions in local memory until the secure element is connected to the backend system, while larger transactions may be pushed to the backend systems via peers. This approach may accelerate the detection of any corrupt participants.

Another example method to balance counterfeit risk against Payment efficiency may be for a secure element to include in Supporting Transactions set any Payment Receipts necessary to insure that their last synchronized balance plus the Payment Receipts exceeds the sum of their Payments sent.

In some embodiments, a secure element may receive a plurality of Supporting Transaction received from an external device according to protocol rules that require sharing of the Supporting Transactions. These Supporting Transactions may be stored in the memory of the smart card and comprise one or more transactions configured to detect compromised cards. In some embodiments, the smart card may be configured to transmit the one or more transactions configured to detect compromised cards along with transmissions as part of the payment transfer protocol. In some embodiments, one or more other Supporting Transactions may be omitted to reduce time and power consumption as described above.

In some embodiments, protocol rules may include a sharing any transaction information between the external device and the smart card that have yet to be transmitted to the backend system and are necessary for settling the transaction at the backend system. For example, the protocol rules may require a payment sender to share with the recipient any pending payment transactions the sender received that have yet to be reported to the backend systems and are necessary for completion of the current transaction. In some embodiments, any other Supporting Transactions that the sender received along with the un-reported transactions may be included.

In some embodiments, the protocol rules may include sharing transactions that exceed a threshold value and have not been uploaded to the backend system. For example, the protocol rules may require a smart card to share with other external devices every transaction not yet reported whose transaction amount exceeds a threshold value. In some embodiments, the backend system may set the threshold value.

The operative parameters for the above policies and methods could be returned each time a secure element synchronizes with the backend system, to allow different parameters for different accounts, possibly varying with history and balance. Failure to respect the operative policy could be detected as the transaction history fills in.

v. Blacklist/Certificate Revocation

As described throughout the present disclosure, if any incorrect account behaviors are detected by backend system, for example, during synchronization, the certificate of the infracting element associated with the account can be added to the blacklist. The blacklist may be a list of a plurality of unauthorized secure elements identified by corresponding serial number and identifiers in accordance with the present disclosure. In some embodiments, each secure element may store in memory (e.g., memory 307 of FIG. 3B) and maintain a local copy of the blacklist. The local copy may be updated each time the secure element synchronizes with the backend system. The blacklist may be checked before any transactions are entered into and/or during establishment of a trusted connection with another device and/or secure element (e.g., by the device authentication block 390).

vi. Lost or Malfunctioning Secure Element

In accordance with the aspects of the present disclosure, each time a secure element synchronizes with the backend system, the Bank may be configured to calculate and return to the secure element an Expire parameter. The Expire parameter may apply to any transactions the secure element generates up until the next synchronization. The Bank may also store this parameter into memory with the associated account. In the event that a user reports their secure element has been lost, malfunctions, and/or otherwise compromised, the Bank may mark the account within its system to block any further updates to the Expire parameter. Then, once the Expire parameter has passed, the account balance can be updated to include any transactions that have arrived, and transferred to a previously established recovery account, which the user can access without the secure element.

vii. Sending Payments to Recipients without Secure Elements

In various embodiments, a secure element can use the preceding protocol to send payments to accounts that are not hosted by or otherwise connected to a secure element. In some embodiments, such use may be possible as long as the recipient has established an account with the Bank. Establish an account may be based on registering a public key corresponding to the recipient with the Bank. Then, the recipient may need only to present each received Payment transaction to the Bank via the backend system for executing and conducting transactions in connection with their account. In this case, the Claim sequence number $N_R$ may be immaterial, e.g., the backend system may be configured to recognize any duplicate Payments by the Sender sequence number $N_S$. In some embodiments, this sole reliance on $N_S$ may not be available for the secure element to detect duplicate Payments, because it does not necessarily keep a permanent history of every payment it has received.

In some embodiments, the secure element may be able to receive payment from Senders who do not have a secure element. For example, the Bank may credit the balance held by a secure element using the protocol above, except the Payment may be signed by the Bank rather than the by the Certificate, $CERT(C_S)$, of the secure element. In some embodiments, a secure element may not be able to receive Payment from an account not hosted by another secure element.

viii. Blockchain and other DLT backends

In some embodiments, the systems and devices herein may be configure to use a central database operated by a trusted Bank, a public DLT system, and/or private DLT system, as described above. In some embodiments, using a DLT system (either public or private), may comprise the follow parameters First, the core transaction format may be adjusted to match the exact requirements of the DLT system. Additional protocol elements to support off-network operation, such as the Offer, Claim, and Secure Element digital signatures and certificates, can be wrapped around this core format, and then omitted for posting to the DLT system when network access becomes available.

Second, while the above described transaction protocol can prevent duplicate payments from other secure elements, an alternative method may be implemented to recognize duplicate payments from parties not hosted by a secure element. For example, in some embodiments, the secure element can generate a new random public/private key pair for conducting each transaction (e.g., receiving a new payment), add the transaction to a pending list, and then remove it from the pending list when the transaction is completed (e.g., received). Alternatively or in combination, the secure element may be configured to maintain a permanent record of all previously received payments, which may be abbreviated according to the structure of the particular DLT protocol. For example, in some embodiments, transactions from a given account may have an ascending sequence number, so the secure element may need only save the largest sequence number from each account for which the transaction is related.

Third, in some DLT systems, the option to allow transactions to arrive at the backend system out of order may not exist. Hence, for these systems, all Supporting Transactions may then be required to be passed along with every Payment transaction, so to be submitted in the proper sequence when access to the DLT becomes available.

Fourth, in some embodiments, the automatic fund recovery procedure built in to the above described protocol via the Expire parameter may not exist for all DLT systems. To the extent this parameter does not exist, these technologies may offer time-locked transactions by which a similar recovery scheme could be implemented, but with additional transaction overhead.

I. Multiple Signatures and Recovery of Stored Data

In accordance with various aspects of the present disclosure, when connected to backend systems, accounts on the distributed off network (e.g., the p2p trust mesh network as described above) may be setup via one or more backend systems. For example, as described throughout the present disclosure, the backend systems may comprise one or more of a central database managed via private/public key implementations, public DLT based private/public key management approaches, and/or a private DLT system configured to support transactions of various forms of data or smart contracts. To support account custody and data recovery, private keys associated with a secure element may be recoverable via pass-phrases that need to be kept secure by users or the system. It is to be understood that private keys that users can recover cannot be used for off-network payments as described herein, because, in some embodiments, the secure element may not have a way to regulate transactions and maintain correct account balances if the keys are available to other entities to sign transactions.

For example, accounts associated with a smart card comprising a secure element in accordance with the present disclosure may be configured to support multiple signature accounts (e.g., multiple digital signature and/or certificates as described above), in addition to single signature transactions. Thus, transactions into or out of smart cards configured for multiple signatures may require all of the digital signatures of all parties in order to conduct transactions and/or data exchange. The multiple digital signatures can be coordinated by the parties via secure email; or SMS, MMS, RCS, etc. content; and/or via encrypted internet protocol based communications using the same identity and authentication scheme in accordance with the present disclosure. In some embodiments, the signatures used for control of cryptocurrency assets stored on the DLT system, for example, a DLT system that supports multi-signature transactions.

In some embodiments, for example a self-custody model, users can store passwords for the account themselves. In some implementations, these accounts may require multiple signatures where one or more users have access to recovery pass phrases.

In some embodiments, the system may be configured to allow users not to store pass phrases for certain accounts where a third party custody account is set up to receive time locked transaction data from lost or malfunctioning cards as described earlier.

Figure 12:
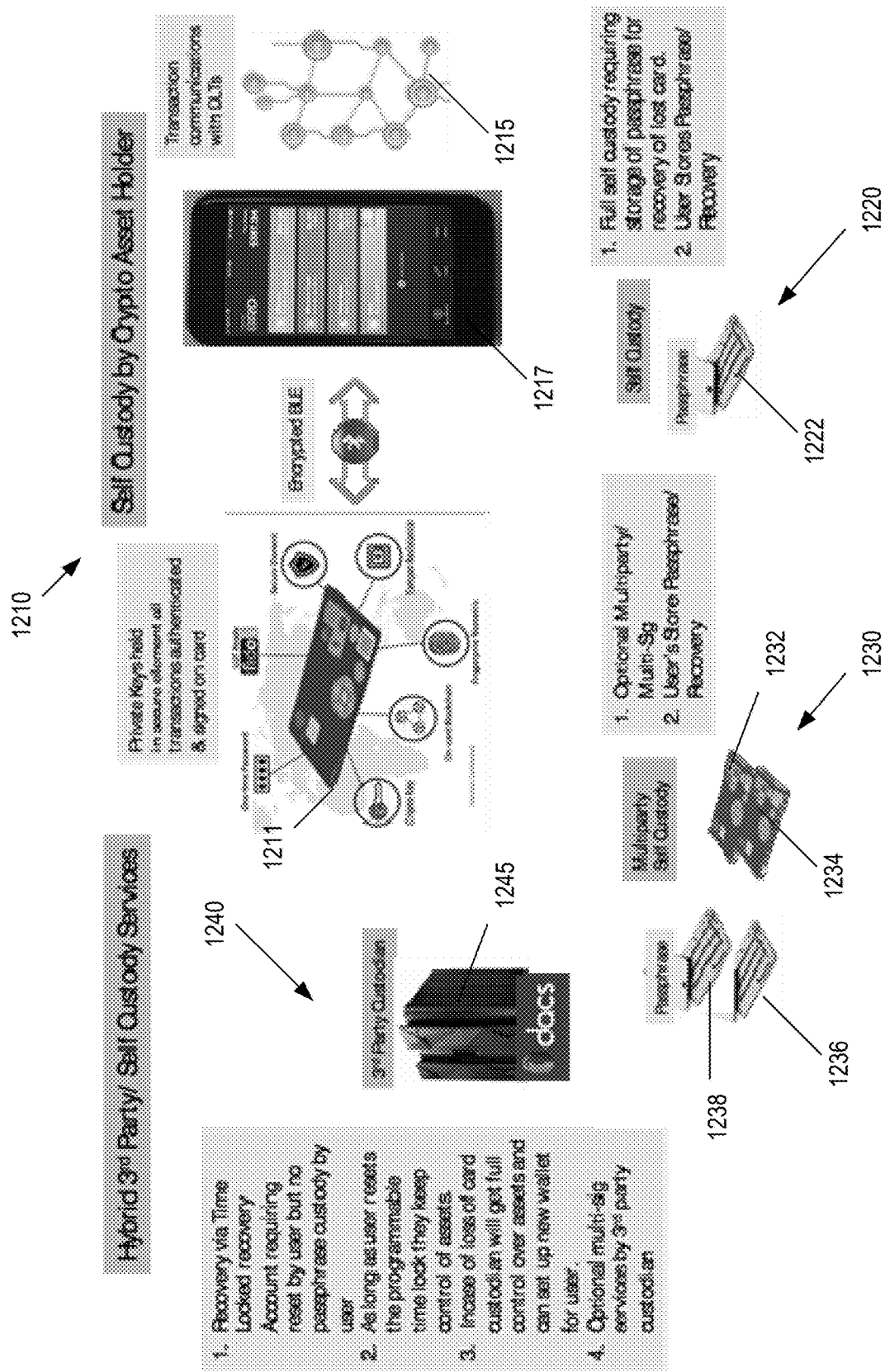
FIG. 12 illustrates a schematic diagram of various custody arrangements in accordance with an example embodiment.

FIG. 12 illustrates a schematic diagram of various custody arrangements in accordance with the present disclosure. FIG. 12 illustrates self-custody arrangement 1210 (e.g. by a crypto asset hold), self-custody arrangement 1220, multiple self-custody arrangement 1230, and hybrid third party and self-custody arrangement 1240.

Arrangement 1220 illustrates full self-custody. This arrangement may require storage of a passphrase for recovery by the user for recovery of a lost or compromised smart card (not shown). Storage device 1222 is illustrated which may be any storage device and/or location (e.g., a mobile device, external memory, personal computer, etc.). Alternatively, or in combination, the user may store the passphrase in their personal memory.

Arrangement 1210 illustrates a smart card 1211 (e.g., a smart card in accordance with the present disclosure) that may be configured to provide self-custody, for example, where values stored on public DLT systems 1215 that support private key recovery via passphrases. For example, a private key of the smart card 1211 is stored in a secure element of the smart card 1211, such that all transactions can be authenticated and signed on the card. Where WAN connectivity exists, the smart card 1211 may communicate with DLT system 1215 to recover its private key via one or more passphrases (e.g., signal path 1213). Similarly, where WAN connectivity does not exist, the smart card 1215 may communicate with another device 1217 (e.g., a mobile device as illustrated) via PAN connectivity (e.g., BLE, NFC, etc.) to recovery the private key from DLT system 1215 (e.g., signal path 1219).

Multiple signature arrangements are possible, for example, where users 1232 can select other users 1234 as signatories for transactions as illustrated in arraignment 1230. In this arrangement, the user and other users store passphrases in different storage location 1236, 1238 (as described above for storage location 1222) for use in recovery of a private key. In some embodiments, as illustrated in arrangement 1240, multiple signatures may be hosted on backend systems configured to allow recovery via time locked transactions held by third party custody system 1245, for example, by utilizes hardware secure elements and multi factor authentication in accordance with the present disclosure. For example, recover via time locked recovery account may require reset by a user, but no pass-phrase custody by the user. As long as the user resets the programmable time lock, the user may keep control of the assets of the account associated with a smart card and with the user. Where a loss of the smart card occurs, the third party custodian may get full control over the assets of the account. The custodian 1245 may also set up a new wallet for the user. In some embodiments, multiple signatures may also be required by the third part custodian (e.g., arrangement 1230) to facilitate setting up a new wallet for the user for depositing the assets.

J. Computer Implemented Embodiment

FIG. 13 is a block diagram illustrating wired or wireless system 1300 in accordance with various aspects of the present disclosure. In accordance with various aspects of the present disclosure, the system 1300 may be used in the implementation of the smart cards and smart cards described herein, for example, smart cards 110-150 and 300 of FIGS. 1-3B and smarts cards described throughout the present disclosure. System 1300 may also be used in the implementations of the smart dock 200 of FIGS. 2A and 2B.

In various embodiments, the system 1300 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 1300 may include one or more processors, such as processor 1310. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1310.

The processor 1310 may be connected to a communication bus 1305. The communication bus 1305 may include a data channel for facilitating information transfer between storage and other peripheral components of the system 1300. The communication bus 1305 may further provide a set of signals used for communication with the processor 1310, including a data bus, address bus, and control bus (not shown). The communication bus 1305 may be any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPM"), IEEE 696/S-100, and the like.

System 1300 may include a main memory 1315 and may also include a secondary memory 1320. The main memory 1315 may provide storage of instructions and data for programs executing on the processor 1310. The main memory 1315 is typically semiconductor-based memory such as dynamic random-access memory ("DRAM") and/or static random-access memory ("SRAM"). Other semiconductor-based memory types include, for example, synchronous dynamic random-access memory ("SDRAM"), Rambus dynamic random-access memory ("RDRAM"), ferroelectric random-access memory ("FRAM"), and the like, including read only memory ("ROM").

The secondary memory 1320 may optionally include an internal memory 1325 and/or a removable storage medium 1330, for example a floppy disk drive, a magnetic tape drive, a compact disc ("CD") drive, a digital versatile disc ("DVD") drive, etc. The removable storage medium 1330 is read from and/or written to in a well-known manner. Removable storage medium 1330 may be, for example, a floppy disk, magnetic tape, CD, DVD, SD card, etc.

The removable storage medium 1330 is a non-transitory computer readable medium having stored thereon computer executable code (i.e., software) and/or data. The computer software or data stored on the removable storage medium 1330 is read into the system 1300 for execution by the processor 1310.

In alternative embodiments, the secondary memory 1320 may include other similar means for allowing computer programs or other data or instructions to be loaded into the system 1300. Such means may include, for example, an external storage medium 1345 and a communication interface 1340. Examples of external storage medium 1345 may include an external hard disk drive or an external optical drive, or and external magneto-optical drive.

Other examples of secondary memory 1320 may include semiconductor-based memory such as programmable read-only memory ("PROM"), erasable programmable read-only memory ("EPROM"), electrically erasable read-only memory ("EEPROM"), or flash memory (block-oriented memory similar to EEPROM). Also included are the removable storage medium 1330 and a communication interface, which allow software and data to be transferred from an external storage medium 1345 to the system 1300.

System 1300 may also include an input/output ("I/O") interface 1335. The I/O interface 1335 facilitates input from and output to external devices. For example, the I/O interface 1335 may receive input from a keyboard, mouse, touch screen, voice command, etc. and may provide output to a display. The I/O interface 1335 is capable of facilitating input from and output to various alternative types of human interface and machine interface devices alike.

System 1300 may also include a communication interface 1340. The communication interface 1340 allows software and data to be transferred between system 1300 and external devices (e.g. printers), networks, or information sources. For example, computer software or executable code may be transferred to system 1300 from a network server via communication interface 1340. Examples of communication interface 1340 include a modem, a network interface card ("NIC"), a wireless data card, a communications port, an infrared interface, and an IEEE 1394 fire-wire, just to name a few.

Communication interface 1340 implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 1340 are generally in the form of electrical communication signals 1350. The electrical communication signals 1350 are preferably provided to communication interface 1340 via a communication channel 1355. In various embodiments, the communication channel 1355 may be a wired or wireless network, or any variety of other communication links. Communication channel 1355 carries the electrical communication signals 1350 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 1315 and/or the secondary memory 1320. Computer programs can also be received via communication interface 1340 and stored in the main memory 1315 and/or the secondary memory 1320. Such computer programs, when executed, enable the system 1300 to perform the various functions of the present invention as previously described.

In this disclosure, the term "computer readable medium" is used to refer to any non-transitory computer readable storage media used to provide computer executable code (e.g., software and computer programs) to the system 1300. Examples of these media include main memory 1315, secondary memory 1320 (including internal memory 1325, removable storage medium 1330, and external storage medium 1345), and any peripheral device communicatively coupled with communication interface 1340 (including a network information server or other network device). These non-transitory computer readable mediums are means for providing executable code, programming instructions, and software to the system 1300.

In an embodiment that is implemented using software, the software may be stored on a computer readable medium and loaded into the system 1300 by way of removable storage medium 1330, I/O interface 1335, or communication interface 1340. In such an embodiment, the software is loaded into the system 1300 in the form of electrical communication signals 1350. The software, when executed by the processor 1310, preferably causes the processor 1310 to perform the inventive features and functions previously described herein.

The system 1300 may include optional wireless communication components that facilitate wireless communication over a voice and over a data network. The wireless communication components include an antenna system 1360, a radio system 1365 and a baseband system 1370. In the system 1300, radio frequency ("RF") signals are transmitted and received over the air by the antenna system 1360 under the management of the radio system 1365.

In various embodiments, the antenna system 1360 may include one or more antennae and one or more multiplexors (not shown) that perform a switching function to provide the antenna system 1360 with transmit and receive signal paths. In the receive path, received RF signals can be coupled from a multiplexor to a low noise amplifier (not shown) that amplifies the received RF signal and sends the amplified signal to the radio system 1365.

In alternative embodiments, the radio system 1365 may include one or more radios that are configured to communicate over various frequencies. In one embodiment, the radio system 1365 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 1365 to the baseband system 1370.

If the received signal contains audio information, then baseband system 1370 decodes the signal and converts it to an analog signal. Then the signal is amplified and sent to a speaker. The baseband system 1370 also receives analog audio signals from a microphone. These analog audio signals are converted to digital signals and encoded by the baseband system 1370. The baseband system 1370 also codes the digital signals for transmission and generates a baseband transmit audio signal that is routed to the modulator portion of the radio system 1365. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 1360 where the signal is switched to the antenna port for transmission.

The baseband system 1370 is also communicatively coupled with the processor 1310. The processor 1310 has access to one or more data storage areas including, for example, but not limited to, the main memory 1315 and the secondary memory 1320. The processor 1310 is preferably configured to execute instructions (i.e., computer programs or software) that can be stored in the main memory 1315 or in the secondary memory 1320. Computer programs can also be received from the baseband system 1370 and stored in the main memory 1315 or in the secondary memory 1320 or executed upon receipt. Such computer programs, when executed, enable the system 1300 to perform the various functions of the present invention as previously described. For example, the main memory 1315 may include various software modules (not shown) that are executable by processor 1310.

Various embodiments of FIG. 13 may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

K. Additional Features

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. The various embodiments illustrated and described are provided merely as examples to illustrate various features of the claims. However, features shown and described with respect to any given embodiment are not necessarily limited to that specific embodiment and may be used or combined with other features and/or embodiments that are shown and described. One of ordinary skill in the art would also understand how alternative functional, logical or physical partitioning and configurations could be utilized to implement the desired features of the described embodiments.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

While various embodiments have been described above, it is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A smart card for securely exchanging information with an external device, the smart card comprising:
    a plurality of dedicated hardware circuit blocks electrically coupled via a bus interconnection, the plurality of dedicated hardware circuit blocks comprising:
        communication circuitry comprising an antenna and configured to transmit and receive information via wireless communication over a network;
        an identification input circuitry configured to capture user credentials from an interaction by a user with the smart card;
        cryptographic circuitry configured to generate encryption parameters for the smart card, digitally sign digital certificates of the smart card based in part on the encryption parameters, and authenticate digitally signed certificates received from external devices;
        memory circuitry configured to store an identification template corresponding to a registered user of the smart card, sensitive information, the encryption parameters, and the digital certificates of the smart card;
        identification circuitry coupled to the memory via a bus interconnection and electrically coupled to the identification input circuitry, the identification block configured to authenticate that user credentials received from the identification input circuitry correspond to the registered user based on a comparison of the received user credentials against the identification template retrieved from the memory circuit, and
        a microcontroller comprising one or more processors and configured to, in response to authenticating the user:
            access the sensitive information stored in the memory,
            verify trust with the external device based, in part, on receiving one or more digitally signed certificates from the external device and authenticating the one or more digitally signed certificates based in part on the encryption parameters,
            encrypt at least a portion of the sensitive information using the encryption parameters,
            certify the encrypted portion of the sensitive information based on digitally signing the digital certificates stored in the memory, and
            transmit the certified encrypted portion of the sensitive information to the external device via the antenna of the communication circuitry,
        wherein the identification input circuity comprises a biometric sensor configured to capture biometric information from the user, wherein the identification template comprises a biometric template corresponding to the registered user,
        wherein the biometric information comprises an image of a biometric of the user, wherein the identification circuit is further configured, under control by the microcontroller, to perform digital signal processing on the image comprising image enhancement, minutiae detection, and comparison of the image of the biometric information with the biometric template,
        wherein the identification circuity comprises an image enhancement block, minutiae detection block, and comparison block, each block being a dedicated hardware circuit block configured for reduced data bit widths based on sequential and parallel processing.

2. The smart card of claim 1, further comprising a plurality of chips and each of the plurality of dedicated hardware circuit blocks are disposed on a separate chip of the plurality of chips.

3. The smart card of claim 1, further comprising a secure element comprising at least the memory, the identification circuity, the cryptographic circuity, and the microcontroller disposed on a single substrate, where the smart card is a secure and tamper resistant smart card based at least in part on the secure element.

4. The smart card of claim 3, wherein the secure element is configured to operate at ultra-low power consumption.

5. The smart card of claim 4, further comprising a power management circuit configured to operate the secure element at a subthreshold voltage based in part on scheduling the plurality of dedicated hardware circuit blocks via power/clock and signal grating.

6. The smart card of claim 3, further comprising an EMV chip disposed on the single substrate.

7. The smart card of claim 3, further comprising an EMV chip disposed on a separate chip and configured to interface with the secure element.

8. The smart card of claim 1, wherein the memory is configured to immutably store the sensitive information based in part on the cryptographic circuity and the identification circuitry.

9. The smart card of claim 1, wherein the identification input circuity comprises a touch sensitive sensor configured to receive user credentials input by the user, the user credentials comprising one or more of: a pin, pass phrase, and unique keystroke.

10. The smart card of claim 1, wherein the communication circuitry is configured to transmit and receive information over one or more of a local area network, a personal area network, and a wide area network.

11. The smart card of claim 1, wherein the communication circuitry is configured to operate using a communication protocol comprising at least one or more of: near-field communication, Bluetooth, and Wi-Fi.

12. The smart card of claim 1, wherein the communication circuitry is configured to establish a personal area network based on detecting that the external device within a communicable range of the personal area network.

13. The smart card of claim 1, wherein the communication circuitry transmits and receives information over a wide area network based on insertion of the smart card into a smart dock, the smart dock comprising a housing and an opening configured to receive the smart card.

14. The smart card of claim 1, wherein the cryptographic circuitry comprises a random key generator configured to generate the a private key.

15. The smart card of claim 1, wherein the memory is configured to store data representative of a private key associated with the smart card, a plurality of public keys, and one or more digitally signed digital certificates.

16. The smart card of claim 1, wherein, when the smart card is not connected to a wide area network, the microcontroller is configured to:
establish a trusted connection with the external device based, in part, the a verification of trust; and
transmit the certified encrypted portion of the sensitive information to the external device over the trusted connection with the external device.

17. The smart card of claim 1, wherein, when the smart card is connected to a wide area network, the microcontroller is configured to transmit the certified encrypted portion of the sensitive information to the external device over the wide area network via a backend system comprising one or more of: a distributed ledger technology system and a central database.

18. The smart card of claim 1, wherein the microcontroller is configured to:
verify trust with a plurality of remote devices;
establish a trusted connection with one or more of the plurality of remote devices based, in part, on a verification of trust; and
transmit the certified encrypted portion of the sensitive information to the external device based on a chain of a plurality of transactions between the plurality of remote devices.

19. The smart card of claim 1, wherein the external device comprises at least one or more of: a mobile device, a computer system, a point-of-sale terminal, a point-of-sale terminal emulator, a cloud infrastructure, and another smart card.

20. The smart card of claim 1, wherein the microcontroller is configured to, based on the transmission of the certified encrypted portion of the sensitive information, generate transaction record information representative of the transmission and store the transaction record information in the memory.

21. The smart card of claim 20, wherein the microcontroller is configured to transmit the transaction record information to a backend system configured to verify the transaction record information based, in part, on one or more of: proof of work, proof of stake, directed acyclic graph, and time stamping and sequencing.

22. The smart card of claim 20, wherein the microcontroller is configured to transmit the transaction record information to a central database system.

23. The smart card of claim 1, further comprising a display configured to, in response to authenticating the user, display the sensitive information in human or machine-readable format.

24. A method for securely exchanging information with an external device, the method comprising:
authenticating, by identification circuitry of a smart card, that user credentials received from identification input circuitry of the smart card correspond to a registered user based on a comparison of the received user credentials against an identification template corresponding to the registered user retrieved from a memory circuit of the smart card, wherein the memory is coupled to the identification block by a bus interconnection;
in response to authenticating the user and by a microcontroller of the smart card coupled to the memory, the identification circuit, and a circuitry by the bus interconnection:
accessing sensitive information stored in the memory;
verifying trust with the external device based, in part, on receiving one or more digitally signed certificates from the external device and authenticating the one or more digitally signed certificates based in part on encryption parameters stored in the memory;
encrypting at least a portion of the sensitive information using the encryption parameters;
certifying the encrypted portion of the sensitive information based on digitally signing one or more digital certificates stored in the memory;
transmitting, over wireless communication, the certified encrypted portion of the sensitive information to the external device via an antenna of communication circuitry included in the smart card;
based on the transmission of the certified encrypted portion of the sensitive information, generating transaction record information indicative of the transmission and store the transaction record information in the memory; and
in response establishing a connection to a wide area network, uploading the transaction record information to a backend system comprising one or more: of a distributed ledger (DTL) system and a central database system,
wherein uploading the transaction record information comprises transaction record information of a plurality of transactions including the transmission, wherein the transaction record information is uploaded asynchronously and non-sequentially to the backend system, the backend system is configured to validate the transactions via one or more of: proof of work, proof of stake, directed acyclic graph, and time stamping and sequencing.

25. The method of claim 24, wherein the memory, microcontroller, cryptographic circuitry, and identification circuitry are disposed on a single substrate included in the smart card.

26. The method of claim 24, wherein the identification input circuity comprises a biometric sensor configured to capture biometric information from the user, wherein the identification template comprises a biometric template corresponding to the registered user.

27. The method of claim 24, wherein the communication circuitry is configured to transmit and receive information over a personal area network.

28. The method of claim 27, further comprising, by the communication circuity, detecting that the external device within a communicable range of the personal area network and establishing the personal area network based on the detection.

29. The method of claim 24, further comprising, in response to authenticating the user:
establishing a trusted connection with the external device over a personal area network based in part a verification of trust; and
encrypting the portion of the sensitive information using a private key, wherein the external device comprises a public key corresponding to the private key.

30. A method for securely exchanging information with an external device, the method comprising:
authenticating, by identification circuitry of a smart card, that user credentials received from identification input circuitry of the smart card correspond to a registered user based on a comparison of the received user credentials against an identification template corresponding to the registered user retrieved from a memory circuit of the smart card, wherein the memory is coupled to the identification block by a bus interconnection;
in response to authenticating the user and by a microcontroller of the smart card coupled to the memory, the identification circuit, and a circuitry by the bus interconnection:
accessing sensitive information stored in the memory;
verifying trust with the external device based, in part, on receiving one or more digitally signed certificates from the external device and authenticating the one or more digitally signed certificates based in part on encryption parameters stored in the memory;
encrypting at least a portion of the sensitive information using the encryption parameters;
certifying the encrypted portion of the sensitive information based on digitally signing one or more digital certificates stored in the memory; and
transmitting, over wireless communication, the certified encrypted portion of the sensitive information to the external device via an antenna of communication circuitry included in the smart card,
wherein a unique private key is associated with the smart card and stored in the memory as part of the encryption parameters,
wherein the method further comprises:
signing, by one or more certificate authorities, a public key certificate comprising the public key, each respective certificate authority comprising a corresponding certificate indicative whether additional cosigning certificates are required to verify the authenticity of certificates signed by the respective certificate authority, and
unless the certificate authority is a root certificate authority, verifying authenticity of the respective certificate authority based on one or more parent certificates.

31. The method of claim 30, wherein the one or more digital certificates are generated by a smart card acting in the capacity of certificate authorities.

32. The method in claim 31, wherein the transmission of the certified encrypted portion of the sensitive information is trusted to be authentic, by the external device, if the transmission is signed by a unique private key associated with a public key certificate whose authenticity has been verified by a certificate chain leading back to one or more trusted root certificates and is not included on a blacklist of revoked certificates.

33. The method in claim 32, further comprising sending data indicative of the transmission to a backend system when wide area network connectivity is established with one or more of the smart card and external device.

34. The method of claim 33, further comprising, if the transmission is not authenticated, adding the smart card to the blacklist.

35. A method for securely exchanging information with an external device, the method comprising:
authenticating, by identification circuitry of a smart card, that user credentials received from identification input circuitry of the smart card correspond to a registered user based on a comparison of the received user credentials against an identification template corresponding to the registered user retrieved from a memory circuit of the smart card, wherein the memory is coupled to the identification block by a bus interconnection;
in response to authenticating the user and by a microcontroller of the smart card coupled to the memory, the identification circuit, and a circuitry by the bus interconnection:
accessing sensitive information stored in the memory;
verifying trust with the external device based, in part, on receiving one or more digitally signed certificates from the external device and authenticating the one or more digitally signed certificates based in part on encryption parameters stored in the memory;
encrypting at least a portion of the sensitive information using the encryption parameters;
certifying the encrypted portion of the sensitive information based on digitally signing one or more digital certificates stored in the memory;
transmitting, over wireless communication, the certified encrypted portion of the sensitive information to the external device via an antenna of communication circuitry included in the smart card; and
storing a plurality of supporting transactions in the memory of the smart card, and sending at least a first supporting transaction of the plurality of supporting transactions to the external device along with the transmission according to protocol rules, the at least a first transaction configured to detect a compromised smart card, wherein at least a second supporting transaction is omitted from transmission to reduce time and power consumption for transferring supporting transactions according to sharing parameters set each time the smart card connects to the a backend system.

36. The method of claim 35, wherein the protocol rules comprise sharing any transaction information between the remote device and the smart card that have yet to be transmitted to the backend system and are necessary for the external device to send the transmission to the backend system.

37. The method of claim 35, wherein the protocol rules comprise sharing transactions that exceed a threshold value and have not been uploaded to the backend system.

38. The method of claim 24, wherein the transmission comprises an expiration date, the expiration date being set by a backend system, wherein the external device compares the expiration date included in the transmission against a date of receipt of the transmission.

* * * * *